United States Patent [19]
Ohnishi et al.

[11] Patent Number: 5,477,308
[45] Date of Patent: Dec. 19, 1995

[54] IMAGE FORMING APPARATUS HAVING AN IMAGE-QUALITY CORRECTION FUNCTION

[75] Inventors: Kazuyuki Ohnishi, Yamatokoriyama; Yasutaka Maeda, Ikoma; Yoichi Shimazawa, Nara; Mihoko Okada, Yamatokoriyama; Yuichi Kazaki, Nishinomiya; Shin-ichirou Ohhashi, Yamatokoriyama; Yoshie Iwakura, Higashiosaka, all of Japan

[73] Assignee: Sharp Kabushiki Kaisha, Osaka, Japan

[21] Appl. No.: 157,929

[22] Filed: Nov. 24, 1993

[30] Foreign Application Priority Data

Nov. 27, 1992 [JP] Japan .................................. 4-318967
Dec. 10, 1992 [JP] Japan .................................. 4-330634
Jun. 25, 1993 [JP] Japan .................................. 5-155755

[51] Int. Cl.$^6$ .................................................. G03G 15/00
[52] U.S. Cl. ........................ 355/246; 355/208; 382/155; 395/3
[58] Field of Search ................................ 355/208, 246, 355/245, 203, 207, 209; 364/807; 395/3, 22, 900; 382/1, 8

[56] References Cited

U.S. PATENT DOCUMENTS

| | | | |
|---|---|---|---|
| 4,647,184 | 3/1987 | Russell et al. | 355/208 X |
| 4,916,488 | 4/1990 | Kimura | 355/208 |
| 5,031,123 | 7/1991 | Narukawa | 364/525 |
| 5,065,190 | 11/1991 | Nakagama et al. | 355/246 |
| 5,067,160 | 11/1991 | Omata et al. | 382/1 |
| 5,075,725 | 12/1991 | Rushing et al. | 355/208 |
| 5,162,899 | 11/1992 | Naka et al. | |
| 5,200,783 | 4/1993 | Maeda et al. | 355/246 |
| 5,204,718 | 4/1993 | Morita | 355/246 |
| 5,216,463 | 6/1993 | Morita | |
| 5,216,470 | 6/1993 | Asanuma et al. | 355/246 |
| 5,220,373 | 6/1993 | Kanaya | |
| 5,258,783 | 11/1993 | Sasanuma et al. | 346/157 |
| 5,315,352 | 5/1994 | Nakane et al. | 355/246 |

FOREIGN PATENT DOCUMENTS

| | | |
|---|---|---|
| 0195655 | 9/1986 | European Pat. Off. |
| 0469526 | 2/1992 | European Pat. Off. |
| 61-29502 | 7/1986 | Japan |
| 3-15866 | 1/1991 | Japan |
| 4-273650 | 9/1992 | Japan |
| 4-296871 | 10/1992 | Japan |
| 4-320278 | 11/1992 | Japan |

OTHER PUBLICATIONS

"Electrophotography Process Control Method Based On Neural Network and Fuzzy Theory" Technical Report of the Institute of Image Electronics, Jan. 24, 1992, pp. 25–30.

*Primary Examiner*—A. T. Grimley
*Assistant Examiner*—T. A. Dang
*Attorney, Agent, or Firm*—David G. Conlin; Kevin J. Fournier

[57] ABSTRACT

An image forming apparatus is designed to compensate for voltage to be applied to an exposure lamp and a charger in accordance with changes in the density of a toner image formed on a photoreceptor that occur from its initial state to its final state after an image forming operation. More specifically, the density of a reference toner image is measured by a toner-density sensor. The amount of change in the density is measured beginning with its initial state by a subtracter, and the amount of compensation for the voltage required for obtaining the optimum image quality is found. By using these amounts of compensation as teaching data, learning is made as to the relationship between the amount of change in the density and the amount of compensation in a neurocomputer. Upon forming an image, the neurocomputer executes operations in accordance with the contents of the learning based on an inputted amount of change in density, and finds an appropriate amount of compensation. With this arrangement, it is possible to constantly obtain copied images having stable image quality, and to lower the cost of image forming apparatuses by reducing the number of parts used for the sensors or other devices.

37 Claims, 41 Drawing Sheets

F I G.18
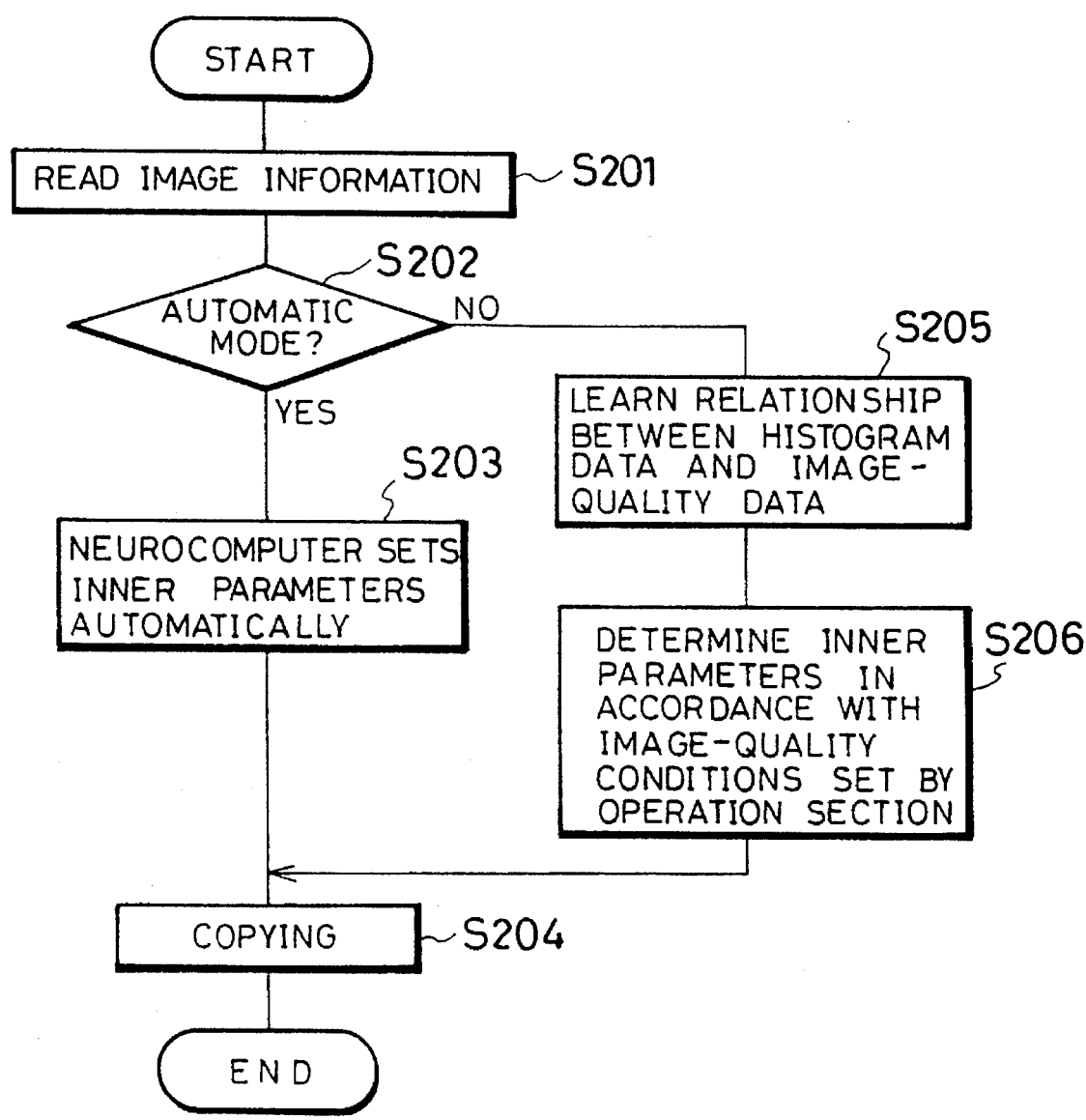

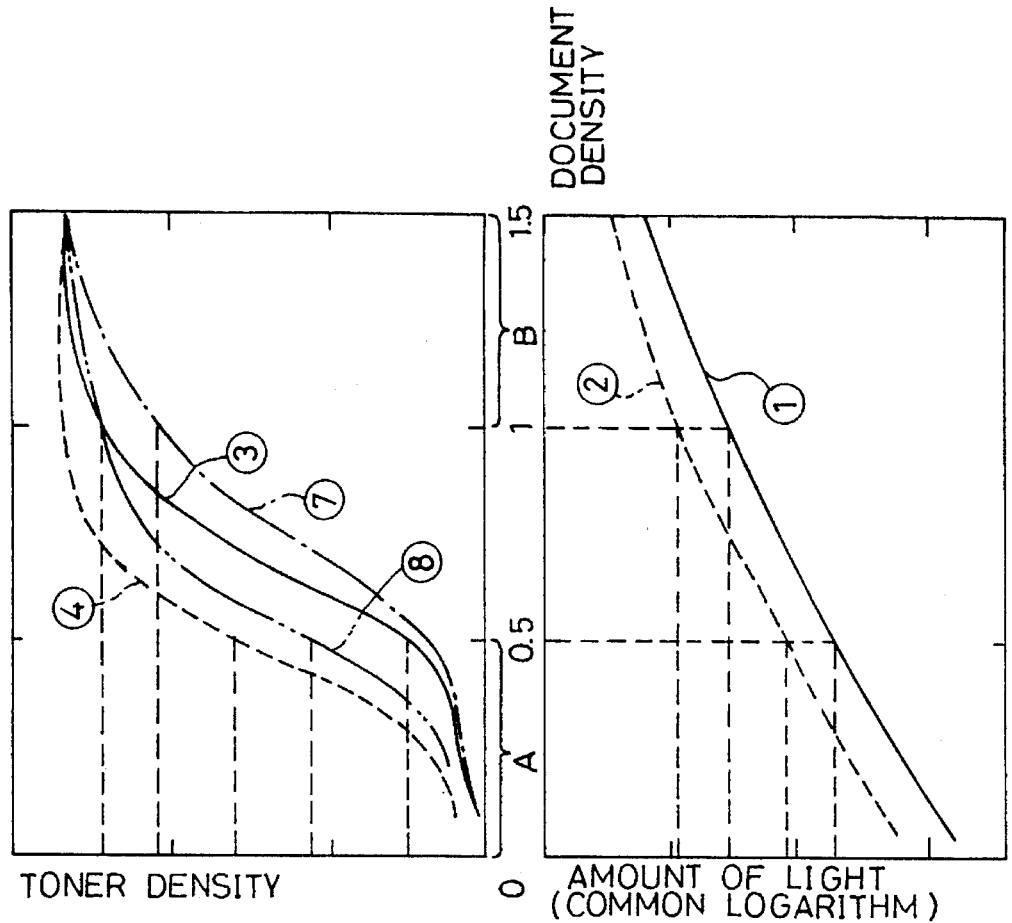
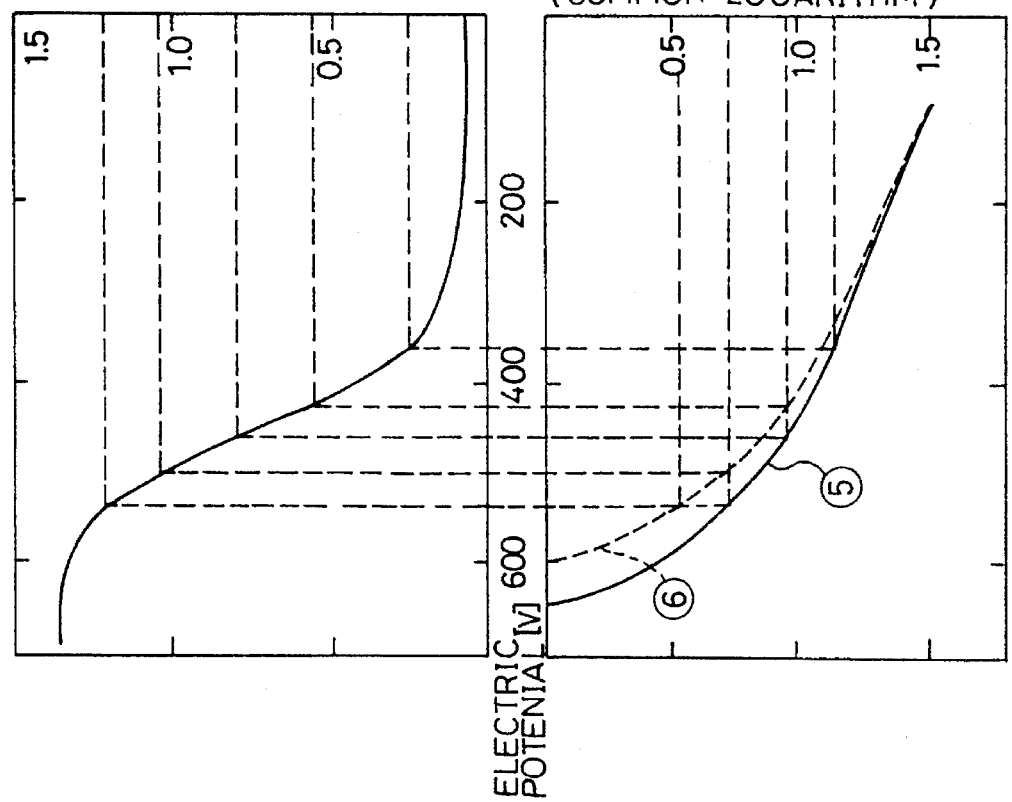

IMAGE FORMING APPARATUS HAVING AN IMAGE-QUALITY CORRECTION FUNCTION

FIELD OF THE INVENTION

The present invention relates to image forming apparatuses, such as copying machines, which stabilize the picture quality of a formed image by controlling the image forming process in accordance with a toner image formed on the photoreceptor and which carries out an image forming process by the use of desired image quality that is determined in correlation with the images of original documents, by employing a neural network.

BACKGROUND OF THE INVENTION

First, the following description will discuss the background of the present invention concerning control for image quality in the image forming process.

In copying machines, etc. of the electrophotographic system, it is desirable to stabilize the density of a toner image that is formed on a copy sheet in order to obtain a copied image of high quality. However, in the electrophotographic process, characteristics of the exposure lamp, the photoreceptor, the toner, etc. are prone to change due to various factors, such as temperature, moisture, stains, wear, and property changes in materials; therefore, the density of toner image changes due to those changes. In order to solve this problem, there have been devised and put into practice various methods for compensating for the changed amount in the density of toner image by controlling the amount of exposure, the amount of charge of the photoreceptor, etc., during the processes from the exposure of an original document to the formation of the toner image.

For example, conventionally, a method for controlling a charging voltage based on a reference value that is obtained by optically detecting the density of toner image has been employed. In such a method, in the stage where the copy image quality in the copying machine is initially adjusted, the density of a toner image which is formed by a specific charge voltage value is detected by a reflective optical sensor, and the detected value is stored as a reference value for control. Thereafter, the density of toner image is detected in the same manner, if necessary, and the difference between the detected value and the reference value is converted into a compensating amount for charge voltage value of the photoreceptor. In this compensation, the following compensating characteristic is employed.

An image-forming operation in a common copying machine is classified into three processes, that is, the exposing process of the original document, the charging and exposing processes of the photoreceptor, and the developing process. FIG. 43 shows characteristics of those three processes.

FIG. 43(a) shows the relationship between the optical density (horizontal axis) of the original and the common logarithm of the amount of reflected light from the original (vertical axis). Suppose that the optical density is D, the amount of reflected light from the original is X, and the amount of light reflected from the background (white paper) of the original is Xm, the optical density is given by equation (1).

$$D = -\log(X/Xm) \qquad (1)$$

FIG. 43(b) shows the relationship between the electric potential (horizontal axis) of the photoreceptor after exposure and the common logarithm of the amount of incident light to the photoreceptor (vertical axis), that is, the amount of reflected light from the original. Further, FIG. 43(c) shows the relationship between the electric potential of the photoreceptor (horizontal axis) and the density of toner image (vertical axis). Moreover, FIG. 43(d) shows the relationship between the optical density of original (horizontal axis) and the density of toner image (vertical axis). In FIG. 43, (d) is obtained by applying respective values in the order of (a)→(b)→(c), and the decision on the quality of copied picture is made by the use of this drawing.

Further, Japanese Examined Patent Publication No. 29502/1986 (Tokukoushou 61-29502) discloses a technique for controlling the exposing condition, developing condition and charging condition in response to signals corresponding to bright and dark portions of an image formed on the photoreceptor. With this arrangement, a signal corresponding to the bright portion of the image is detected, and the exposing condition for forming a latent image or the developing condition for making the latent image visible is controlled in response to the signal. Further, a signal corresponding to the dark portion of the image is detected, and the charging condition on the electrostatic latent image forming member is controlled in response to the signal.

Moreover, there has been proposed another method wherein the amount of Change in temperature and humidity and the sensitivity change in the photoreceptor in the copying machine, which form some of factors that would cause changes in the characteristics, are measured, and from the results, a compensating value for the control voltage is found (see "Electrophotographic Process Control Method by the use of Neural Network and Theory of Fuzzy", Image Electronics Society, A Technical Report 91-05-05).

The background as described above is not only related to copying machines, but also related to printers and facsimiles wherein the electrophotographic system is adopted. In copying machines, the photoreceptor is exposed by reflected light from an original; whereas in printers and facsimiles, exposure is conducted by changing the output of the exposing device using a laser light beam, etc. in response to an image signal inputted thereto.

However, in the above-mentioned method wherein the change in image quality is compensated for by measuring the change in the density of toner images, it is difficult to specify which portion of the image forming system, that is, exposure, charging, and developing, is responsible for the relevant change in image quality. For this reason, this method fails to compensate for a plurality of control values in a unified manner, thereby making it difficult to always determine best-suited control values. The reasons are described as follows:

Generally, even if the apply voltage for the exposure lamp and the output voltage of high-voltage power supply that is connected to the charging device are maintained constant, the respective characteristics, shown in FIGS. 43(a) through 43(c), change due to changes in temperature and humidity, wear of the photoreceptor, stains on the exposure lamp and the charging device, or other reasons.

For example, when only the amount of exposure changes to shift the characteristic of (a) from curve (1) indicated by a solid line to curve (2) indicated by a broken line, the characteristic of (d) changes from curve (3) indicated by a solid line to curve (4) indicated by a broken line. The characteristic of curve (3) provides good image quality in copied images; however, the characteristic of curve (4)

causes the density to become higher as a whole, thereby making copied images darker.

Moreover, when only the electric potential of photoreceptor changes to shift the characteristic of (b) from curve (5) indicated by a solid line to curve (6) indicated by a broken line, the characteristic of (d) changes from curve (3) to curve (7) indicated by an alternate long and short dashes line. This causes the density to become lower as a whole, thereby making copied images lighter.

As described above, it is impossible to maintain the image quality of copied images in a good state for a long time merely by keeping control voltage values associated with exposure, charging, etc. at constant values.

Even in a technique disclosed in Japanese Examined Patent Publication No. 29502/1986 (Tokukoushou 61-29502), the respective conditions of exposure, charging and developing are individually controlled by signals derived from two types of images. Therefore, for example, in the case where the charging condition is changed, even if the characteristic associated with charging becomes better, the characteristic associated with exposure becomes worse conversely. As will be also described below, this fails to provide a sufficient compensation for the exposure condition, resulting in failure in providing optimum image quality.

With regard to the characteristic of (d), the bright portion, which is explained in the above patent publication as such, corresponds to an image that is derived from portion A having document densities of not more than 0.5, and the dark portion corresponds to an image that is derived from portion B having document densities of not less than 1.0. In (d), when only the exposure characteristic changes, the change in the bright portion (portion A) becomes greater as indicated by curve (4), and when only the charging characteristic changes, the change in the dark portion (portion B) becomes greater as indicated by curve (7). Therefore, in such a case, since the relationship between the change in each condition and the change in toner density is comparatively clear, the density compensation which is provided by controlling each condition individually is effectively adopted.

However, in the case where the exposure characteristic in (a) changes from curve (1) to curve (2) while the charging characteristic in (b) changes from curve (5) to curve (6), these changes make curve (8) as indicated by an alternate long and two short dashes line in (d). In other words, at portion A, since the charging characteristic and the exposure characteristic are cancelled, the change in density characteristic becomes small. At portion B, the effect of the change in the charging characteristic is so great that the effect of the change in the exposure characteristic hardly appears.

The density characteristic between document and toner, which is measured by the above compensating method, is indicated by "x" in FIG. 11 based on simulator experience, and these are connected to form a curve indicated by an alternate long and short dashes line. In FIG. 11, the horizontal axis represents the document density and the vertical axis represents the toner density. FIG. 11 shows that the characteristic obtained by the above simulator experience has a large deviation from the initial characteristic that is indicated by a solid line; this shows that the compensation is not carried out accurately.

Furthermore, in another method wherein ambient changes in temperature, humidity, etc. are measured, it is necessary to install a temperature sensor, a humidity sensor, an electric potential sensor, etc. Therefore, this method increases cost of electrophotographic apparatuses, and needs extra space to accommodate those sensors in the apparatus, thereby arising adverse effects on the compactness and maintenance of electrophotographic apparatuses. In addition to this problem, since it is difficult for the sensors to measure stains on the exposure lamps, etc., the above method fails to deal with indefinite factors such as stains.

The following description will discuss the background of the present invention concerning the condition setting on the image formation.

In a copying machine, normal copying is carried out in a standard mode wherein copying conditions such as quality in copied images are set at standard values. However, when copying is carried out in the standard mode, the resulting copies do not necessarily have a satisfactory image quality because the optimum setting on copying conditions differs depending on images of original documents and tastes of individual users. Taking account of the above problems, some conventional copying machines, such as described below, are designed so that the setting on the copying conditions can be changed.

For example, in copying machines having a function, so-called job memory, copying conditions are preliminarily registered through the function, and upon copying, the registered copying conditions are accessed on demand.

Moreover, Japanese Laid-Open Patent Publication No. 15866/1991 (Tokukaihei 3-15866) discloses a copying machine which informs the necessity of using the automatic document feeder in accordance with its copying history. More specifically, this copying machine stores its copying history such as document sizes and the number of copy sheets, every time copying is operated. Then, the frequency of document exchanges that have been successively executed within a predetermined period is found in accordance with the copying history, and a judgement is made as to the necessity of the automatic document feeder based on the frequency.

Furthermore, Japanese Laid-Open Patent Publication No. 273650/1992 (Tokukaihei 4-273650) discloses a copying machine which compares image data of a copied image of an original document with image data of the original document and adjusts the quality of copied images based on the results of the comparison.

However, in the copying machines having the job memory function, an operation on the control panel is necessary every time a copying condition is registered or accessed; this has made the operation complicated. Also, in copying machines that are disclosed in Japanese Laid-Open Patent Publications 15866/1991 and 273650/1992 (Tokukaihei 3-15866 and 4-273650), the number of parameters is decreased so that functions used for the setting on copying conditions can be simplified. In this arrangement, the relationship between the image information on an original document and the user's favorite color tone, density, etc. on the original document can not be inputted as copying conditions because too many parameters are required.

In order to solve this problem, a prospective method is to store image information on an original document and a copying condition on a one-to-one basis with each other, and to automatically set copying conditions based on the image information read from the original document. However, this method requires a memory with a large capacity to cover the increase in the number of stored data. Further, in the case where image information that has been read is different from the stored image information, a compensation by the use of approximation is carried out; this requires numerous stored data in order to make the accurate approximation. Moreover, if a memory with a large capacity is provided, it is difficult to access the data instantaneously without devising an appropriate data construction for the storage.

SUMMARY OF THE INVENTION

It is an objective of the present invention to provide an image forming apparatus which compensates for image quality accurately by the use of a simple construction. Also, it is another objective of the present invention to provide an image forming apparatus which readily carries out the setting of image quality by the use of a simple construction.

In order to achieve the former objective, the first image forming apparatus of the present invention is provided with: a photoreceptor; an image forming means which includes the photoreceptor, and which carries out an operation for forming an image; a density detection means for detecting the density of a toner image that is formed of the photoreceptor; an initial density storage means for storing a density of the toner image in an initial state, the density having been detected by the density detection means; a density-change detection means for detecting a change in density between the density stored in the initial density storage means and the density of a toner image that is detected by the density detection means after a plurality of image forming operations have been carried out by the image forming means; a density-change storage means for storing the change in density that has been detected by the density-change detection means; and a picture-quality compensating means for learning the relationship between input data and teaching data, the input data being derived from the change in density stored in the density-change storage means, the teaching data being derived from a compensating amount that matches the change in density for a control value to be given to the image forming means, and for calculating a compensating amount for a control value that is suitable for the change in density stored in the density-change storage means, in accordance with the contents of the leaning, upon executing an image forming operation.

In the above arrangement, when the toner density is in an initial state, the density of a toner image that has been preliminarily detected by the density detection means is stored in the initial density storage means. Thereafter, while image forming operations are carried out certain times, the density of the toner images is detected by the density detection means as frequently as predetermined. Thus, the amount of change between the density that has been detected later and the initial density is detected by the density-change detection means. This amount of change between the densities is stored in the density-change storage means.

Simultaneously, a compensating amount for a control value that is suitable for the change in density is obtained during the operation of the image forming means. As to the control value, a value such as a voltage to be applied to the charging device and exposure lamp, which affects the image quality during the image forming process, is preferably used. In this state, when the change in density is inputted thereto from the density-change storage means, the picture-quality compensating means preliminarily learns the relationship between the change in density and the above-mentioned compensating amount. If the picture-quality compensating means is provided as, for example, a neurocomputer of perceptron type, the contents of the learning can be obtained as weights between respective layers.

Thereafter, according to the necessity, when the change in density between the density of a toner image detected by the density detection means and the initial density that has been preliminarily detected is obtained, the picture-quality compensating means calculates the compensating amount for the control value that is suitable for the change in density in accordance with the contents of the learning, and releases the compensating amount.

As described above, in the image forming apparatus, since the compensating amount for the control value is obtained in accordance with the contents of the learning, a plurality of control values are compensated for in a unified manner. Therefore, the compensation for the control values is executed accurately even in the case of using changes in density including the change in density due to stains on the exposure lamp and other devices.

Moreover, since only the physical amount that needs to be detected is the density of a toner image, only the density detection means such as optical sensors is required in the image forming apparatus in order to make the detection possible. For this reason, this arrangement prevents an increase in the number of sensors, and it is not necessary to save space for a number of sensors in the image forming apparatus.

Additionally, upon detection of the densities, toner images corresponding to a bright portion and a dark portion of an original document may be formed on the photoreceptor; this arrangement makes it possible to compensate for image quality through a wide range of densities.

In order to achieve the primary objective, the second image forming apparatus of the present invention is provided with: a photoreceptor; an image forming means which includes the photoreceptor, and which carries out an operation for forming an image; a density detection means for detecting the density of a toner image that is formed on the photoreceptor; an initial density storage means for storing a density of the toner image in an initial state, the density having been detected by the density detection means; a density-change detection means for detecting a change in density between the density stored in the initial density storage means and the density of a toner image that is detected by the density detection means after a plurality of image forming operations have been carried out by the image forming means; a density-change storage means for storing the change in density that has been detected by the density-change detection means; an operation-number counting means for counting the number of accumulated operations as to the image forming means since the initial state of the density of the toner image; and a picture-quality compensating means for learning the relationship between input data and teaching data, the input data being derived from the change in density stored in the density-change storage means and the number of accumulated operations as to the image forming means that has been detected by the operation-number counting means, the teaching data being derived from a compensating amount that matches the change in density and the number of accumulated operations as to the image forming means for a control value to be given to the image forming means, and for calculating a compensating amount for a control value that is suitable for the change in density stored in the density-change storage means and the number of accumulated operations that has been counted by the operation-number counting means, in accordance with the contents of the learning, upon executing an image forming operation.

In the above arrangement, the compensation for control values is carried out basically in the same processing sequence as the aforementioned image forming apparatus. Further, in this arrangement, the number of accumulated operations as to the image forming means is counted by the operation-number counting means since the initial state of the density of the toner image, and the counted value is utilized as one of the learning factors in the image quality compensating means. The number of accumulated operations is obtained by counting, for example, the number of developing processes in the developing device, the number of turning-on operations of the exposure lamp, etc.

As described above, with the arrangement wherein the number of accumulated operations as to the image forming means is added to the learning factors, it becomes possible to predict a change in image quality caused by deterioration in developer; this results in an effective compensation for image quality.

In order to achieve the latter objective, the third image forming apparatus of the present invention is provided with: an image-information reading means for reading out image information of a document image; an image forming means for carrying out an operation for forming an image based on the image information read by the image-information reading means; an image-quality condition input means for inputting conditions on image quality for image formation; a control means for controlling the image forming means based on the set conditions on image quality; and an image-quality condition setting means for learning the relationship between input data and teaching data, the input data being derived from the image information read by the image-information reading means, the teaching data being derived from the conditions on image quality that have been inputted through the image-quality condition input means, and for setting conditions on image quality that are suitable for the image information read by the image-information reading means by conducting operations in accordance with the contents of the learning, upon copying the image of the document.

With the above arrangement, when, upon forming an image, conditions on image quality are inputted through the image-quality condition input means, the image-quality condition setting means recognizes the conditions on image quality as teaching data as well as recognizing the image information read by the image-information reading means as inputted data, and learns the relationship between both of the data. In this case, the image information read by the image-information reading means includes, for example, distributed conditions on the colors, red, green and blue, densities on the respective colors, etc. in the case of using a full-color document.

Further, upon forming an image, the image-quality condition setting means finds conditions on image quality that are suitable for the image information read by the image-information reading means through the operations based on the relationship between the image information and the conditions on image quality that has been already learned, and the image-quality conditions are given to the control means. Then, the image forming means is controlled by the control means in accordance with the set conditions on image quality, and is allowed to form an image.

As described above, in the image forming apparatus, it is not necessary to conduct image-quality setting in each time so as to make it suitable for an individual document image and the user's tastes on the image, and the image-quality condition setting means inputs to the control means conditions on image quality that match the user's tastes. Therefore, the user or the service person is released from troublesome and time-consuming tasks such as inputting operations on the control panel. Further, the image-quality condition setting means recognizes and learns the user's tastes on the document in question every time the user updates the setting on image quality. Thus, the more frequently the image forming apparatus is used, the better image quality suitable for the user's tastes it can provide.

In order to achieve the latter objective, the fourth image forming apparatus of the present invention is provided with: an image-information reading means for reading out image information of an document image; an image forming means for conducting an operation for forming an image based on the image information read by the image-information reading means; an image-quality condition input means for inputting conditions on image quality for image formation; a converting means for converting the image-quality conditions inputted through the image-quality condition input means into parameters that are suitable for the control on the image forming means; control means for controlling the image forming means based on the parameters that have been set; and a parameter setting means for learning the relationship between input data and teaching data, the input data being derived from the image information read by the image-information reading means, the teaching data being derived from the parameters from the converting means, and for setting parameters that are suitable for the image information read by the image-information reading means by conducting operations in accordance with the contents of the learning, upon copying the document image.

With the above arrangement, the parameter setting means learns the relationship between the image information and the parameters, and sets the parameters in accordance with the contents of the learning. The parameters are obtained by allowing the converting means to convert the image-quality conditions inputted through the image-quality condition input means into a form that is suitable for the control on the image forming means.

In this arrangement, as with the aforementioned image forming apparatus, the image-quality setting is automatically performed in accordance with the user's tastes.

Additionally, as to the third and fourth image forming apparatuses, for example, the following arrangement may be proposed.

The learning and operations, which are conducted by the image-quality condition setting means and the parameter setting means, may be arranged so that they are performed in correlations with identification numbers. Thus, the management on the contents of the learning can be conducted for each of the users.

Further, the contents of the learning may be stored in an external storage medium such as a memory card. With this arrangement, the contents of the learning are used in another image forming apparatus that has the same function.

Moreover, among a plurality of image forming apparatuses, respective image-quality condition setting means or respective parameter setting means, which have the same function, may be connected to each other. This arrangement makes it possible for those image forming apparatuses to share the same contents of learning.

Furthermore, the image-quality condition setting means or the parameter setting means may be divided into a basic-learning operation means and a difference-learning operation means. The basic-learning operation means preliminarily learns the standard relationship between image information and conditions on image quality (or parameters), and calculates the conditions on image quality (or the parameters) based on the contents of the learning. The difference-learning operation means recognizes the difference between an output from a basic-learning operation means and a condition on image quality inputted from the image-quality condition input means as difference teaching data, and learns the relationship between the difference teaching data and the image information. Upon forming an image, the conditions on image quality or the parameters can be set by adding the results of the operations that have been performed in the basic-learning operation means and the difference-learning operation means, based on the image information.

With this arrangement, values that have been learned in accordance with the user's tastes are added to the basic conditions on image quality or to the basic parameters. For this reason, even in the case of having only a few times of learning, the basic setting on image quality can be provided. Thereafter, as the learning is repeated, the image quality thus set gradually comes to fit the user's tastes.

For a fuller understanding of the nature and advantages of the invention, reference should be made to the ensuing detailed description taken in conjunction with the accompanying drawings.

BRIEF DESCRIPTION OF THE DRAWINGS

FIG. 18 is a flow chart showing a sequence of procedures that are carried out in a copying process after learning has been taken by the first processing system of FIG. 15.

FIGS. 43(a) through 43(d) show characteristics of respective processes in an image forming operation which are required for compensation for image quality in a conventional copying machine: FIG. 43(a) is a graph showing a characteristic between document density and the amount of exposure light; FIG. 43(b) is a graph showing a characteristic between charging electric potential and the amount of exposure light; FIG. 43(c) is a graph showing a characteristic between charging electric potential and toner density; and FIG. 43(d) is a graph showing a characteristic between document density and toner density.

DESCRIPTION OF THE EMBODIMENTS

Neurocomputer

Figure 1:
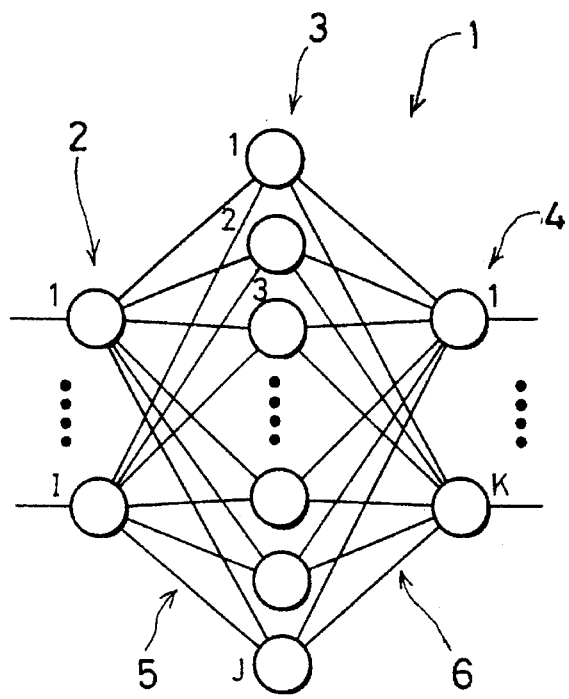
FIG. 1 is an explanatory drawing which shows a basic configuration of a neurocomputer to be used in the first through fourth embodiments of the present invention.
Figure 2:
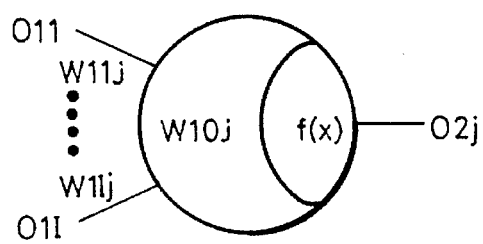
FIG. 2(a) is an explanatory drawing which shows a unit in a hidden layer of the neurocomputer of FIG. 1.
FIG. 2(b) is an explanatory drawing which shows a unit in an output layer of the neurocomputer of FIG. 1.
Figure 2:
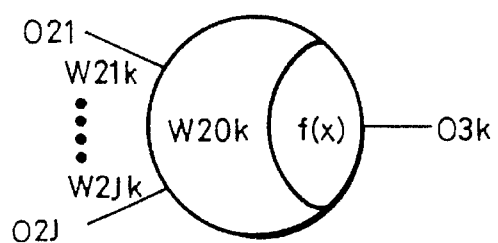

In the first through fourth embodiments of the present invention, a neurocomputer as shown in FIG. 1 is adopted. Here, prior to the explanations of the respective embodiments, an explanation will be given on a neurocomputer 1 concerning its configuration, operations, and method of learning, by reference to FIGS. 1 through 6.

As shown in FIG. 1, the neurocomputer 1, which is of the normal perceptron type, has a three-layer configuration including an input layer 2, a hidden layer 3 and an output layer 4.

The input layer 2, which is made of units the number of which is indicated by I, receives values or the like that have been measured by sensors, and releases the inputted values, as they are, to the hidden layer 3. The hidden layer 3 is made of units which have the same structure as those of the input layer 2, and the number of which is indicated by J. Those respective units are connected to the respective units of the input layer 2 through a connecting section 5 which has an inherent weight. Here, the respective units of the hidden layer 3 are not connected to one another. The output layer 4 is made of units which have the same structure as those of the hidden layer 3, and the number of which is indicated by K. Those respective units are connected to the respective units of the hidden layer 3 through a connecting section 6 which has an inherent weight.

FIG. 2(a) shows a j-numbered unit of the hidden layer 3. The output value O2j of this unit is determined by the output value O1i of an i-numbered unit of the input layer 2, a weight W1ij between the i-numbered unit of the input layer 2 and the unit in question, and a threshold value W10j, and is represented by the following equation.

$$O2j = f\left( \sum_{i=1}^{I} (O1i \times W1ij) - W10j \right) \quad (2)$$

Figure 3:
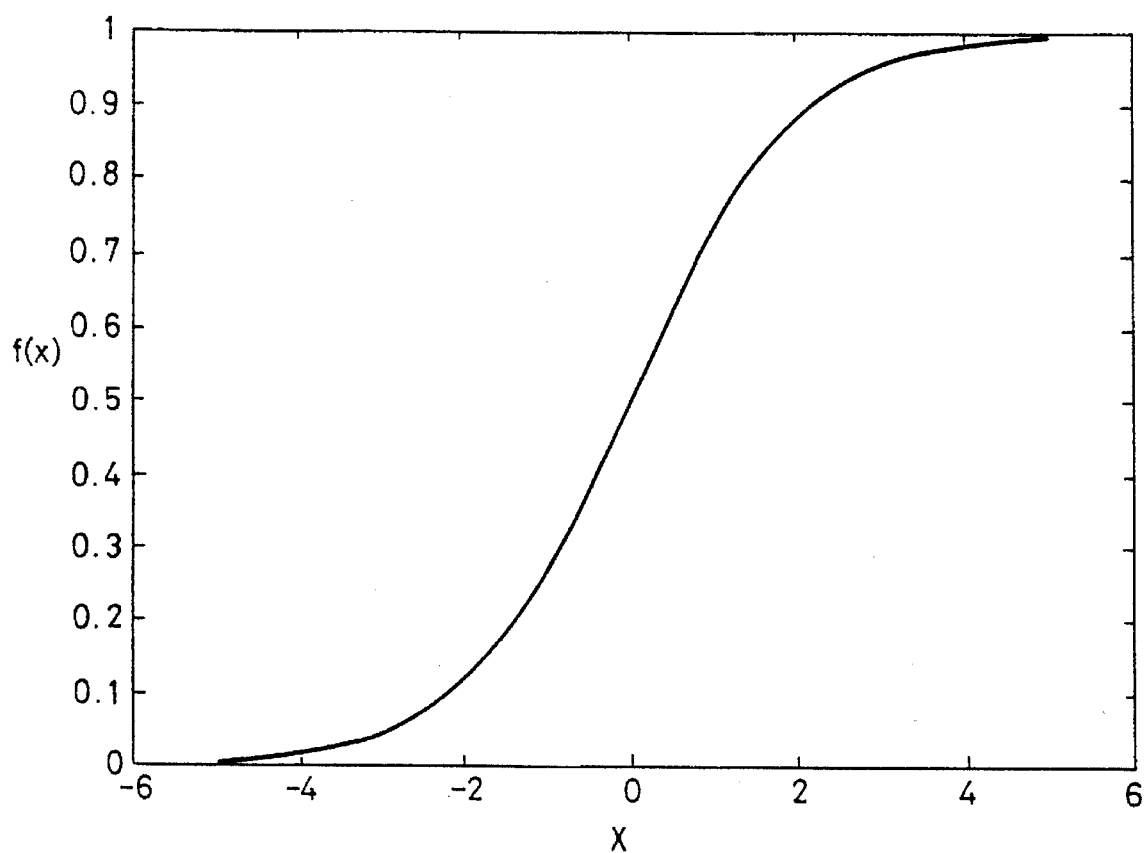
FIG. 3 is a graph showing a sigmoidal function that is used for calculating respective output values of the hidden layer and the output layer of the neurocomputer of FIG. 1.

Here, f in the above equation is a sigmoidal function shown in FIG. 3, which is a non-linear function that is used for determining the input/output characteristic of the neurocomputer 1. The sigmoidal function is represented by the following equation.

$$f(X) = 1/(1 + exp(-x)) \quad (3)$$

FIG. 2(b) shows a k-numbered unit of the output layer 4. The output value O3k of this unit is determined by the output value O2j of a j-numbered unit of the hidden layer 3, a weight W2jk between the j-numbered unit of the hidden layer 3 and the unit in question, and a threshold value W20k, and is represented by the following equation.

$$O3k = f\left( \sum_{j=1}^{J} (O2j \times W2jk) - W20k \right) \quad (4)$$

Figure 4:
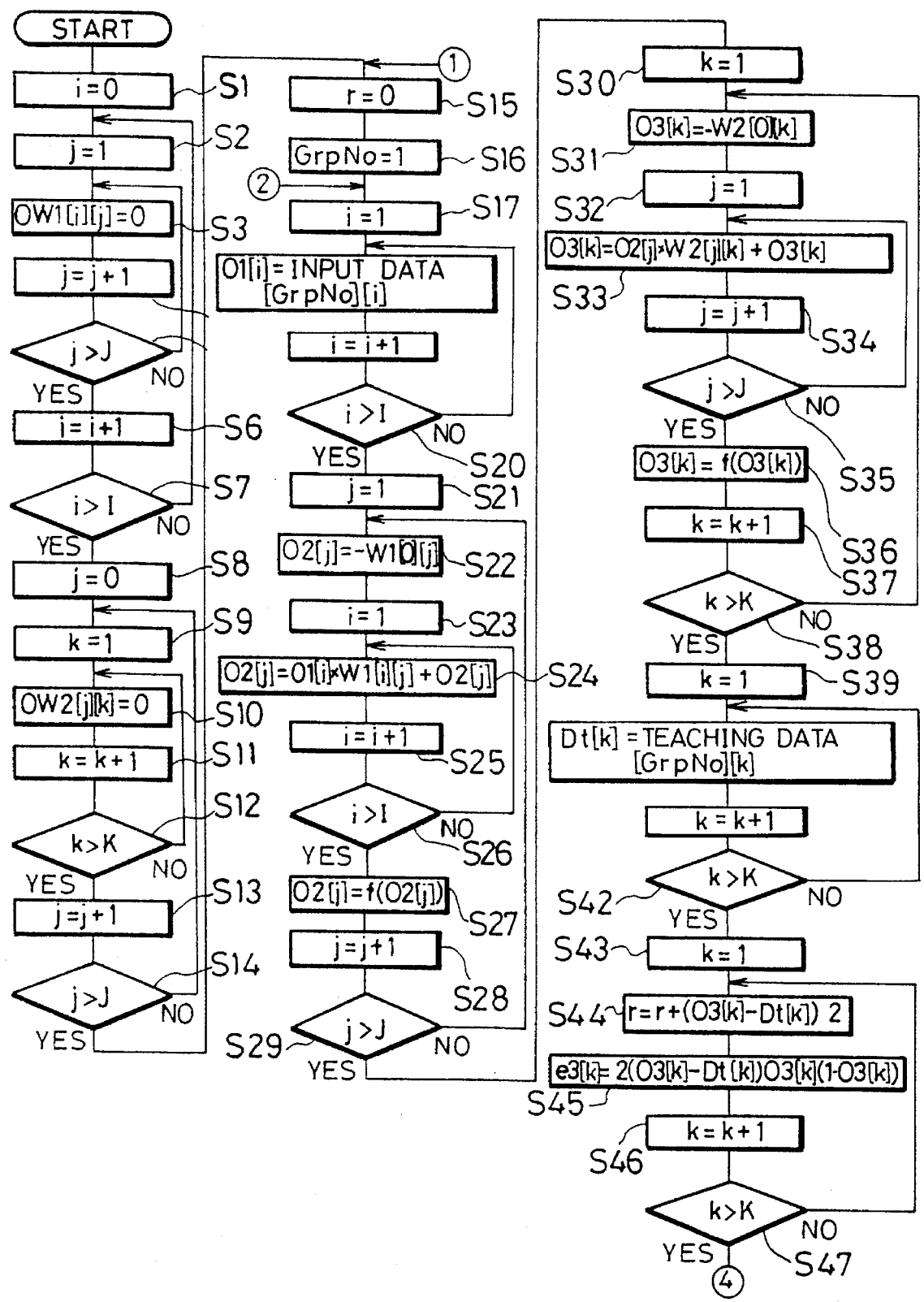
FIG. 4 is a flow chart showing a processing sequence that is carried out during learning in the neurocomputer of FIG. 1.
Figure 5:
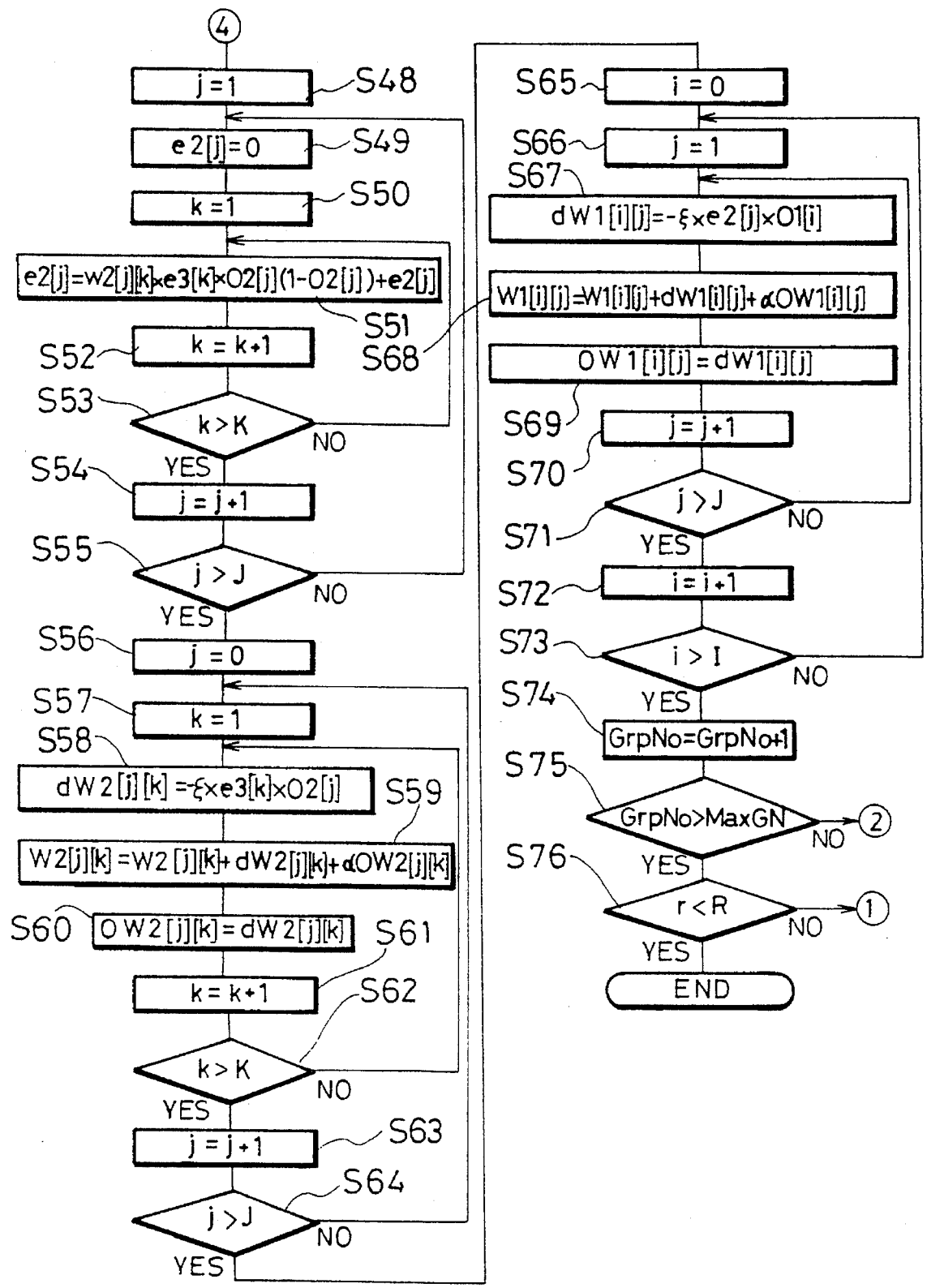
FIG. 5 is a flow chart showing a processing sequence that is carried out during learning in the neurocomputer of FIG. 1, which follows the flow chart of FIG. 4.

Next, referring to flow charts in FIGS. 4 and 5, a following description will discuss a sequence of learning procedures that are executed in the neurocomputer 1 having the above-mentioned configuration.

Here, data the number of which is indicated by I are given to I units of the input layer 2 as input data, and data the number of which is indicated by K are given to units of the output layer 4 as teaching data. Thus, combinations of data, the number of which is indicated by MaxGN and which are made up of data the number of which is indicated by K with respect to data the number of which is indicated by I, are obtained. Here, suppose that a certain relationship exists between the data the number of which is indicated by I and the data the number of which is indicated by K. Further, the weights of the connecting sections 5 and 6 are given as random values at the initial stage, and determined by learning that is carried out on the computer by the use of data, etc. preliminarily obtained through experiments.

Firstly, the unit number i of the input layer 2 is set to 0 (S1), and the unit number j of the hidden layer 3 is set to 1 (S2). The variable OW1, which is used for retaining the amount of correction with respect to the weight of the connecting section 5 for one generation, is cleared for each of the unit numbers i and j (S3).

Additionally, the variable OW1 is maintained in a work memory, such as for example a TempRAM 76 (see FIG. 28) in the second embodiment which will be described later. This work memory is installed separately from the memory wherein the weights are stored. Further, OW1[0][j] are areas for use in retaining the amounts of correction of threshold values that the respective units of the hidden layer 3 (hereinafter, referred to as hidden units) have. These areas are also allocated to the work memory.

Next, j is added by 1 (S4), and a judgement is made as to whether or not j has exceeded the total unit number J of the hidden layer 3 (S5). If j is not more than J, the sequence returns to S3, while if j exceeds J, i is added by 1 (S6). Further, a judgement is made as to whether or not i exceeds the total unit number I of the input layer 2 (S7). If i is not more than I, the sequence returns to S2, while if i exceeds I, it is recognized that the clearing of OW1 has been completed on the respective units of the input layer 2 and the hidden layer 3.

In the following processing, as with the above-mentioned processing, the clearing of the variable OW2, which is used for retaining the amount of correction with respect to the weight of the connecting section 6 for one generation, is performed on the respective units of the hidden layer 3 and the output layer 4 (S8 through S14).

In addition, the variable OW2 is maintained in the work memory in the same manner as the variable OW1. Further, OW2[0][k] are areas for use in retaining the amounts of correction of threshold values that the respective units of the output layer 4 (hereinafter, referred to simply as output units) have. These areas are also allocated to the work memory.

Thereafter, the error-storage-use variable r, which is used for determining the completion of the learning, is initialized to 0 (S15), and GrpNo, which indicates the combination number of measured data, is initialized to 1 (S16). After completion of the initialization, i is set to 1 (S17), the data indicated by GrpNo is inputted to the respective units of the input layer 2 (hereinafter, referred to simply as input units) (S18).

Further, i is added by 1 (S19), and a judgement is made as to whether or not i has exceeded I (S20). If i is not more than I, the sequence returns to S18, while if i exceeds I, it is recognized that the data inputting has been completed on all the input units.

After completion of the data inputting, a process wherein the output value from each hidden unit is found based on the equation (2) is performed. In this process, j is first set to 1 (S21), the output value O2j of the first hidden unit is set to $-W1[0][j]$ (which is the threshold value of the J-numbered hidden unit) (S22). Here, i is again set to 1 (S23), and a value obtained by adding the output value found in the above-mentioned process to the product between O1[i] and W1[i][j] are defined as new output values of the respective hidden units (S24).

Further, i is added by 1 (S25), and a judgement is made as to whether or not i has exceeded I (S26). If i is not more than I, the sequence returns to S24, while if i exceeds I, it is recognized that all the output values of the first hidden units have been found based on the output values from the respective input units.

Next, a calculating process is performed by using the sigmoidal function of the equation (3) by the use of O2j obtained at S24 as parameters (S27). Then, j is added by 1 (S28), and a judgement is made as to whether or not j has exceeded J (S29). If j is not more than J, the sequence returns to S22, while if j exceeds J, it is recognized that the output values of all the hidden units up to the J-numbered one have been found.

After the output values of the respective hidden units have been found, the outputs of all the output units up to the K-numbered one are found in accordance with the equation (4) in the same manner as described above (S30 through S38). In addition, W2[0][k] at the process S31 is a threshold value of the k-numbered output unit.

After completion of the above processing, the current output data that correspond to the input data are inputted to the respective output units as teaching data (Dt) (S39 through S42).

Next, k is set to 1 (S43), square errors are calculated between the values obtained from the output layer 4 and the teaching data in relation to the respective output units, and each result is added to r, thereby forming a newly obtained r (S44). Then, the error e3[k] for correcting the Weight of the connecting section 6 is found in accordance with the equation (5) with respect to each output unit (S45 through S47).

$$e3[k]=2\times(O3[k]-Dt[k]\times O3[k]\times(1-O3[k]) \quad (5)$$

where $k=1 \ldots K$.

Similarly, the error e2[j] for correcting the weight of the connecting section 5 with respect to each hidden unit is found in accordance with the equation (6) (S48 through S55).

$$e2[j] = \sum_{k=1}^{K} \{W2[j][k] \times e3[k] \times O2[j] \times (1-O2[j])\} \quad (6)$$

where $j=1 \ldots J$. Further, W2[j][k] represents a weight between the j-numbered hidden unit and the k-numbered output unit.

In the following processing, the amount of correction dW2[j][k] of the weight W2[j][k] is found in accordance with the equation (7) (S58).

$$dW2[j][k]=-\epsilon\times e3[k]\times O2[j] \quad (7)$$

Here, in the above equation, the coefficient $\epsilon$ is a minute value, which is normally set to approximately 0.1.

After dW2[j][k] has been found, the weight W2[j][k] is corrected by using this value in accordance with the equation (8)(S59).

$$W2[j][k]=W2[j][k]+dW2[j][k]+\alpha\times OW2[j][k] \quad (8)$$

Here, in the above equation, the coefficient $\alpha$ is a minute value, which is normally set to approximately the same value as $\epsilon$.

Further, the present value of dW2[j][k] is set to OW2[j][k] for use in the next calculation (S60). Following the sequence as described above, all the weights at the connecting section 6 are corrected (S56 through S64), and the weight W1[i][j] at the connecting section 5 is corrected in the same manner (S65 through S73). The calculations for this correction is executed in accordance with equations (9) and (10).

$$dW1[i][j]=-\epsilon\times e2[j]\times O1[i] \quad (9)$$

$$W1[i][j]=W1[i][j]+dW1[i][j]+\alpha\times OW1[i][j] \quad (10)$$

Then, the processes of S17 through S73 are performed on data of MaxGN combinations (S74 and S75). Thereafter, if r is less than the value R which is used for determining the completion of learning, it is assumed that the neurocomputer 1 has learned the relationship between the group of the input data and the group of the output data with respect to the teaching data (S76), thereby completing the sequence of the processes. If r is not less than R, the processes, S15 and thereafter, are repeated.

As to the neurocomputer 1 which has completed the learning as described above, an explanation will be given on a sequence of processes for outputting values that are predicted with respect to given data, by reference to a flow chart shown in FIG. 6.

Firstly, input data are set in the input units the number of which is indicated by I (S101 through S104), and the output values of the respective hidden units are calculated in accordance with the equation (2)(S105 through S113). Next, the output values of the respective output units are calculated in accordance with the equation (4) (S114 through S122). The above calculations follow the same processes of S18 through S38 in the aforementioned sequence of learning.

The neurocomputer 1, which obtained the relationship between the input data and the teaching data as the weights at the connecting sections 5 and 6 after completion of the learning, outputs a predicted value in accordance with the input/output relationship that is inherent in the teaching data in response to a proper input value. This function is almost appropriately applied to input values that have not been learned, and if the input value in question is in a proper range, an appropriate predicted value is obtained for any input value.

EMBODIMENT 1

Referring to FIGS. 7 through 11, the following description will discuss the first embodiment of the present invention. In the present embodiment, the present invention is applied to a copying machine.

Figure 7:
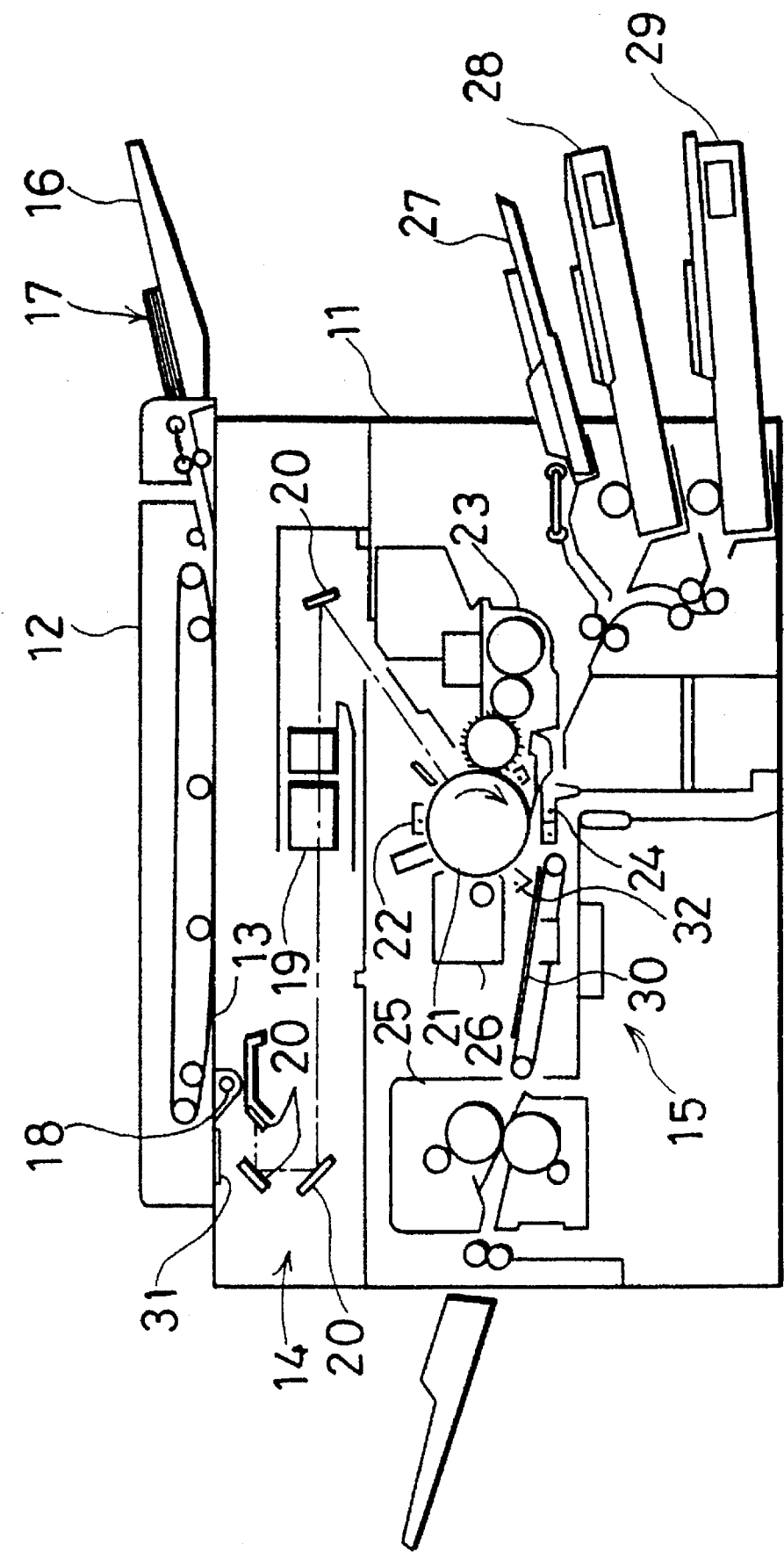
FIG. 7 is a front view showing a construction of a copying machine in connection with the first and second embodiments of the present invention.

As shown in FIG. 7, a document feeder 12 is installed on the machine main body 11 of the copying machine of the present embodiment, and a document platen 13 made of a glass table is installed under the document feeder 12. Below the document platen 13 inside the machine main body 11, are installed an exposure-use optical system 14, an electrophotographic processing section 15 and other devices in this order.

The document feeder 12 automatically sends documents 17, which are set in a document tray 16, sheet by sheet to the document platen 13. The exposure-use optical system 14 is constituted of an exposure lamp 18, a zoom lens 19 and a plurality of mirrors 20. In the exposure-use optical system 14, an exposure lamp 18, which is driven by an ac power supply, not shown, projects light onto the document 17 placed on the document platen 13, and reflected light from the document 17 is directed to a photoreceptor 21 through the zoom lens 19 and the mirrors 20.

The electrophotographic processing section 15, which functions as an image forming means, is constituted of the photoreceptor 21, a charger 22, a developing device 23, a transferring device 24, a fixing device 25, a cleaning device 26, etc.

The photoreceptor 21, which has been charged by the charger 22 prior to exposure, is arranged so that when the light from the exposure-use optical system 14 is converged to form an image, the value of resistance on the surface is lowered to release electric charge, thereby forming an electrostatic latent image. The developing device 23 forms a toner image on the photoreceptor 21 by making toner adhere to the electrostatic latent image through the difference between the electric potential applied to the inside thereof and the electric potential of the photoreceptor 21.

The transferring device 24 transfers the toner image onto a copy sheet 30 that has been sent from one of the feed cassettes 27 through 29. The fixing device 25 fuses the toner image onto the copy sheet 30 by applying heat and pressure. The cleaning device 26 removes the residual toner from the photoreceptor 21 after the transferring process.

In the vicinity of the home position of the exposure lamp 18 shown in FIG. 7, there is installed a reference document 31 for creating a reference toner image when the density of toner is measured. Further, a toner-density sensor 32 is installed in the vicinity of the paper-discharging side of the photoreceptor 21. The toner-density sensor 32 is used for optically detecting the density of the reference toner image that has been created on the photoreceptor 21 based on the reference document 31.

Figure 8:
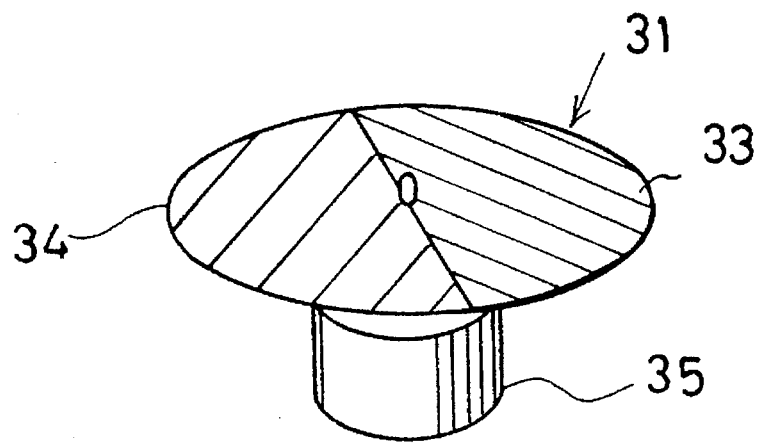
FIG. 8 is a perspective view showing a reference document that is installed in the copying machine of FIG. 7.

The reference document 31, which is made by simply arranging plates having different densities, is designed so that the density is switched. For example, the reference document 31 shown in FIG. 8 is formed in the disk shape and has density sections 33 and 34 of two types, each having a uniform, constant density. The reference document 31 is rotatively driven by a step motor 35 so as to switch the density.

Figure 9:
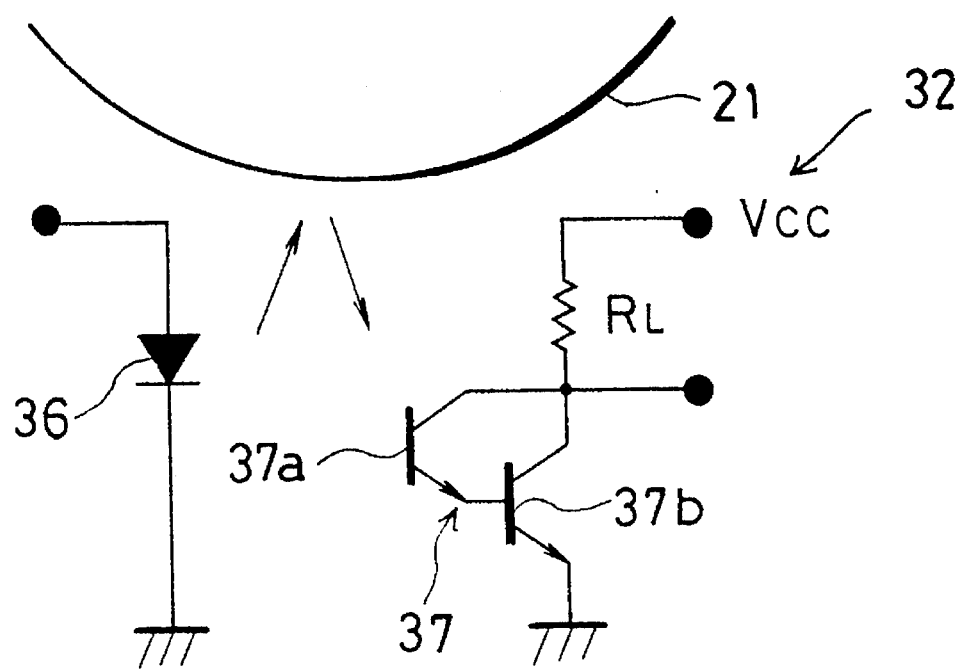
FIG. 9 is a circuit diagram showing a configuration of a toner density sensor that is installed in the copying machine of FIG. 7.

As shown FIG. 9, the toner-density sensor 32, which functions as a density-detection means, is a sensor of reflection type which is integrally constituted of a light-emitting section 36 made of a light-emitting diode and a light-receiving section 37. The light-receiving section 37 is provided with a phototransistor 37a and a transistor 37b that is darlington connected to the transistor 37a. The supply voltage, Vcc, is applied to the collectors of the phototransistor 37a and the transistor 37b, which are connected to each other, through a resistor $R_L$. The toner-density sensor 32 having the above-mentioned arrangement receives light reflected from the photoreceptor 21, which is derived from the light released from the light-emitting section 36, at its light-receiving section 37, and releases an electric signal in accordance with the amount of the reflected light.

Next an explanation will be given on the control system of the present copying machine.

Figure 10:
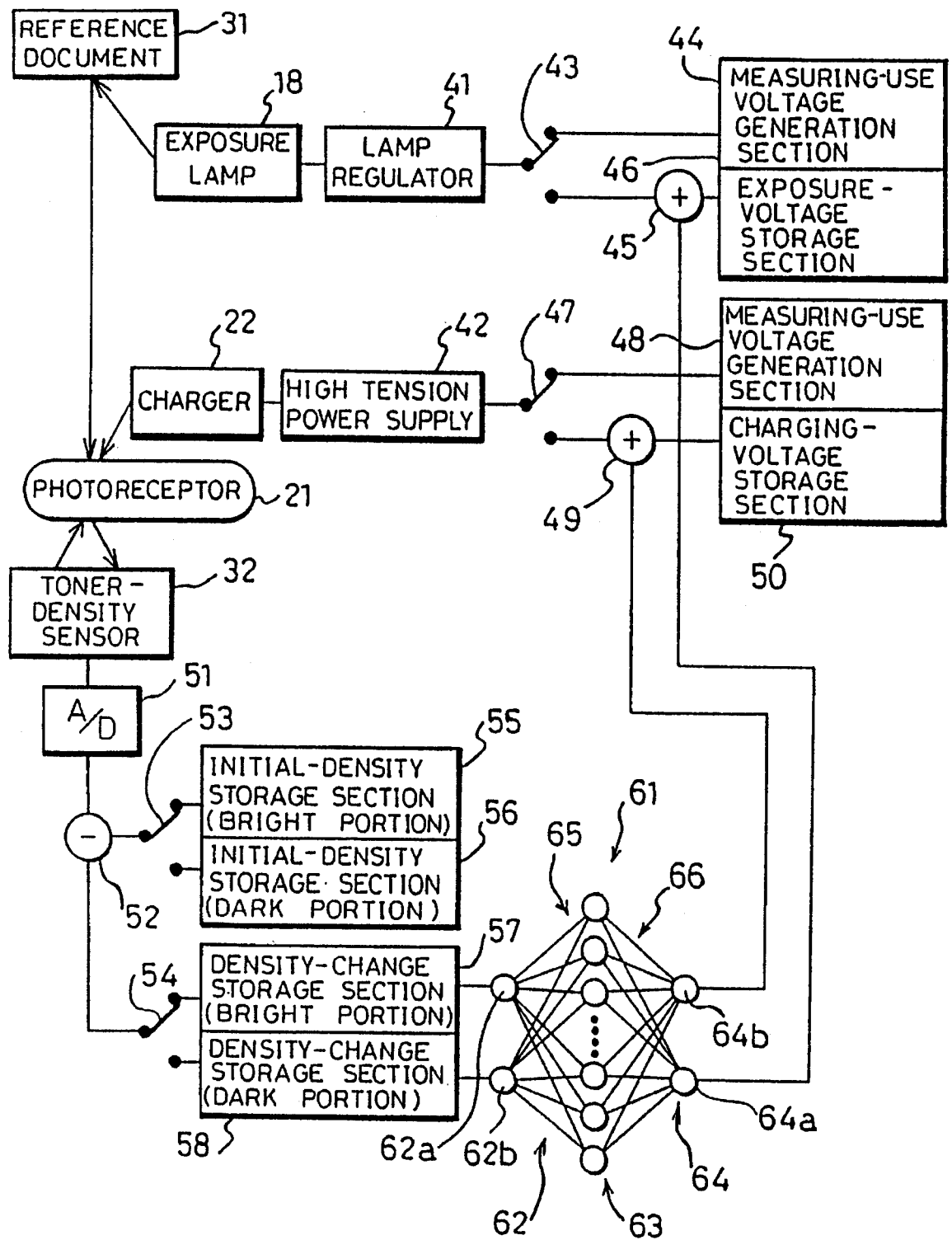
FIG. 10 is a block diagram showing a control system of the copying machine in connection with the first embodiment of the present invention.

As illustrated in FIG. 10, this control system is arranged to control the charging voltage of the charger 22 by changing the output voltage of a high-tension power supply 42 as well as controlling the exposure voltage of the exposure lamp 18 by changing the applying time of voltage in the ac waveform by the use of an exposure-lamp regulator 41.

The exposure-lamp regulator 41 receives an output of a measuring-use voltage generation section 44 or an output of an adder 45, which is selected by a switch 43. The measuring-use voltage generation section 44 generates an exposing voltage for use in measuring the toner density. The adder 45 adds the amount of compensation for the exposure voltage that is released from the neurocomputer 61, which will be described later, to the exposure voltage that is stored in an exposure-voltage storage section 46. The exposure-voltage storage section 46 is arranged to store the exposure voltage upon copying operation after it has been subjected to compensation for deviations due to the individual copying machine.

The high-tension power supply 42 receives an output of a measuring-use voltage generation section 48 or an output of an adder 49, which is selected by a switch 47. The measuring-use voltage generation section 48 generates a charging voltage for use in measuring the toner density. The adder 49 adds the amount of compensation for the charging voltage that is released from the neurocomputer 61 to the charging voltage that is stored in a charging-voltage storage section 50. The charging-voltage storage section 50 is arranged to store the charging voltage upon copying operation after it has been subjected to compensation for deviations due to the individual copying machine.

In the present copying machine, as described earlier, an electrostatic latent image of the reference document 31 is formed on the photoreceptor 21 by the light that has released from the exposure lamp 18 and has reflected from the reference document 31. Then, the electrostatic latent image of the reference document 31 is developed into a toner image, and the density of this toner image is detected by the toner-density sensor 32.

An A/D convertor (shown as A/D in the drawing) 51 is connected to the toner-density sensor 32, and a subtracter 52 is installed at the following step of the A/D convertor 51. Switches 53 and 54 are connected to the subtracter 52. The switch 53 selects one of initial-density storage sections 55 and 56, and connects it to the subtracter 52. The switch 54 selects one of density-change storage sections 57 and 58, and connects it to the subtracter 52. Further, the neurocomputer 61 is connected to the density-change storage sections 57 and 58.

The A/D convertor 51 converts the density of the toner image (hereinafter, referred to as reference toner image) that has been created based on the reference document 31 to digital form. The initial-density storage sections 55 and 56, which function as initial-density storage means (first and second initial-density storage sections), are memories for respectively storing the density data of the bright portion and the density data of the dark portion of the reference toner image, which have been measured when the photoreceptor 21 and other devices are in the initial state.

The subtracter 52 is arranged to find the amount of change in density from the initial state by calculating the differences between the density data (bright portion and dark portion) of the toner image (hereinafter, referred to as comparative toner images), which are measured on demand, and the density data that are stored in the initial-density storage sections 55 and 56. Therefore, the subtracter 52 functions as a density-change detection means. The density-change storage sections 57 and 58, which function as density-change storage means (first and second density-change storage sections), are memories for storing the data of the amount of change in density that have been found by the subtracter 52.

The neurocomputer 61, which functions as an image-quality compensating means and which is of the perceptron type having three layers, is arranged based on the aforementioned neurocomputer 1. The neurocomputer 61 founds the amount of compensation for the exposure voltage, which is to be given to the adder 45, and the amount of compensation for the charging voltage, which is to be given to the adder 49, by performing calculations based on the data of the amount of change in density that have been stored in the density-change storage sections 57 and 58.

Additionally, in order to construct the neurocomputer 61, instead of using LSIs, etc., exclusively used to construct it, it may be constituted by, for example, programming microprocessors, etc. that are generally used.

An input layer 62 of the neurocomputer 61 is constituted of two units 62a and 62b. Output values of the density-change storage sections 57 and 58 are respectively inputted to the units 62a and 62b as input data. Further, an output layer 64 of the neurocomputer 61 is constituted of two units 64a and 64b. The neurocomputer 61, which has the above arrangement, is subjected to learning so that the unit 64a releases the amount of compensation for the exposure voltage and the unit 64b releases the amount of compensation for the charging voltage.

Prior to the learning of the neurocomputer 61, conditions of a few kinds, such as temperature, humidity, and the number of use, are first selected. Under these conditions, a reference toner image is formed on the photoreceptor 21 by using densities of two types provided by the reference document 31, and the amount of change in toner density from the initial state is measured by the toner-density sensor 32. At this time, the image forming process is carried out with the exposure voltage and the charging voltage given as predeterminately fixed voltages. Further, simultaneously, the amounts of compensation for the exposure voltage and the charging voltage which are required for obtaining a best-suited image quality of copying are found by performing actual copying processes. Then, by using these amounts of compensation as teaching data, the final weights of the connecting sections 65 and 66 are obtained through the learning on the computer that is carried out following the sequence of flow charts shown in FIGS. 4 and 5.

In the present copying machine which has the neurocomputer 61, the toner density is once measured when the photoreceptor 21, etc. are in the initial state, and the density is stored in the initial-density storage sections 55 and 56. Thereafter, the density of toner is measured on demand, and the amount of change in density from the toner density in the initial state is stored in the density-change storage sections 57 and 58. The neurocomputer 61 of the present embodiment, which releases a predicted value in accordance with the sequence shown in FIG. 6, conducts the learning in such a manner that the output value of the unit 64a represents the amount of compensation for the exposure voltage and that the output value of the unit 64b represents the amount of compensation for the charging voltage.

Figure 11:
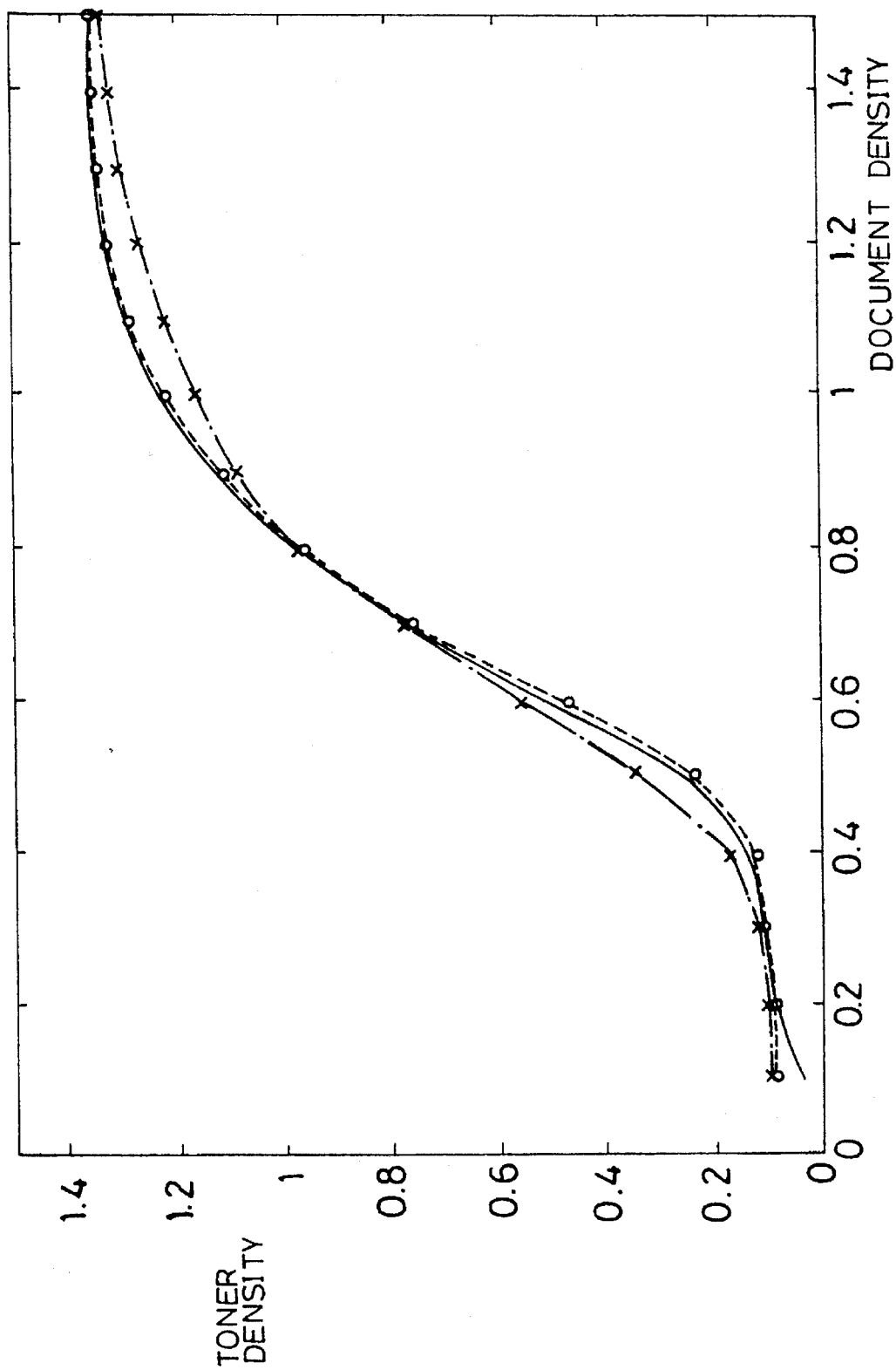
FIG. 11 is a graph which shows a characteristic of toner density in relation to document density and wherein a characteristic, which is obtained by simulator experience in the case of using the copying machine in the first embodiment of the present invention while taking account of its initial characteristic, is compared with a characteristic obtained by simulator experience in the case of using a conventional copying machine.

Therefore, the voltage stored in the exposure-voltage storage section 46 is compensated for by the amount of compensation for the exposure voltage, and the amount of exposure is thus controlled appropriately. Further, the voltage stored in the charging-voltage storage section 50 is compensated for by the amount of compensation for the charging voltage, and the charging electric potential of the photoreceptor 21 is thus controlled appropriately. The characteristic of document density versus toner density that is provided by the above control is indicated by symbols "o" as shown in FIG. 11 in accordance with simulator experience, and these symbols form a curve, which is connected by a broken line. This characteristic is very close to the initial characteristic that is indicated by a solid line.

As described above, the present embodiment makes it possible to control the exposure characteristic and the charging characteristic most appropriately by the use of the neurocomputer 61, thereby always maintaining the image quality of copying in a good condition. Further, in the present embodiment, the compensation is carried out based on the measured density of the reference toner image. Therefore, only the sensor required is the toner density sensor 32; this makes it possible to decrease the number of sensors in comparison with the controlling method wherein the compensation is carried out while measuring the ambient conditions such as temperature and humidity. Moreover, the arrangement of the present embodiment compensates for the exposure voltage and the charging voltage through the learning of the neurocomputer 61 that is made based on the reference toner density. Therefore, changes in the amount of exposure and the charging voltage of the photoreceptor 21 that are caused by stain in the exposure lamp 18 and the charger 22 are also settled by the compensation, thus making it possible to perform the optimum control on the image quality.

Additionally, in the present embodiment, the exposure voltage and the charging voltage are used as controlled values; however, the present embodiment is not limited to this arrangement, and for example, the developing bias voltage may be used as a controlled value. Further, the combinations of these control values may be selected depending on performance or other factors of individual copying machines, and are not limited to the combinations of the present embodiment.

EMBODIMENT 2

Figure 12:
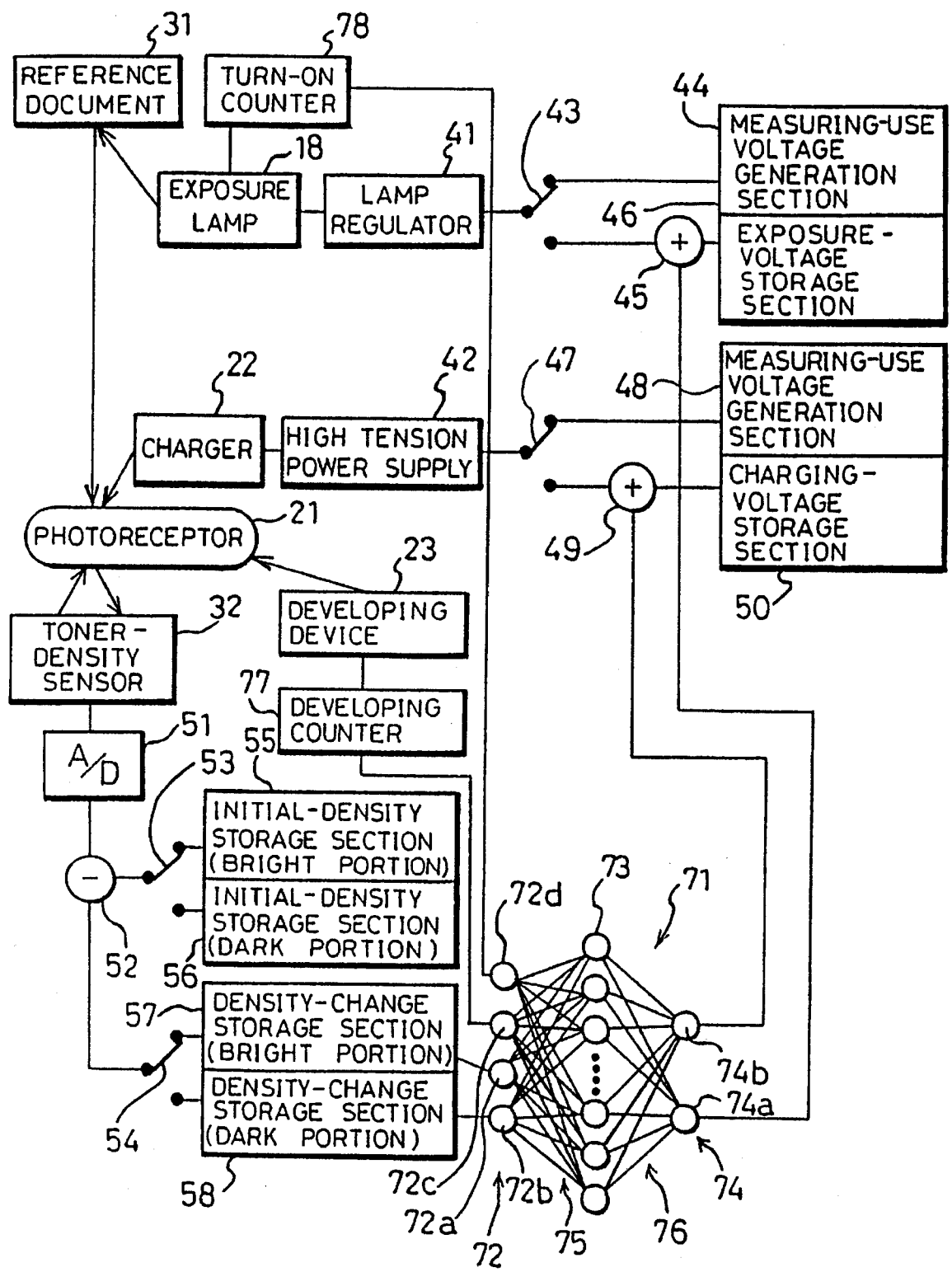
FIG. 12 is a block diagram showing a control system of the copying machine in connection with the second embodiment of the present invention.

Referring to FIGS. 7 and 12, the following description will discuss the second embodiment of the present invention. Here, those members that have the same functions and that are described in embodiment 1 are indicated by the same reference numerals and the description thereof is omitted.

As shown in FIG. 7, the copying machine of the present embodiment has basically the same construction as the copying machine of embodiment 1. Further, as with the copying machine described in embodiment 1, the present copying machine controls the image quality by compensating for the outputs of the exposure lamp 18 and the charger 22. In addition, the present copying machine includes the number of accumulated operations on the image forming process as one factor for controlling the image quality.

As shown in FIG. 12, the control system of the present copying machine is provided with a developing counter 77 that is connected to the developing device 23. The developing counter 77, which functions as an operation-number counting means, is a counter which adds one to the count value every time a developing operation is performed during an electrophotographic process. The count value is utilized for indicating the number of accumulated operations. The developing counter 77 is constituted of a non-volatile memory or other memories, and is arranged to be cleared to zero by the maintenance person when the developer in the developing device 23 is exchanged for the new one.

Further, the present copying machine is provided with a neurocomputer 71 in its control system for controlling the image quality. The neurocomputer 71, which functions as an image-quality compensating means and which is of the perceptron type having three layers, is arranged based on the aforementioned neurocomputer 1.

This neurocomputer 71 is provided with an input layer 77 having three units 72a through 72c, a hidden layer 73 having a number of units, and an output layer 74 having two units 74a and 74b. The density-change storage sections 57 and 58 are respectively connected to the units 72a and 72b, and the developing counter 77 is connected to the unit 72c. Further, the adders 45 and 49 are respectively connected to the units 74a and 74b.

As with the neurocomputer 61 (see FIG. 10) in the copying machine of embodiment 1, the neurocomputer 71 compensates for the amount of compensation for the exposure voltage and the amount of compensation for the charging voltage in response to the output values of the density-change storage sections 57 and 58. In addition, the neurocomputer 71 also utilizes the count value as one factor for the compensation.

As with the case of the neurocomputer 61, when the neurocomputer 71 is subjected to the learning, the reference toner image is formed, and the amount of change in density is found between the reference toner image and the comparative toner image. Then, the learning is carried out by using the results and the count value provided by the developing counter 77 as input data, thus producing the final weights of the connecting sections 75 and 76.

As described above, in the present copying machine, the count value of the developing counter 77 is utilized as one factor for compensating for the exposure voltage and the charging voltage. This arrangement makes it possible to predict the deterioration of developer, even though it is in an indirect manner, thereby providing a more accurate compensation.

In the present embodiment, the number of accumulated operations are detected by counting the number of developing operations; yet, another counting device may be employed in place of the developing counter 77 as long as it counts the number of developing operations by the use of the number of copying operations. For example, it is proposed to use an arrangement wherein a turning-on counter 78 for counting the number of turning-on of the exposure lamp 18 is installed and the count value is utilized. As with the developing counter 77, the turning-on counter 78 is cleared to zero by the maintenance person when the developer is exchanged for new one.

Moreover, it is proposed to employ another arrangement wherein the number of inputs of the neurocomputer 71 is set to 4 and the output values of the developing counter 77 and the turning-on counter 78 are inputted thereto in a parallel manner. In this arrangement, an unit 72d, whereto the count value of the turning-on counter 78 is inputted, is provided on the input layer 72. As with the units 72a through 72c, the unit 72d is connected to the respective unit of the hidden layer 73.

Additionally, the measuring process of the toner density in the present embodiment 2 and the aforementioned embodiment 1 is carried out within a period of time, for example, from the activation of the copying machine until the temperature of the fixing device 25 reaches a predetermined temperature. This arrangement prevents the measuring process of the toner density from interrupting the original copying operation, thereby giving no adverse effects on the practical use.

EMBODIMENT 3

Referring to FIGS. 13 through 36, the following description will discuss the third embodiment of the present invention. In this embodiment, the present invention is applied to a full-color copying machine.

CONSTRUCTION AND BASIC OPERATION OF COPYING MACHINE

Figure 13:
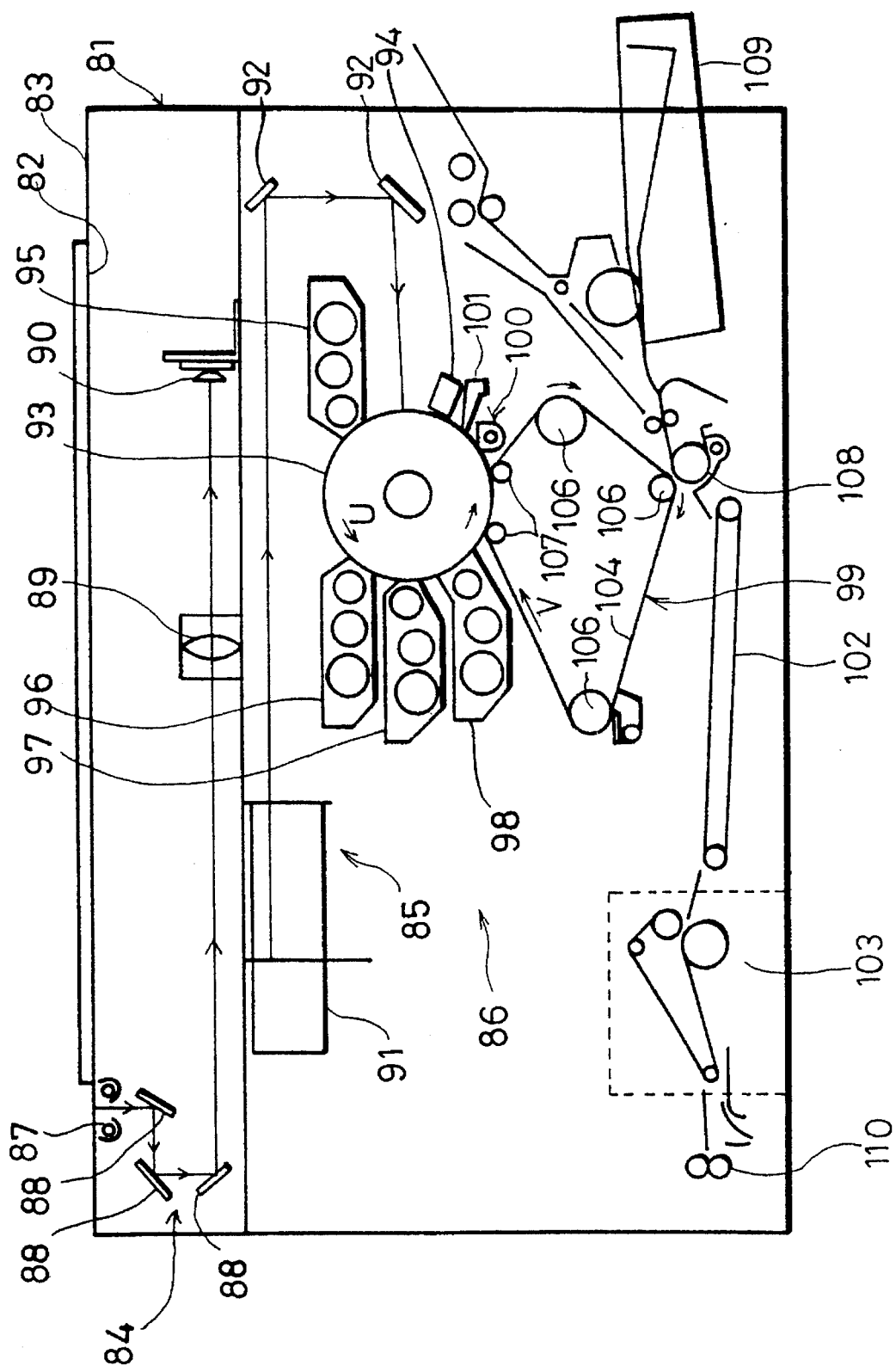
FIG. 13 is a front view showing a construction of a copying machine in connection with the third embodiment of the present invention.

As shown in FIG. 13, the copying machine of the present invention is provided with a transparent document platen 82 and an operation section 83, which will be described later in detail, that are installed on the upper surface of its machine main body 81. Below the document platen 82, are installed a reading-use optical system 84 and a reproduction-use optical system 85. Below the reading-use optical system 84, is installed a copying process section 86 as an image forming means.

The reading-use optical system 84 is provided with an exposure lamp 87, a plurality of mirrors 88, a lens unit 89, and a CCD sensor 90. The reproduction-use optical system 85, which is installed below the reading-use optical system 84, is provided with a laser driver unit 91 and mirrors 92.

In the reading-use optical system 84, when a document (not shown) placed on the document platen 82 is irradiated by light that is released from the exposure lamp 87, the reflected light from the document is directed by the mirrors 88, for example, as indicated by an arrow in the drawing, and reaches the CCD sensor 90 through the lens unit 89. The reflected light is converted into electric signals representative of the respective color components, red, green and blue, by the CCD sensors 90. The reading-use optical system 84 is installed so that the exposure lamp 87, the mirrors 88 and the lens unit 89 can be integrally moved so as to project light onto the image of the document. The reading-use optical system 84 is also arranged to direct the reflected light from the document to the fixed CCD sensor 90.

In the reproduction-use optical system 85, the respective electric signals released from the CCD sensor 90 are converted into laser light beams by the laser driver unit 91. Then, the laser light beam is directed to the copying process section 86 by the mirrors 92. The copying process section 86 is provided with a photoreceptor drum 93, a main charger 94, developer vessels 95 through 98, a transferring device 99, a cleaning device 100, an electrostatic eliminating lamp 101, a conveyer belt 102, a fixing section 103, etc. The photoreceptor drum 93, which has a drum shape, is rotatively driven in a direction indicated by the arrow U. On the periphery of the photoreceptor drum 93, are disposed the main charger 94, the developer vessels 95 through 98, the transferring device 99, the cleaning device 100, and the electrostatic eliminating lamp 101.

The main charger 94 is a charging device for charging the surface of the photoreceptor drum 93 prior to exposure. The developer vessel 95 houses black toner for developing the electrostatic latent image formed on the photoreceptor drum 93 into a mono-color toner image. The developer vessels 96 through 98 house toners of respective colors for developing the electrostatic latent image formed on the photoreceptor drum 93 into toner images of the respective colors, that is, yellow, magenta, and cyan.

The transferring device 99 has a transferring belt 104, three rollers 106, two first transferring rollers 107 and a second transferring roller 108.

The transferring belt 104 is pressed onto the photoreceptor drum 93 by the first transferring rollers 107, which are disposed on the back-side of the transferring belt 104, such that the color toner image formed on the photoreceptor drum 93 is transferred thereon. Further, the transferring belt 104 is supported by the rollers 106 so as to be rotated in a direction indicated by the arrow V. The second transferring roller 108 is disposed on the surface-side of the transferring belt 104 so that the toner image formed on the transferring belt 104 is transferred onto a copy sheet, not shown.

The cleaning device 100 removes the residual toner from the photoreceptor drum 93. The electrostatic eliminating lamp 101 eliminates the residual electric potential that remains in the vicinity of the surface of the photoreceptor drum 93. The conveyer belt 102, which is disposed in the periphery of the second transferring roller 108, transports the copy sheet bearing the transferred toner image. The fixing device 103 fuses the toner onto the copy sheet that has been transported thereto by the conveyer belt 102.

In the copying process section 86 that is arranged as described above, an image forming is carried out in the following sequence. First, the main charger 94 uniformly charges the surface of the photoreceptor drum 93, and the reading-use optical system 84 executes the first scanning. At this time, image signals (R, G, B) detected by the CCD sensor 90 are processed in the image processing section, not shown, to form yellow data, which are given to the laser driver unit 91.

The laser driver unit 91 releases a laser light beam representative of the yellow data, and the photoreceptor drum 93 is exposed by the laser light beam. As a result, an electrostatic latent image representative of the yellow image is formed on the photoreceptor drum 93. Then, yellow toner is supplied to the electrostatic latent image from the developer vessel 96, thereby forming a yellow toner image.

Successively, the yellow toner image is rotatively moved in a direction indicated by the arrow U, and is transferred onto the transferring belt 104 by the first transferring rollers 107. In this case, some portion of the toner remains on the photoreceptor drum 93 without being transferred therefrom; however, the residual toner is removed by the cleaning device 100. Then, the residual electric potential on the surface of the photoreceptor drum 93 is removed therefrom by the electrostatic eliminating lamp 101.

After completion of the above process, the main charger 94 uniformly charges the photoreceptor drum 93. Image signals, which are obtained by the CCD sensor 90 through the second image-reading operation, are processed in the image processing section, and given to the laser driver unit 91 as magenta data.

Thereafter, an electrostatic latent image representative of the magenta image is formed on the photoreceptor drum 93 in the same manner as described before. A magenta toner image is formed by supplying magenta toner to the electrostatic latent image from the developer vessel 97. Then, the magenta toner image is transferred onto the transferring belt 104, and is superimposed onto the yellow toner image.

Successively, the toner removing process and the electrostatic eliminating process of the photoreceptor drum 93 are carried out in the same manner as described before, and the photoreceptor drum 93 is uniformly charged. Then, image signals obtained through the third image-reading operation are converted into cyan data, thereby forming an electrostatic latent image representative of the cyan image. This electrostatic latent image is developed into a cyan toner image by cyan toner that is supplied from the developer vessel 98.

Then, the cyan toner image is superimposed onto the yellow toner image and the magenta toner image on the transferring belt 104, thereby forming a complete toner image. This toner image is transferred onto a copy sheet, which has been sent from the feed cassette 109, by the second transferring roller 108. Further, the copy sheet is transported to the fixing section 103 by the conveyer belt 102. After having been subjected to the fixing process, the copy sheet is discharged outside the copying machine by a discharge roller 110.

The sequence of processes described above is a sequence for carrying out a three-color copying operation. In the case of a four-color copying operation, a process using black toner in the black developer vessel 95 is added to the above-mentioned sequence. In the case of a mono-color copying operation, an electrostatic latent image formed on the photoreceptor 93 is subjected to the developing process of black toner, and the black toner image is transferred onto a copy sheet through the transferring belt 104.

Figure 14:
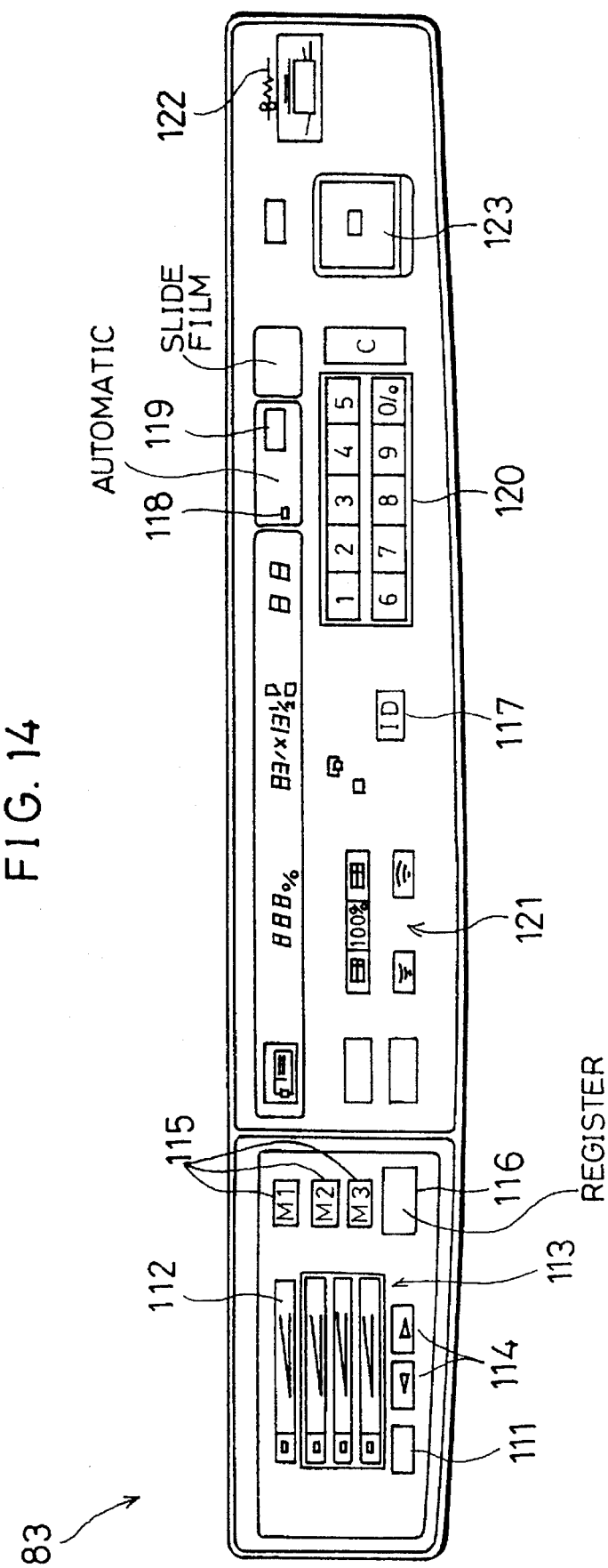
FIG. 14 is a plan view showing an operator section in the copying machine of FIG. 13.

As shown in FIG. 14, the operation section 83, which functions as an image-quality condition input means, is provided with a color-adjustment selection key 111, a copy-density scale lamp 112, a color-adjustment scale lamp 113, a density/color adjusting key 114, access/register keys (M1 through M3) 115, a register key 116, an ID key 117, etc., which are respectively used for performing the following operations:

(a) color-adjustment selection key 111: used for selecting the copy-density adjustment and the color adjustment.

(b) copy-density scale lamp 112: used for displaying the density level upon adjusting the copying density.

(c) color-adjustment scale lamp 113: used for displaying the respective adjusting levels upon adjusting the colors.

(d) density/color adjusting key 114: used for adjusting the respective levels upon adjusting the copying density and colors.

(e) access/register keys 115: used for registering or accessing the copying density and the color adjustment.

(f) register key 116: used for registering the set values of the copying density and color adjustment as well as for registering the conditions (normal/soft) of the selected image quality.

(g) ID key 117: used for registering ID numbers (which will be described later) as well as for executing copying operations in accordance with the ID numbers.

Additionally, the density adjustment is carried out with respect to every color at the same time. In contrast, the color adjustment is carried out with respect to individual colors.

In the present copying machine, the copying density and the color balance are classified into seven grades from "1" to "7" by operating the above-mentioned various keys. Thus, by operating these keys (hereinafter, referred to as panel operation), adjustments as to the copying density and the color balance are carried out depending on document images, thereby making it possible to obtain favorable copied images.

The operation section 83 is also provided with an automatic-mode display lamp 118 and an automatic-mode selection key 119. The automatic-mode display lamp 118 is a lamp which turns on when an automatic mode, which will be described later, has been selected. The automatic-mode selection key 119 is a key for turning on/off the automatic mode. In addition to those keys, the operation section 83 is provided with ten keys 120 for setting the number of copies, etc., a magnification setting key 121 for use in variable magnification copying, a jam lamp 122 for indicating the paper jam, a copy start button 123, etc.

Further, the copying machine of the present embodiment is provided with the first through tenth processing systems for automatically setting the image quality for copying. The following description will discuss each of those processing systems.

FIRST PROCESSING SYSTEM

In the present processing system as well as the other processing systems which will be described later, those components that have the same functions are indicated by the same reference numerals.

Figure 15:
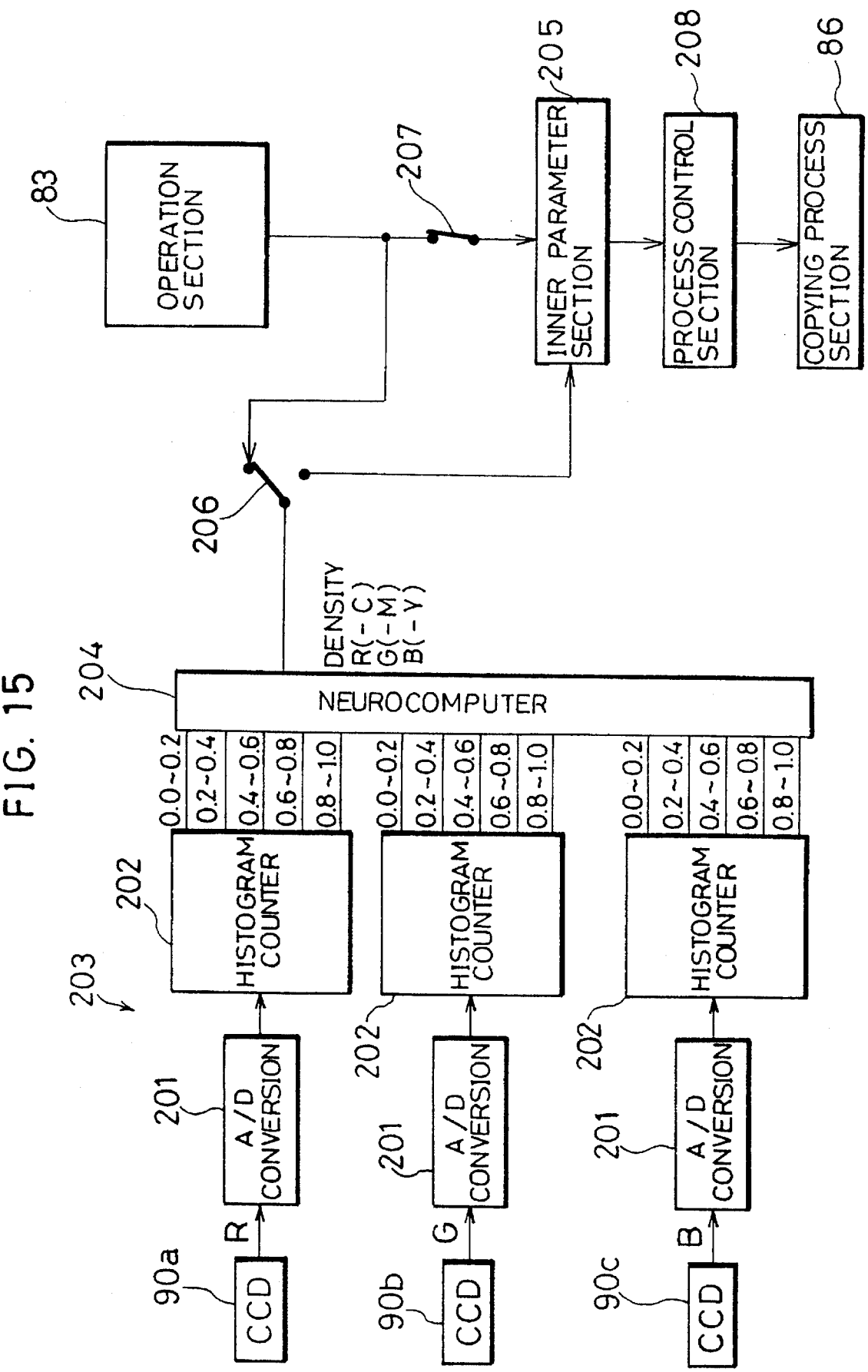
FIG. 15 is a block diagram showing the first processing system of the copying machine in connection with the third embodiment of the present invention.

As shown in FIG. 15, in the first processing system, image signals (R, G, B) that have been released by the respective three CCD sensors 90a through 90c are converted into image data (8 bits) in digital form by A/D convertors 201, and these are respectively given to histogram counters 202.

Figure 16:
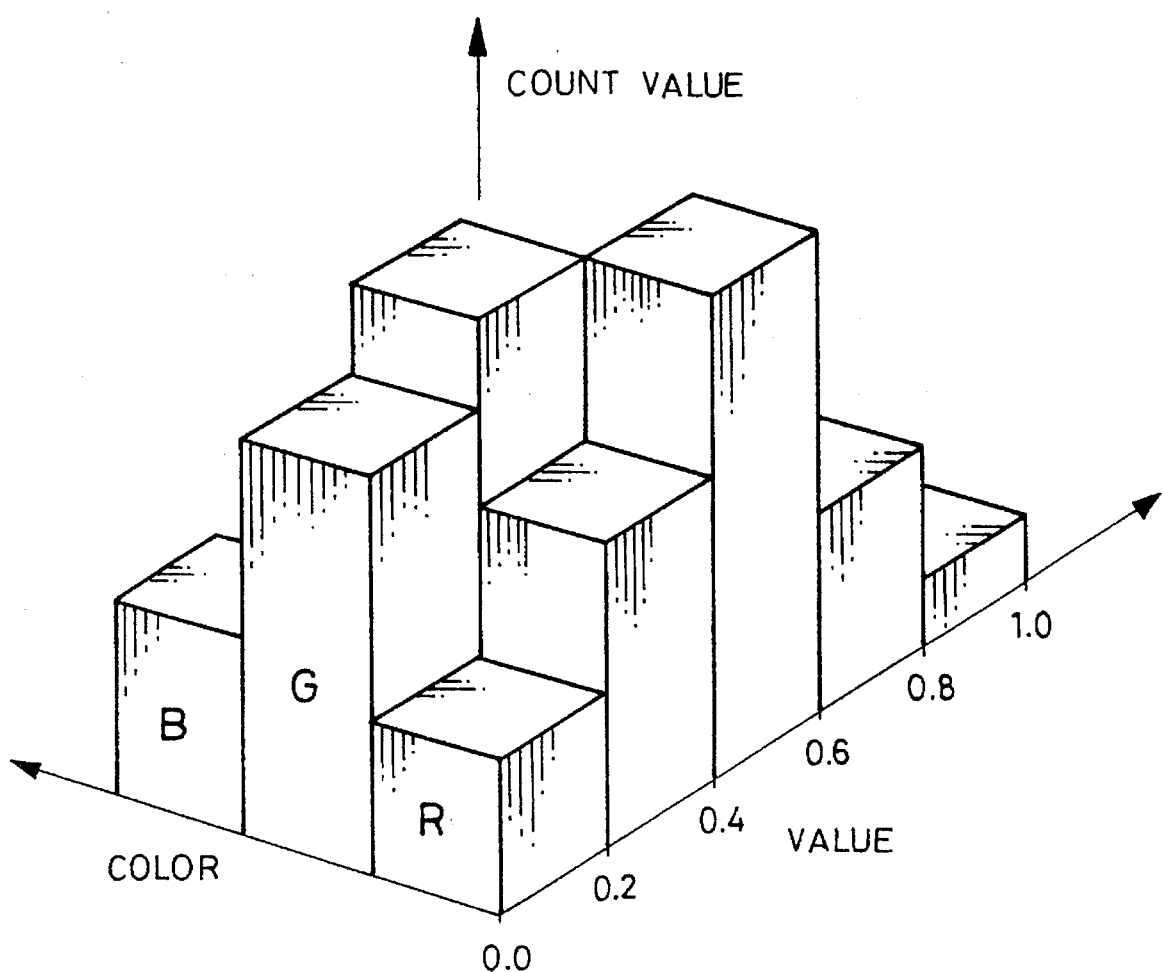
FIG. 16 is a histogram which indicates three-dimensionally the density distributions of the respective colors (R, G, B) that are found by histogram counters installed in the first through tenth processing systems of the copying machine in connection with the third embodiment of the present invention.

The histogram counters 202 conduct histogram calculating processes on the image data so that these data are distributed in their densities to every 0.2 division within a range from 0.0 to 1.0 as illustrated in FIG. 16. The histogram counters 202 create a total histogram data of fifteen including five data for each of the three colors, that is, red, green and blue, through the above-mentioned histogram calculating processes.

Figure 17:
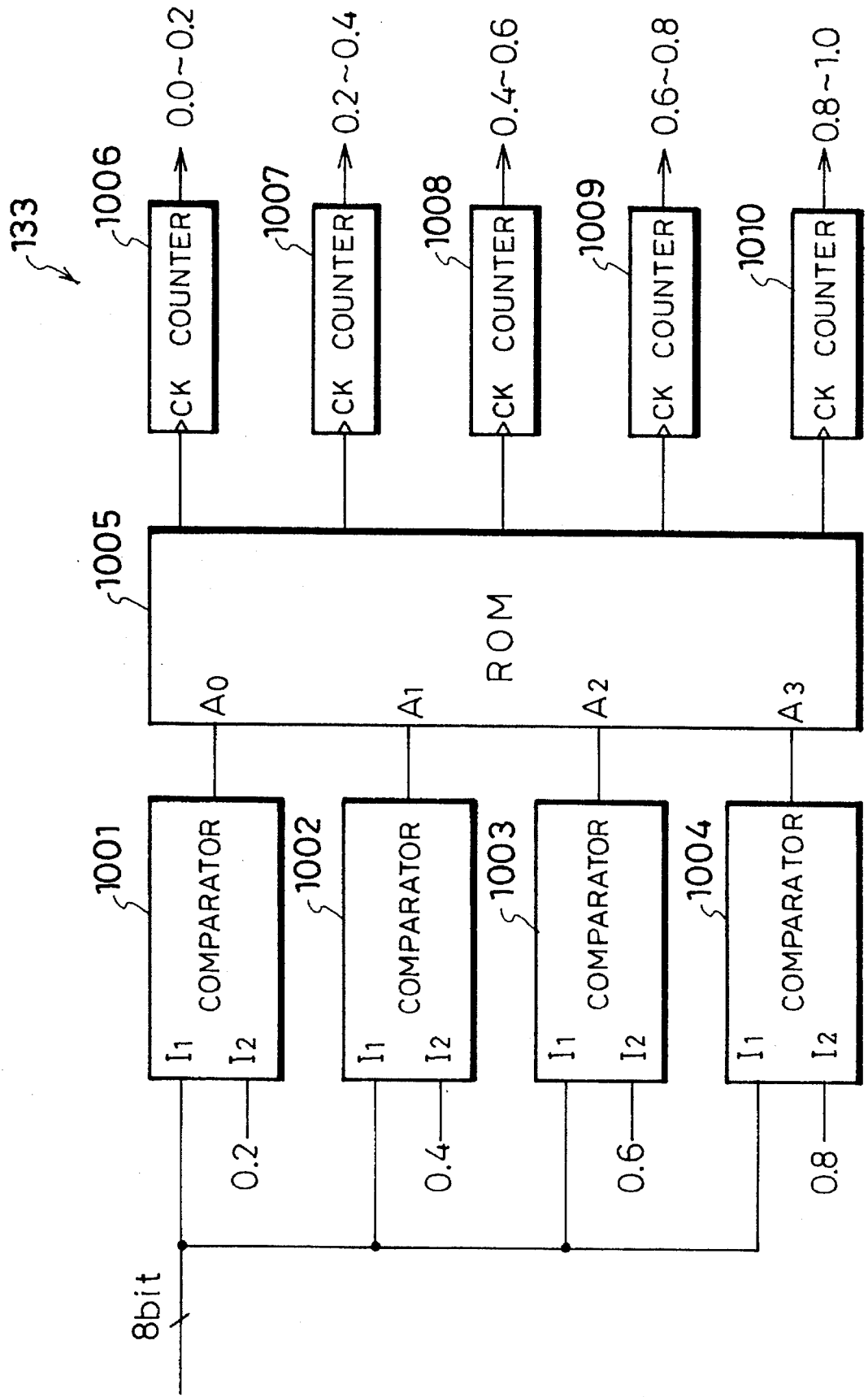
FIG. 17 is a block diagram showing a configuration of the histogram counter.

For example, as shown in FIG. 17, each histogram counter 202 is provided with comparators 1001 through 1004, a ROM 1005, and counters 1006 through 1010. Image data of 8 bits are respectively inputted to the inputs $I_1$ of the comparators 1001 through 1004 as comparative values, and digital values of 0.2, 0.4, 0.6, and 0.8 are inputted to the inputs $I_2$ thereof as reference values. The comparators 1001 through 1004 compare the comparative values with the reference values. If the comparative value in question is less than the reference value, the comparator in question releases "1", and in the other cases it releases "0".

In the ROM 1005, the outputs of the comparators 1001 through 1004 are respectively connected to address inputs $A_0$ through $A_3$, and as shown in Table 1, addresses are allocated to respective five distribution patterns of 0.0 to 0.2; 0.2 to 0.4; 0.4 to 0.6; 0.6 to 0.8; and 0.8 to 1.0. When an address is specified by respective values that have been given to the address inputs $A_0$ through $A_3$, the ROM 1005 releases "1" as a value of the distribution pattern corresponding to the address, and allows the corresponding one of the counters 1006 through 1010 to count the value. For example, if the comparative value is 0.7, only the value that is given to the address input $A_3$ becomes "1", and the value of the distribution pattern 0.6 to 0.8 that corresponds to the address "0001" thus specified becomes "1".

TABLE 1

| Distribution | Address | | | |
| Pattern | $A_0$ | $A_1$ | $A_2$ | $A_3$ |
| --- | --- | --- | --- | --- |
| 0.0 to 0.2 | 1 | 1 | 1 | 1 |
| 0.2 to 0.4 | 0 | 1 | 1 | 1 |
| 0.4 to 0.6 | 0 | 0 | 1 | 1 |
| 0.6 to 0.8 | 0 | 0 | 0 | 1 |
| 0.8 to 1.0 | 0 | 0 | 0 | 0 |

The outputs of five (distribution patterns) of the ROM 1005 are individually inputted to the clock inputs CK of the counters 1006 through 1010. In other words, the counters 1006 through 1010 count "1" inputted thereto, and release the respective count values as the histogram data corresponding to the respective distribution patterns.

With the above arrangement, each histogram counter 202 creates histogram data, and extracts features of image data for each pixel. Here, since it is reasonable to assume that the density of a document image does not change so abruptly between adjacent pixels, the histogram data need not be created for all the pixels. For example, by extracting the histogram data once every eight pixels, features of the pixel data may be roughly picked up. This arrangement will reduce the number of processes, thereby making it possible to enhance the processing speed.

In the present copying machine, image information of a document image is read out as histogram data by the use of an image-information reading section 203 which is constituted of the CCD sensors 90a through 90c, the A/D converters 201, and the histogram counters 202. In other words, the image-information reading section 203 has a function as an image-information reading means. Further, the histogram data are supplied to a neurocomputer 204 as information concerning the colors of the document image that are correlated with the image-quality data that are released from the operation section 83 through the user's instruction.

The neurocomputer 204, which functions as an image-quality condition setting means, is arranged based on the aforementioned neurocomputer 1. In the neurocomputer 204, the fifteen histogram data are inputted to the input layer, and one image-quality datum is released from the output layer as an image-quality condition. Therefore, the corresponding number of units are installed in the input layer and the output layer. Additionally, in order to construct the neurocomputer 204, instead of using LSIs, etc., exclusively used to construct it, it may be constituted by, for example, programming microprocessors, etc., that are generally used.

The neurocomputer 204 is subjected to the learning as described earlier based on the inputted histogram data and the image-quality data that have been given by the operation section 83. Upon copying, the neurocomputer 204 releases image-quality data to be supplied to an inner parameter section 205 based on the current histogram data, in accordance with the contents of the learning. The image-quality data are representative of the copying density and the color balance.

The place to which the output of the neurocomputer 204 is directed is selected by a switch 206. The switch 206 connects the neurocomputer 204 to the operation section 83 during the learning of the neurocomputer 204 as well as connecting the neurocomputer 204 to the inner parameter section 205 during copying in the automatic mode.

As described earlier, the operation section 83, which functions as the image-quality condition input means, is arranged to classify the copying density and the color balance respectively into the seven grades. More specifically, the operation section 83 releases the image-quality data of seven types, that is, 0.1, 0.2, ..., 0.7, in response to input values of the seven grades, and these image-quality data are supplied to the inner parameter section 205.

In the copying machine of the present embodiment, a mode wherein the image quality is automatically set by the use of the neurocomputer 204 is referred to as automatic mode. As described earlier, the automatic mode is selected through the operation of the automatic-mode selection key 119 on the operation section 83. In the initial state of the automatic mode, the copying density and the color balance are respectively set to "4" which corresponds to the intermediate level. Further, in the automatic mode, the weights of the neurocomputer 204 are set in order to release the image-quality data of 0.4 at its initial state.

The inner parameter section 205, which functions as a conversion means, includes a memory. When the image-quality data are inputted thereto from the operation section 83 or the neurocomputer 204, parameters that correspond to the image-quality data are released from the inner parameters stored in the memory. More specifically, in response to the image-quality data (0.1, 0.2, ..., 0.7) released from the operation section 83 through the user's instruction, the inner parameter section 205 releases as the inner parameters values that are suitable for basic control patterns on the process control during the learning of the neurocomputer 204.

In other words, although the image-quality data are values that are set with the same intervals by graduations so that the user can recognize them easily through the display on the operation section 83, these values are not suitable for the complicated process control. Therefore, it is necessary to convert the image-quality data into inner parameters that are suitable for the process control. For this reason, the above-mentioned memory has a function as a conversion table for converting the image-quality data into the inner parameters.

The operation section 83 and the inner parameter section 205 are connected and disconnected by the turning on/off of a switch 207. The switch 207 remains on during the learning of the neurocomputer 204 or during copying in the normal mode, and is turned off upon copying in the automatic mode.

A process control section 208, which functions as a control means, calculates appropriate process control values by making an addition between the inner parameters and other compensating factors, etc. as parameters for the calculation, and controls the respective sections of the copying process section 86 by using the process control values. As to the process control values, for example, the following factors are utilized: the amount of exposure in the exposure lamp 87, the charging output of the main charger 94, the bias voltages of the developer vessels 95 through 98, the transferring output of the transferring device 99, the amount of light for electrostatic elimination of the electrostatic eliminating lamp 101, etc.

The following description will discuss the operations of the first processing system having the above-mentioned arrangement during the learning.

Prior to the learning, the neurocomputer 204 is connected to the operation section 83 by the switch 206. Further, the operation section 83 is connected to the inner parameter section 205 by the switch 207.

The fifteen histogram data released from the histogram counters 202 are fed to the input of the neurocomputer 204. Further, when the image-quality data are released from the operation section 83 through the user's instruction, the image-quality data are inputted to the output of the neurocomputer 204 through the switch 206. Then, the neurocomputer 204 is subjected to the learning on the relationship between the histogram data and the image-quality data by using the image-quality data as teaching data, following the sequence that is shown in FIGS. 4 and 5.

In this case, the image-quality data are also given to the inner parameter section 205 through the switch 207. Thus, inner parameters that are suitable for the image-quality data are released from the inner parameter section 205, and given to the process control section 208. Then, process control values that have been found by the use of the inner parameters are given to the copying process section 86 from the process control section 208.

Referring to the flow chart of FIG. 18, the following description will discuss the copying operation that is carried out by the first processing system after the learning.

When the copy start button 123 is turned on, the reading-use optical system 84 first makes a preliminary scan prior to actual copying, and image information on a document image is read out by the image-information reading section 203 (S201). In this case, the exposure lamp 87 projects a light beam onto the document placed on the document platen 82. Then, the reflected light beam from the document is directed to the CCD sensor 90 through the mirrors 88 and the lens unit, and the CCD sensors 90a through 90c pick up the respective lights having individual color components (R, G, B).

Next, a judgement is made as to whether or not the automatic mode is on (S202). If it is the automatic mode, the inner parameters are automatically set by using the image information (S203).

Figure 6:
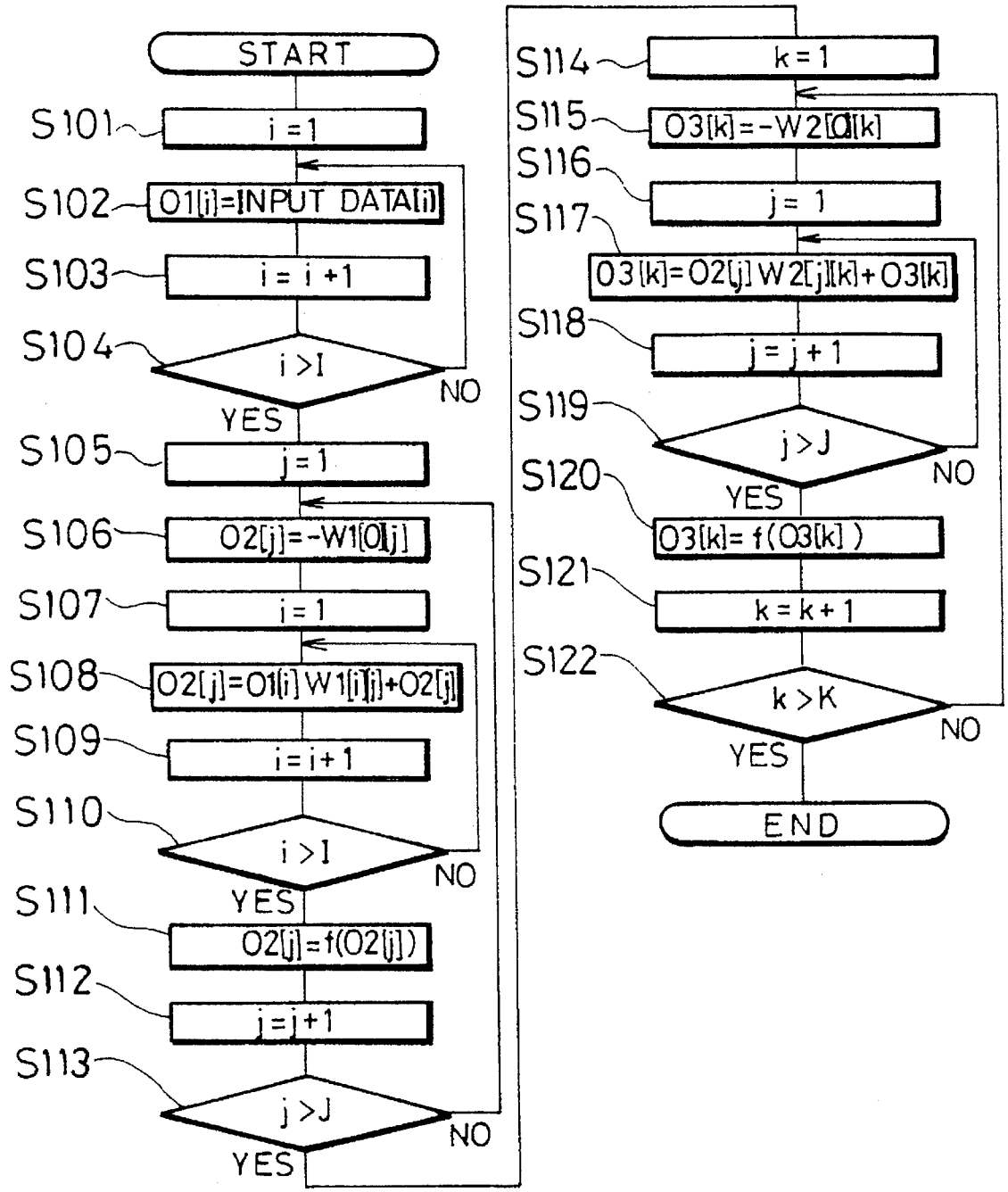
FIG. 6 is a flow chart showing a processing sequence that is carried out during operation in the neurocomputer of FIG. 1.

At this time, the neurocomputer 204 calculates image-quality data based on the image information read out by the image-information reading section 203 in accordance with the contents of the learning, following the aforementioned sequence shown in FIG. 6. Also, the neurocomputer 204 is connected to the inner parameter section 205 through the switch 206, and the switch 207 is turned off. Therefore, the image-quality data from the neurocomputer 204 is given to the inner parameter section 205.

Then, the inner parameter section 205 releases inner parameters that are suitable for the image-quality data. When the inner parameters are given to the process control section 208, the process control section 208 outputs process control values that are suitable for the inner parameters. Thus, the copying process section 86 carries out a copying operation by using the process control values (S204).

If it is not the automatic mode, the neurocomputer 204 is subjected to the learning on the relationship between the histogram data for each of R, G, and B that are obtained based on the image information and the image-quality data from the operation section 83 (S205). The learning has nothing to do with the copying operation that is carried out at S204; however, it is performed in order to repeat learning so as to obtain image quality that matches the user's tastes more suitably.

During the learning of the neurocomputer 204, since the switch 207 remains on, the image-quality data are inputted to the inner parameter section 205 from the operation section 83. Therefore, the inner parameter section 205 determines inner parameters that are suitable for the image-quality data (S206). Then, the copying process section 86 executes a copying operation based on the inner parameters (S204).

Additionally, the image-quality data that are released from the operation section 83 at S206 are standard image-quality data, which are automatically set in the initial state of the present copying machine after the power switch has been turned on, or image-quality data which are determined through an inputting operation by the user.

As described above, in the copying machine that is provided with the first processing system, when the image quality for copying is determined, the neurocomputer 204 is subjected to the learning on the relationship between the histogram data of the document image and the image-quality data corresponding to the image quality for copying that is specified by the user.

With this arrangement, upon copying, the neurocomputer 204 calculates appropriate image quality in accordance with the contents of the learning in response to the inputted image information. Thus, the image quality for copying that matches the user's tastes is automatically determined; this makes it unnecessary for the user to have troublesome tasks to input the image quality for copying for each copying operation. Further, as the frequency of use increases, the user's tastes are recognized more firmly by repeating the learning. As a result, the operability of the copying machine is enhanced, and the tasks imposed on the user and the service person may be reduced.

Moreover, by adopting the neurocomputer 204, the number of data that are processed in the present processing system is reduced to the number of connections in the connecting sections. Therefore, it is no longer necessary to provide a memory with a large capacity, which is different from the case wherein the image information and the image-quality condition are stored on a one-to-one basis.

In the setting of the image quality for copying that is made by using the neurocomputer 204, it is possible to make the amount of exposure light closer to the accurate value in comparison with the setting of the image quality for copying that is made on the one-to-one basis. As will be described hereinbelow, this will become clearer by making a comparison between the setting by the use of the neurocomputer 204 and the setting made on the one-to-one basis, with respect to the results on calculations in the amount of exposure light.

Figure 19:
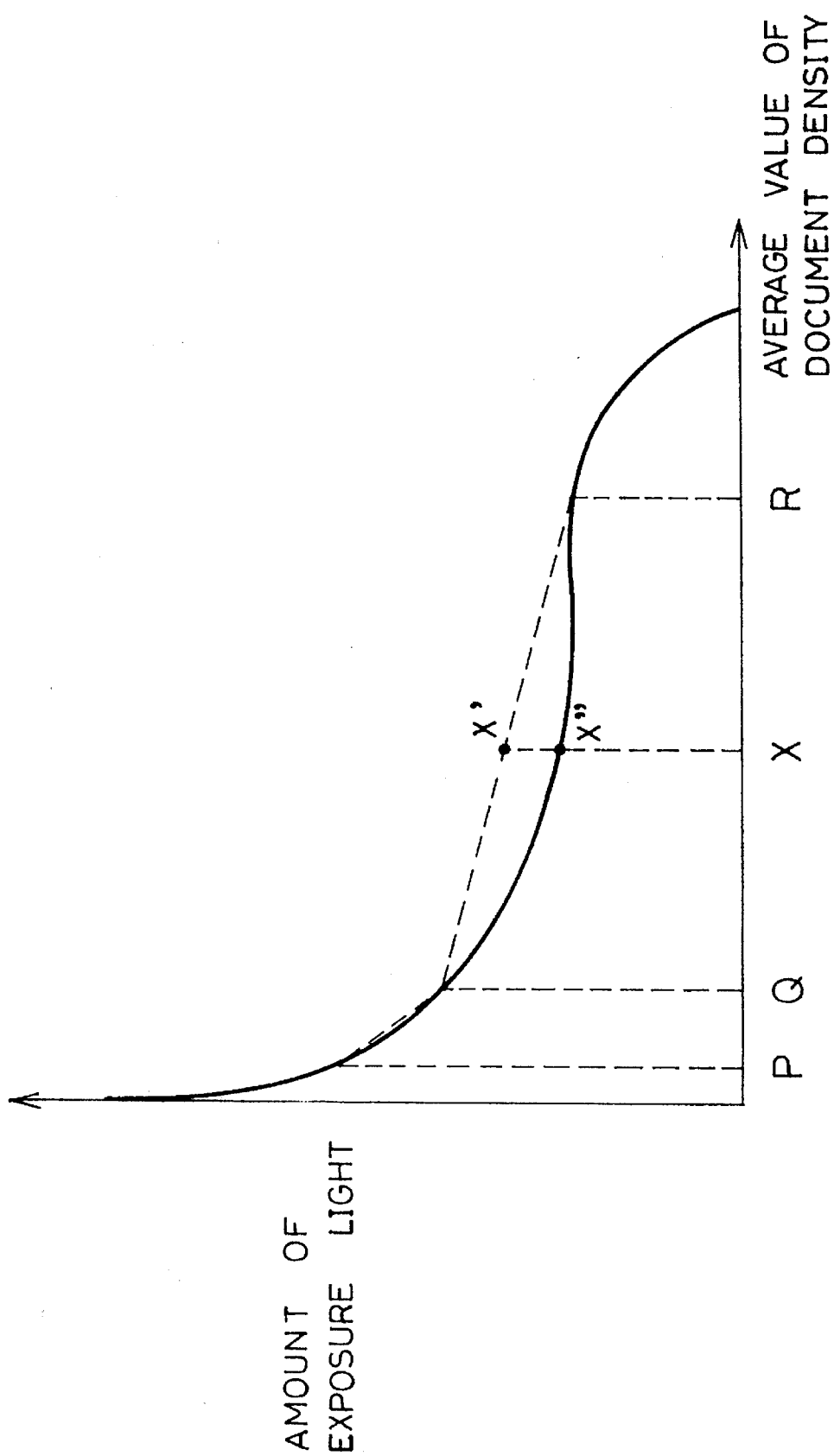
FIG. 19 is a graph showing the amount of exposure light in relation to the average value of densities with respect to a certain color in a document.

As shown in FIG. 19, suppose that the user's taste on the amount of exposure light in relation to the average value of densities in terms of a certain color on a document is represented by a solid line. Then, for example, after patterns whose average values of the document densities are respectively indicated by P, Q and R have been stored or learned through the user's instructions, a copying operation is performed on a document image whose average value of the document densities is indicated by X. In this case, in the setting made on the one-to-one basis, since only the three patterns are stored, the amount of exposure light between the patterns corresponding to Q and R is given by a value which positions on a broken line connecting these patterns. Therefore, in the setting made on the one-to-one basis, the amount of exposure light with respect to the average value of X is given by x'; this fails to make a smooth approximation along the solid line on the amount of exposure light.

Even in this case, if there are few parameters, it is possible to make x' closer to the accurate value by making an interpolation by the use of a spline function, etc. However, in the actual copying operation, there are a number of parameters, such as the amount of exposure light, the charging voltage of the photoreceptor drum 93, the bias voltage of the developer vessels 95 through 98, the transferring voltage, and the fifteen histogram data released from the histogram counters 202. For this reason, even if the setting made on one-to-one basis is used, it is difficult to make an accurate approximation on the amount of exposure light so as to cope with the user's taste. Further, in the setting made on the one-to-one basis, for many parameters, prompt data access is not available without devising the data construction for storage; this raises another problem.

In contrast, in the setting of the image quality by the use of the neurocomputer 204, it is possible to virtually approximate the amount of exposure light to the user's taste, as shown in FIG. 19, and the predicted amount of exposure light with respect to the average value X is accurately calculated, and given by x". Moreover, by adopting the neurocomputer 204, the calculations are performed instantaneously, thereby making it possible to access data promptly.

SECOND PROCESSING SYSTEM

Figure 20:
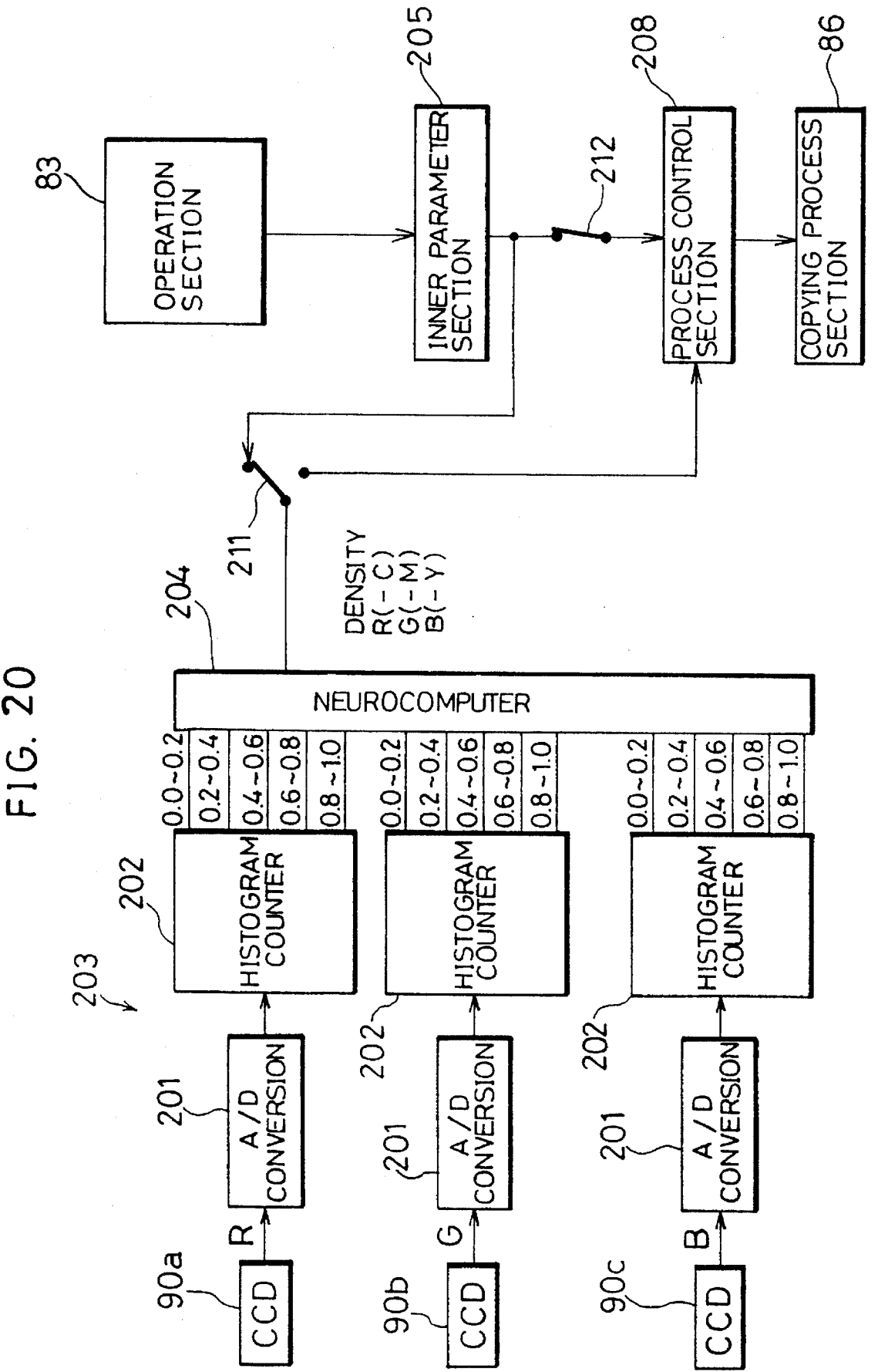
FIG. 20 is a block diagram showing the second processing system of the copying machine in connection with the third embodiment of the present invention.

As shown in FIG. 20, the present processing system, which is different from the first processing system, is arranged so that the neurocomputer 204 releases the inner parameters. Therefore, the neurocomputer 204 of the present processing system functions as the parameter setting means.

More specifically, the operation section 83 is directly connected to the inner parameter section 205, and the neurocomputer 204 is connected to the inner parameter section 205 or the process control section 208 through a switch 211. The switch 211 connects the neurocomputer 204 to the output of the inner parameter section 205 during the learning of the neurocomputer 204. Further, the switch 211 connects the neurocomputer 204 to the input of the process control section 208 during copying in the automatic mode.

Moreover, the inner parameter section 205 and the process control section 208 are connected and disconnected by the turning on/off of a switch 212. The switch 212 remains on during the learning of the neurocomputer 204 or during a copying operation in the normal mode, and is turned off upon copying in the automatic mode.

In the second processing system having the arrangement as described above, during the learning, the neurocomputer 204 is connected to the inner parameter section 205 through the switch 211, and the inner parameter section 205 is connected to the process control section 208 through the switch 212. At this time, the inner parameter section 205 releases inner parameters based on the image-quality data that are released from the operation section 83 through the user's instruction or the automatic setting.

The fifteen histogram data released from the histogram counters 202 are fed to the input of the neurocomputer 204, and the inner parameters are inputted to the output of the neurocomputer 204 through the switch 211. Then, the neurocomputer 204 is subjected to the learning on the relationship between the histogram data and the inner parameters by using the inner parameters as teaching data, following the sequence that is shown in FIGS. 4 and 5.

In this case, the inner parameters are also given to the process control section 208 through the switch 212. Thus, process control values that are suitable for the inner parameters are released from the process control section 208, and given to the copying process section 86.

During a copying operation after completion of the learning performed in the second processing system, the neurocomputer 204 is connected to the process control section 208 through the switch 211, and the inner parameter section 205 and the process control section 208 are disconnected. In this state, the neurocomputer 204 calculates inner parameters based on the image information read out by the image-information reading section 203 in accordance with the contents of the learning, following the aforementioned sequence shown in FIG. 6. Also, the neurocomputer 204 is connected to the process control section 208 through the switch 211, and the switch 212 is turned off. Therefore, the inner parameters from the neurocomputer 204 are given to the process control section 208.

Then, the process control section 208 releases control values that are suitable for the inner parameters. When the control values are given to the copying process section 86, the copying process section 86 carries out a copying operation.

As described above, in the copying machine that is provided with the second processing system, when the image-quality conditions for copied image are specified, the neurocomputer 204 is subjected to the learning on the relationship between the document image and the inner parameters that are suitable for the image quality for copying that is specified by the user with respect to the document image. As with the copying machine that is provided with the aforementioned first processing system, this arrangement makes it possible to automatically set the image quality for copying that matches the user's tastes.

THIRD PROCESSING SYSTEM

In the copying machine of the present embodiment, a mode wherein the setting of the image quality for copying is made by the use of an ID entry number for each user is referred to as ID copy mode. The ID entry number is a number which is determined, for example, according to the user's discretion, and is preliminarily registered. The change from the normal mode for the normal copying to the ID copy mode is performed by the operation of the ID key 117. When the ID copy mode is selected, the ID entry number is entered through the ten keys 120, and the neurocomputer 204 corresponding to the ID entry number is selected.

Figure 21:
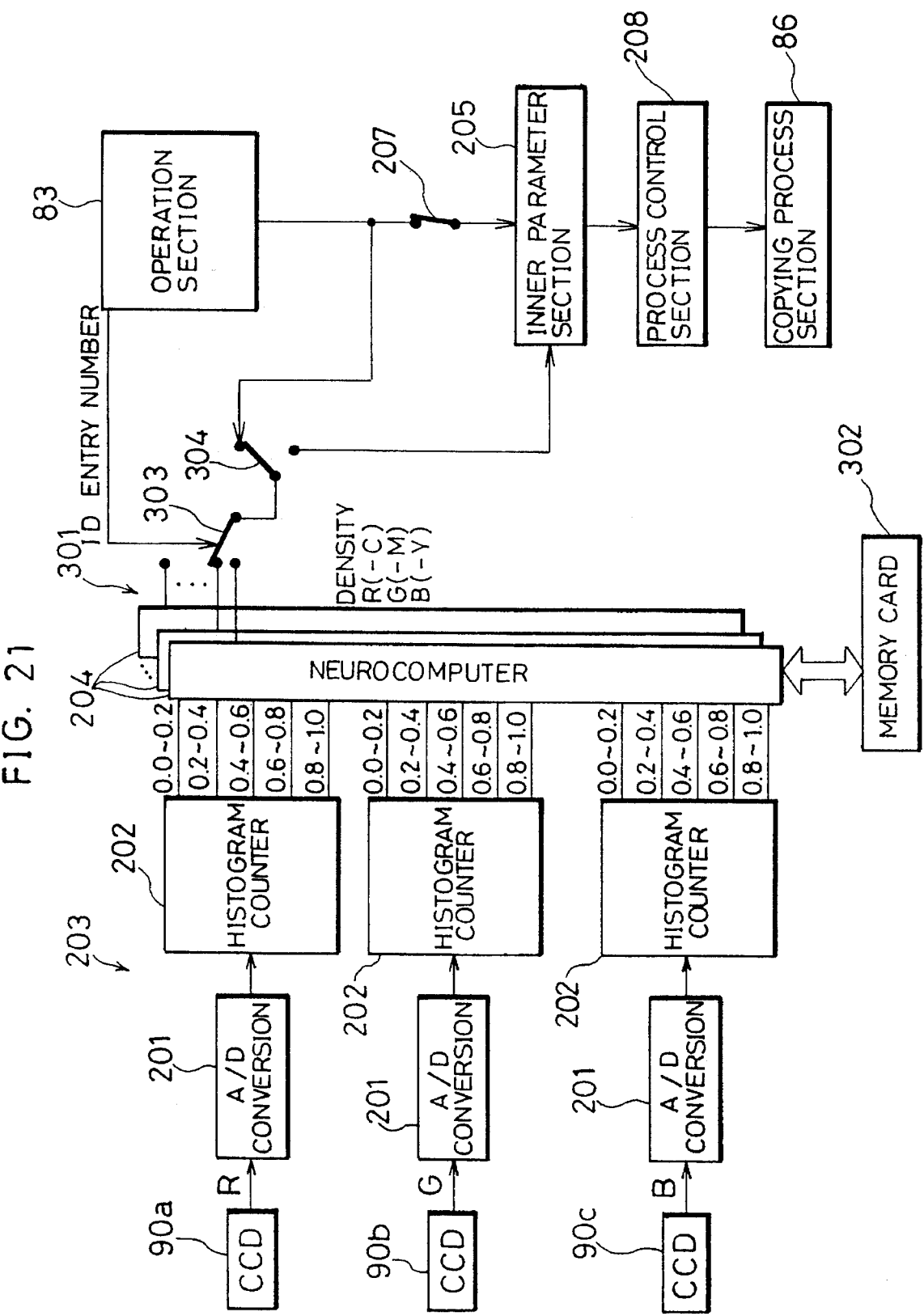
FIG. 21 is a block diagram showing the third processing system of the copying machine in connection with the third embodiment of the present invention.

In the present processing system, an operation processing section 301 is provided as the image-quality condition setting means, as shown in FIG. 21. The operation processing section 301 is constituted of a plurality of neurocomputers 204. Each neurocomputer 204 receives the aforementioned histogram data, and communicates with a memory card 302 for data exchange, which is installed as an external storage medium. The memory card 302 stores the weights of the connecting sections that each neurocomputer 204 has obtained through the learning.

The outputs of the neurocomputer 204 are selected by switches 303 and 304. The switch 303, which is the first switch, is connected to the switch 304, and selects one neurocomputer 204 in response to the ID entry number released from the operation section 83, thereby connecting it to the switch 304. The switch 304 connects the switch 303 and the operation section 83 during the learning of the neurocomputer 204. Further, the switch 304 connects the switch 303 and the inner parameter section 205 during a copying operation in the ID copy mode and the automatic mode.

An explanation will be given below on the operation of the third processing system having the above arrangement during the learning.

Firstly, when an ID entry number is registered through the inputting operation to the operation section 83, one neurocomputer 204 is allocated to the ID entry number. Then, the switch 303 is switched to the neurocomputer 204. Further, since the switch 303 is connected to the operation section 83 through the switch 304, the selected neurocomputer 204 is connected to the operation section 83. Moreover, since the switch 207 is on, the operation section 83 is connected to the inner parameter section 205.

The fifteen histogram data released from the histogram counters 202 are fed to the input of the neurocomputer 204. Further, the image-quality data, which are released from the operation section 83, are inputted to the output of the neurocomputer 204 through the switches 304 and 303. Then, the neurocomputer 204 is subjected to the learning on the relationship between the histogram data and the image-quality data, by using the image-quality data as teaching data, following the sequence shown in FIGS. 4 and 5.

In this case, the image-quality data are also given to the inner parameter section 205 through the switch 207. Thus, inner parameters that are suitable for the image-quality data are released from the inner parameter section 205, and process control values that correspond the inner parameters are determined.

Figure 22:
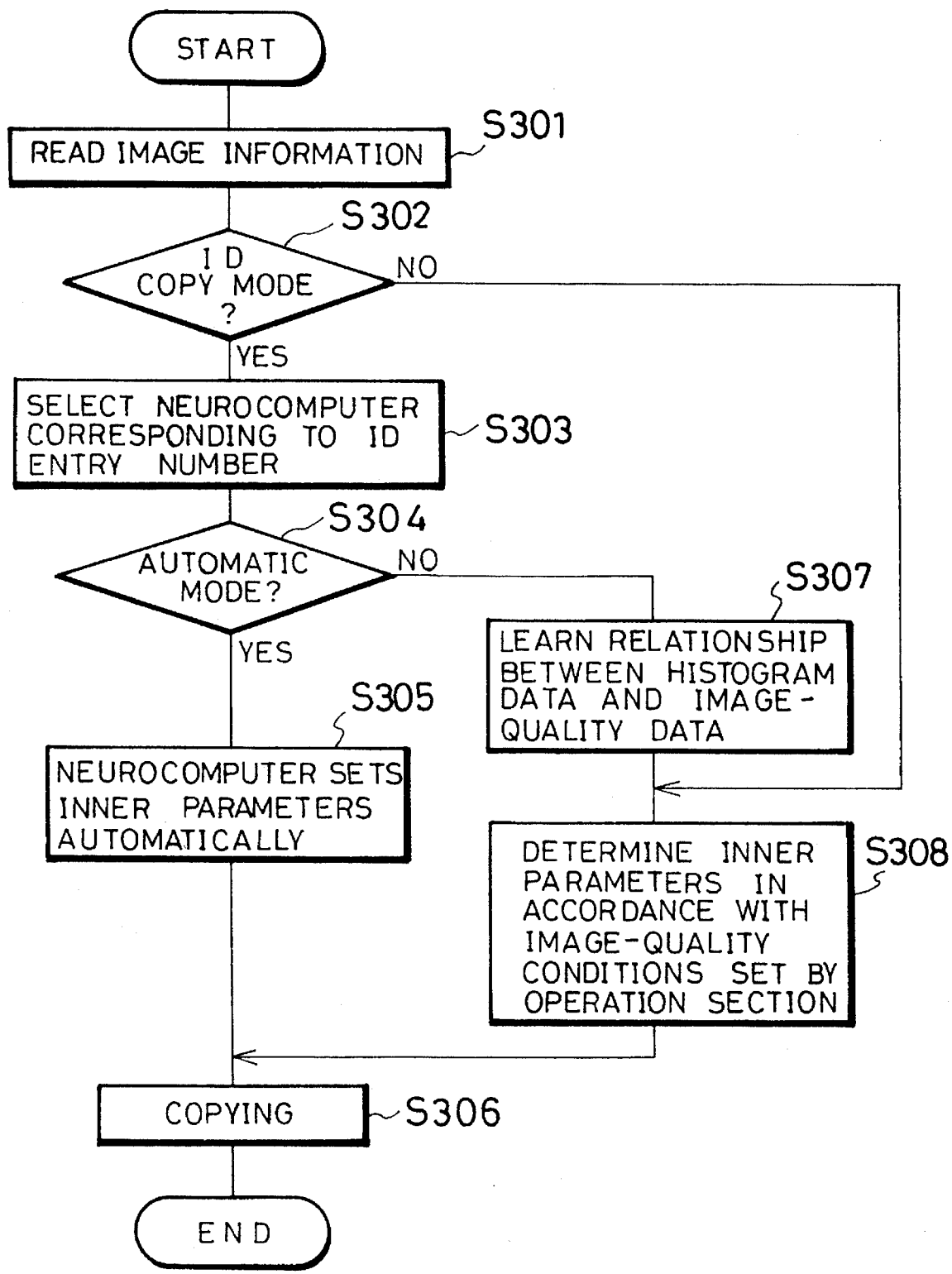
FIG. 22 is a flow chart showing a sequence of procedures that are carried out in a copying process after learning has been taken by the third processing system of FIG. 21.

Referring to the flow chart of FIG. 22, the following description will discuss the copying operation that is carried out by the third processing system after the learning.

When the copy start button 123 is turned on, the image-information reading section 203 first reads image information of a document image (S301), and a judgement is made as to whether or not the ID copy mode is on (S302). If it is the ID mode, the switch 303 is switched in accordance with the ID entry number, and a neurocomputer 204 that corresponds to the ID entry number is selected through the operation processing section 301 (S303).

Next, a judgement is made as to whether or not the automatic mode is on (S304). If it is the automatic mode, the inner parameters are automatically set based on the image-quality data that have been calculated by the neurocomputer 204 (S305).

At this time, the neurocomputer 204 and the inner parameter section 205 are connected to each other through the switches 303 and 304, and the switch 207 is turned off. Therefore, the image-quality data released from the neurocomputer 204 are supplied to the inner parameter section 205. Then, the inner parameter section 205 releases inner parameters that are suitable for the image-quality data. When the inner parameters are given to the process control section 208, the process control section 208 outputs process control values that are suitable for the inner parameters. Thus, the copying process section 86 carries out a copying operation by using the process control values (S306).

If the automatic mode is not on, the neurocomputer 204 is subjected to the learning on the relationship between the histogram data for each of R, G, and B that are obtained based on the image information and the image-quality data from the operation section 83 (S307). At this time, since the switch 207 is on, the image-quality data are fed to the inner parameter section 205. Thus, the inner parameter section 205 determines inner parameters that are suitable for the image-quality data (S308). Then, the copying process section 86 carries out a copying operation in accordance with the inner parameters (S306).

If the ID copy mode is not on, the setting of the image quality for copying by the use of the neurocomputers 204 is not carried out, and the sequence proceeds to S308, thereby carrying out a copying operation. At this time, since the switch 207 is on, the inner parameters are determined in accordance with the image-quality data that are released from the operation section 83 through the user's instruction. Thus, the copying process section 86 is controlled by the inner parameters.

As described above, in the copying machine that is provided with the third processing system, the image quality that is suitable for the inputted image information is determined through the learning of the neurocomputer 204. Thus, this arrangement makes it unnecessary for the user to have troublesome tasks to input the image quality for copying for each copying operation, thereby improving the operability of the copying machine.

Moreover, by adopting the neurocomputers 204, the number of data to be processed in the present processing system is reduced to the number of the connecting sections multiplied by the number of ID entry numbers. Therefore, it is no longer necessary to provide a memory with a large capacity, which is different from the case wherein the image information and the image-quality condition are stored on the one-to-one basis.

Moreover, in the present processing system which is provided with the operation processing section 301, the copying operation is carried out by the use of the ID copy mode; this makes it possible to perform the setting of the image quality for copying for each user by using the corresponding ID entry number. Therefore, if different settings of the image quality for copying are made by a plurality of users, it is avoidable for the neurocomputer 204 to have those settings in a mixed state. Thus, it is possible to cover the tastes of individual users for the image quality for copying.

Furthermore, in the present processing system, by storing the contents of the learning made by the operation processing section 301 in the memory card 302, it is possible to supply information stored in the memory card 302 in question to other copying machines which have the same functions. The other copying machine, which has received the information from the memory card 302, can make the same setting of the image quality for copying without the necessity of new learning. In addition, if the memory cards 302 are given to individual users, each user can make copies in the ID copy mode using a copying machine of his or her own.

MODIFIED EXAMPLE OF THE THIRD PROCESSING SYSTEM

An explanation will be given hereinbelow on a modified example of the present processing system.

Figure 23:
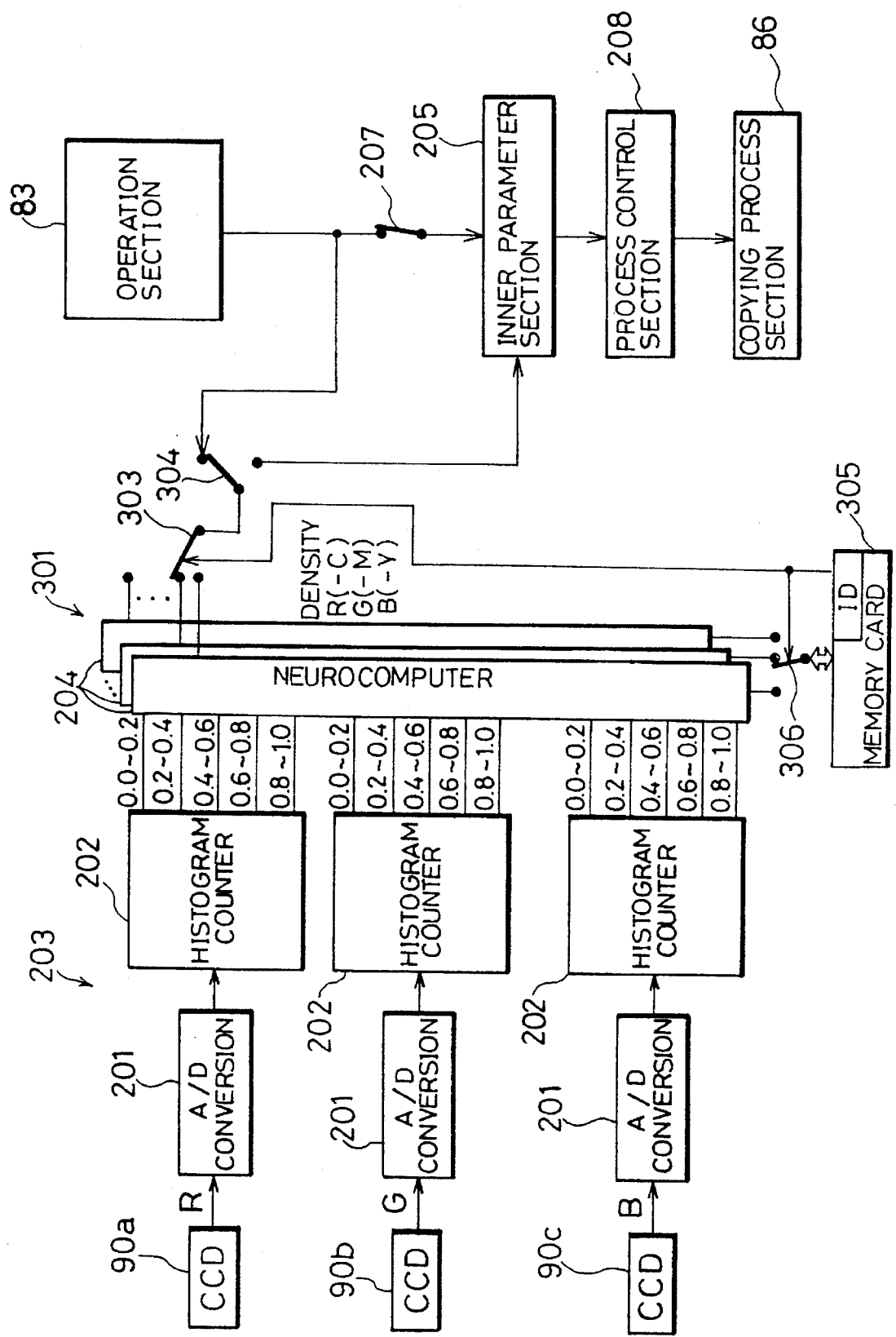
FIG. 23 is a block diagram showing a configuration of a modified example of the third processing system of FIG. 21.

As shown in FIG. 23, in this modified example, each neurocomputer 204 communicates with a memory card 305 for data exchange, which is capable of recording ID entry numbers. The memory card 305, which is an external storage medium, stores the weights of the connecting sections that the neurocomputer 204 obtained through the learning, and is provided with each ID entry number.

The connections between the memory card 305 and the respective neurocomputers 204 are made through the switch 306. The switch 306, which is installed as the second switch, switches the connections in accordance with the ID entry numbers that are different from one another depending on the individual memory cards 305. Similarly, the switch 303 also switches the connections to the neurocomputers 204 depending on the individual ID entry numbers.

In the modified example having the above arrangement, when the memory cards 305 are exchanged, the switches 303 and 306 are switched in accordance with the ID entry number corresponding to the inserted memory card 305. Thus, one of the neurocomputers 204 that corresponds to the ID entry number is selected.

Therefore, when the memory card 305 is connected thereto, the present processing system automatically selects the corresponding neurocomputer 204, thereby eliminating the task to input the ID entry number to the operation section 83. Further, since the connections between the memory card 305 and the neurocomputers 204 are switched through the switch 306, only one connector is all the necessary device for connecting the memory card 305.

Additionally, although not shown in FIG. 23, the present modified example may be arranged so that the switch 303 is operated by the ID entry number that is entered through the operation section 83.

FOURTH PROCESSING SYSTEM

Figure 24:
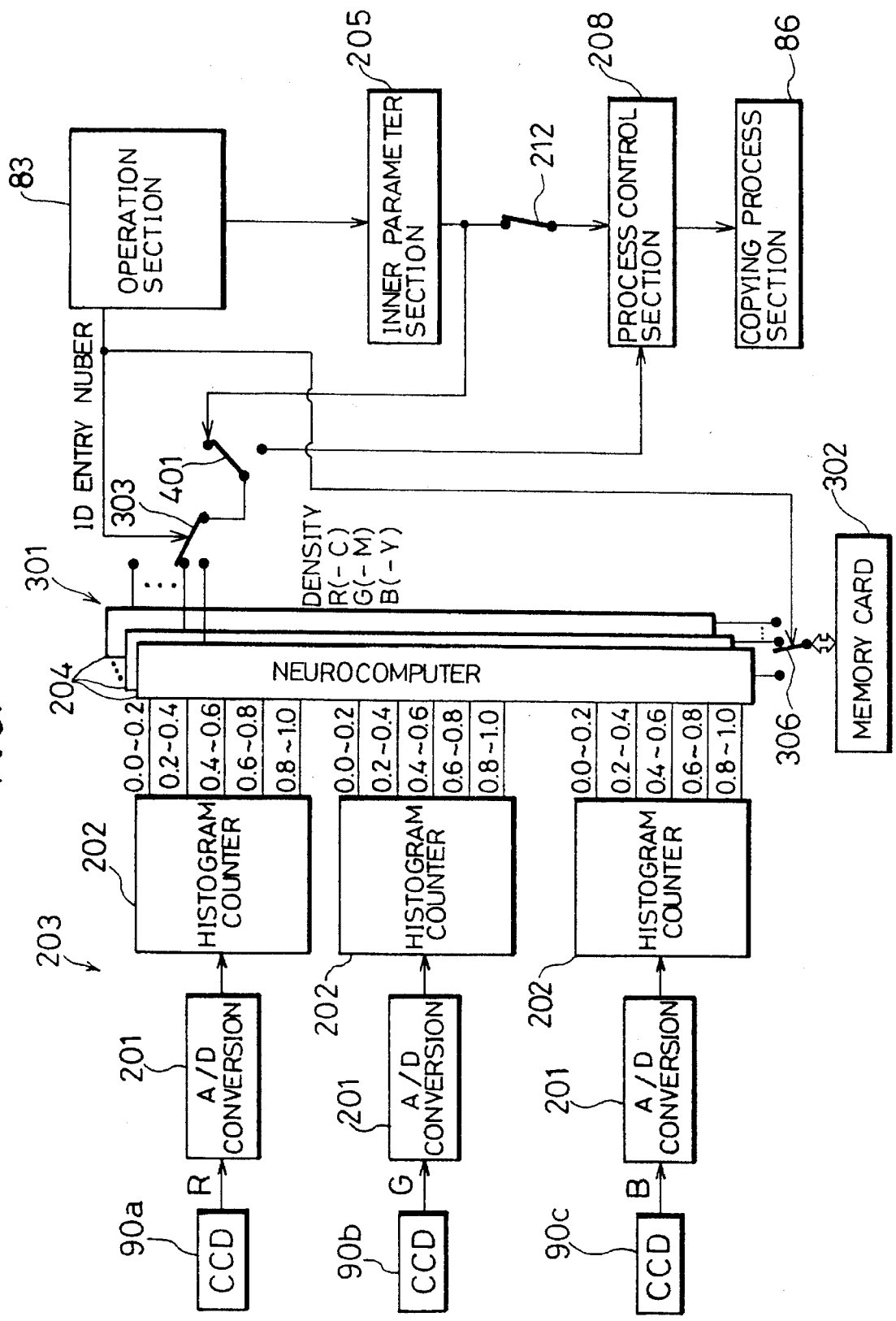
FIG. 24 is a block diagram showing the fourth processing system of the copying machine in connection with the third embodiment of the present invention.

As shown in FIG. 24, the present processing system, which is different from the third processing system, is arranged so that the neurocomputers 204 in the operation processing section 301 can release the inner parameters. Therefore, the operation processing section 301 in the present processing system functions as the parameter setting means.

More specifically, the operation section 83 and the inner parameter section 205 are directly connected to each other, and each neurocomputer 204 is connected to the inner parameter section 205 or the process control section 208 through the switches 303 and 401. The switch 401 is connected to the switch 303 and the output of the inner parameter section 205 during the learning of the neurocomputer 204. Further, the switch 401 is connected to the switch 303 and the input of the process control section 208 during copying in the ID copy mode and in the automatic mode.

Moreover, the inner parameter section 205 and the process control section 208 are connected or disconnected by the turning on/off of a switch 212. The switch 212 remains on during the learning of the neurocomputer 204 or during copying in the normal mode, and is turned off upon copying in the automatic mode.

Here, the neurocomputers 204 are arranged to communicate with the memory card 302 through the switch 306. The switch 306 is switched according to the ID entry number that is released from the operation section 83.

An explanation will be given below on the operation of the fourth processing system having the above arrangement during the learning.

Firstly, as with the second processing system, the switch 303 is switched to the neurocomputer 204 that corresponds to the ID entry number. Further, since the switch 303 is connected to the inner parameter section 205 through the switch 401, the selected neurocomputer 204 is connected to the inner parameter section 205. Moreover, since the switch 212 is on, the inner parameter section 205 is connected to the process control section 208. At this time, the inner parameter section 205 releases inner parameters based on the image-quality data that are released from the operation section 83 by the user's instruction or the automatic setting.

The fifteen histogram data released from the histogram counters 202 are fed to the inputs of the neurocomputer 204, and the inner parameters are inputted to the outputs of the neurocomputer 204 through the switches 401 and 303. Then, the neurocomputer 204 is subjected to the learning on the relationship between the histogram data and the inner parameters, by using the inner parameters as teaching data, following the sequence shown in FIGS. 4 and 5.

In this case, the inner parameters are also given to the process control section 208 through the switch 212. Thus, process control values that are suitable for the inner parameters are released from the process control section 208, and supplied to the copying process section 86.

Figure 25:
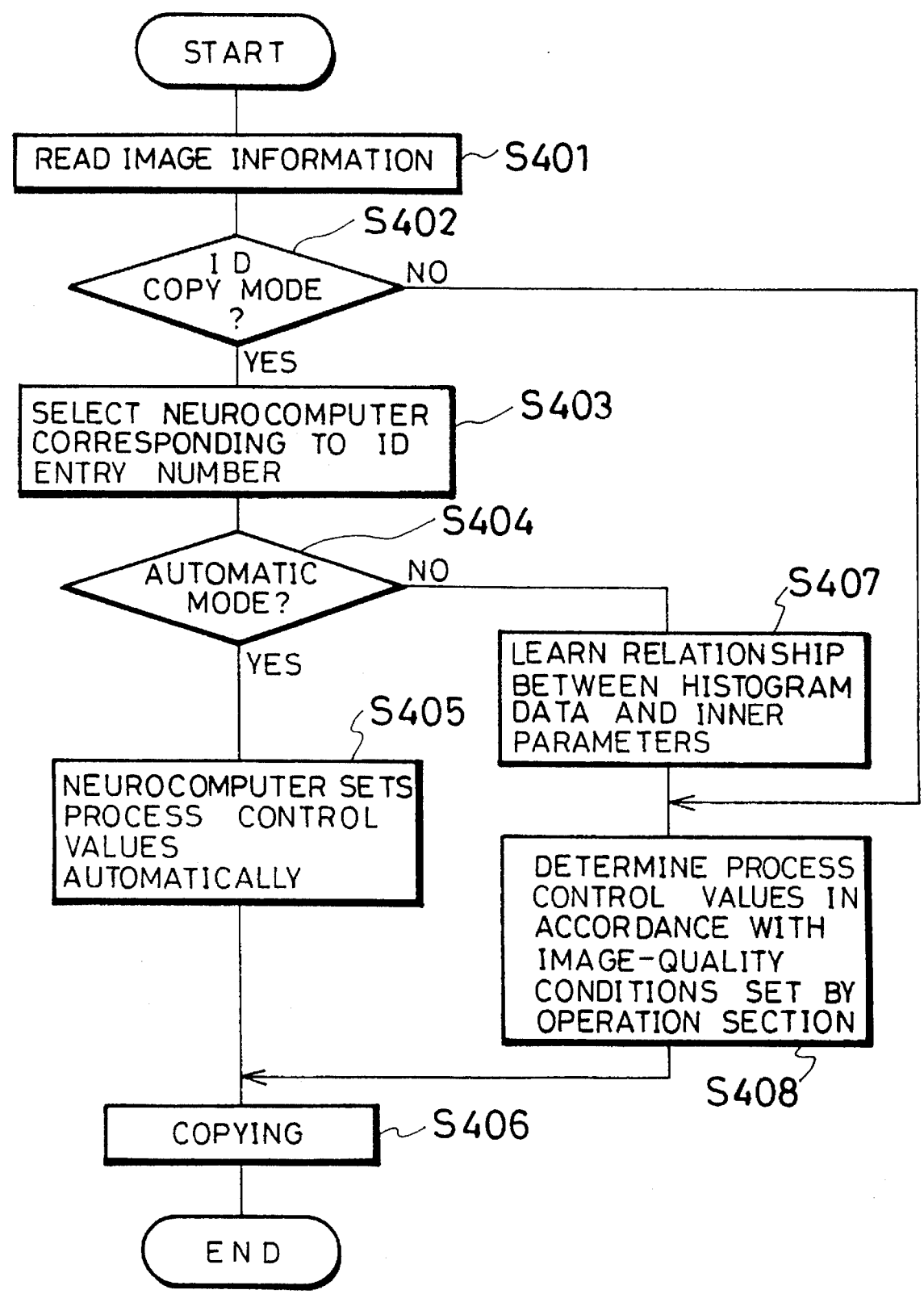
FIG. 25 is a flow chart showing a sequence of procedures that are carried out in a copying process after learning has been taken by the fourth processing system of FIG. 24.

Referring to the flow chart of FIG. 25, the following description will discuss the copying operation that is carried out by the fourth processing system after the learning. Also in this case, the copying operation is carried out basically in the same sequence as that of the copying operation in the third processing system.

When the copy start button 123 is turned on, the image-information reading section 203 first reads image information of a document image (S401), and a judgement is made as to whether or not the ID copy mode is on (S402). If it is the ID mode, one of the neurocomputers 204 that corresponds to the ID entry number is selected (S403).

Next, a judgement is made as to whether or not the automatic mode is on (S404). If it is the automatic mode, the process control values are automatically set based on the inner parameters that have been calculated by the neurocomputer 204 (S405). If it is not the automatic mode, the neurocomputer 204 is subjected to the learning on the relationship between the inputted histogram data and the inner parameters that have been determined by the inner parameter section 205 based on the image-quality data from the operation section 83 (S407).

The inner parameters released from the inner parameter section 205 are inputted to the processing control section 208 through the switch 212. When the process control values are supplied to the copying process section 86, the copying process section 86 carries out a copying operation in accordance with the process control values (S406).

If it is not the ID copy mode, the setting of the image quality for copying by the use of the neurocomputers 204 is not carried out, and the sequence proceeds to S408, thereby carrying out a copying operation. At this time, since the switch 212 is on, the process control values are determined based on the inner parameters that are released from the inner parameter section 205. Thus, the copying process section 86 is controlled by the process control values.

As described above, in the copying machine that is provided with the fourth processing system, when the image quality for copying is determined, the neurocomputer 204 is subjected to the learning on the relationship between the image information of the document image and the inner parameters that are suitable for the image quality for copying specified by the user. With this arrangement, upon copying, the neurocomputer 204 sets appropriate image quality in accordance with the contents of the learning in response to the inputted image information. Thus, as with the copying machine that is provided with the first processing system, the operability of the copying machine can be enhanced, and it is not necessary to provide a memory having a large capacity for storing the abovementioned relationship.

Further, since the connections between the memory card 302 and the neurocomputers 204 are switched through the switch 306, only one connector is all the necessary device for connecting the memory card 302.

MODIFIED EXAMPLE OF THE FOURTH PROCESSING SYSTEM

Figure 26:
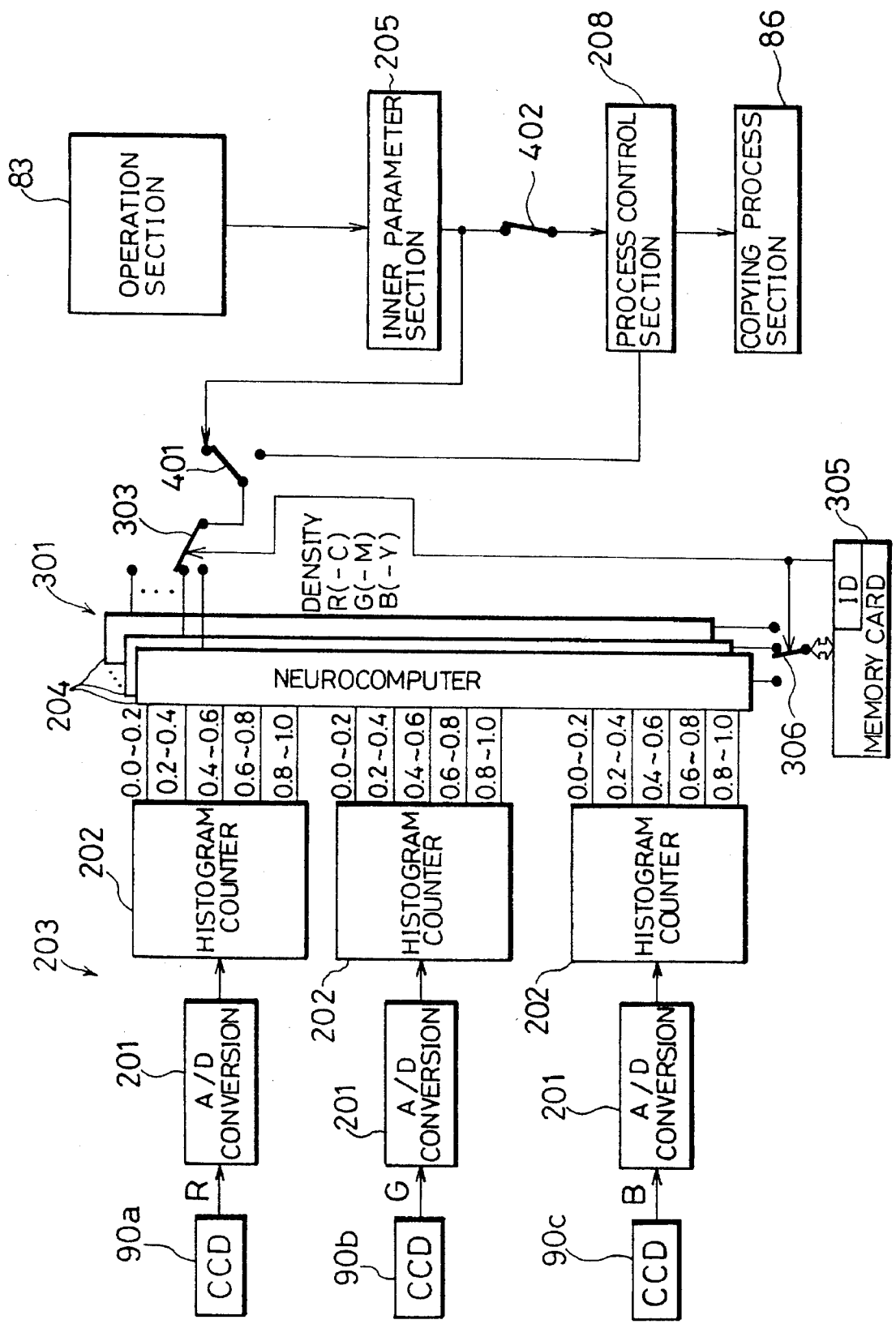
FIG. 26 is a block diagram showing a configuration of a modified example of the fourth processing system of FIG. 24.

As shown in FIG. 26, as with the modified example of the third processing system, this modified example is provided with the memory card 305 instead of the memory card 302.

Also in this arrangement, the connections between the memory card 305 and the respective neurocomputers 204 are made through the switch 306. Further, the switch 303 also switches between the neurocomputers 204 in accordance with the ID entry number that is set in the memory card 305.

With this modified example, it is possible to use the neurocomputers 204 in accordance with the ID entry number that is set in the memory card 305. This makes it possible to eliminate the necessity of inputting the ID entry number to the operation section 83. Moreover, only one connector is required for connecting the memory card 305.

Additionally, although not shown in FIG. 26, the present modified example may be arranged so that the switch 303 is operated by the ID entry number that is entered through the operation section 83.

FIFTH PROCESSING SYSTEM

Figure 27:
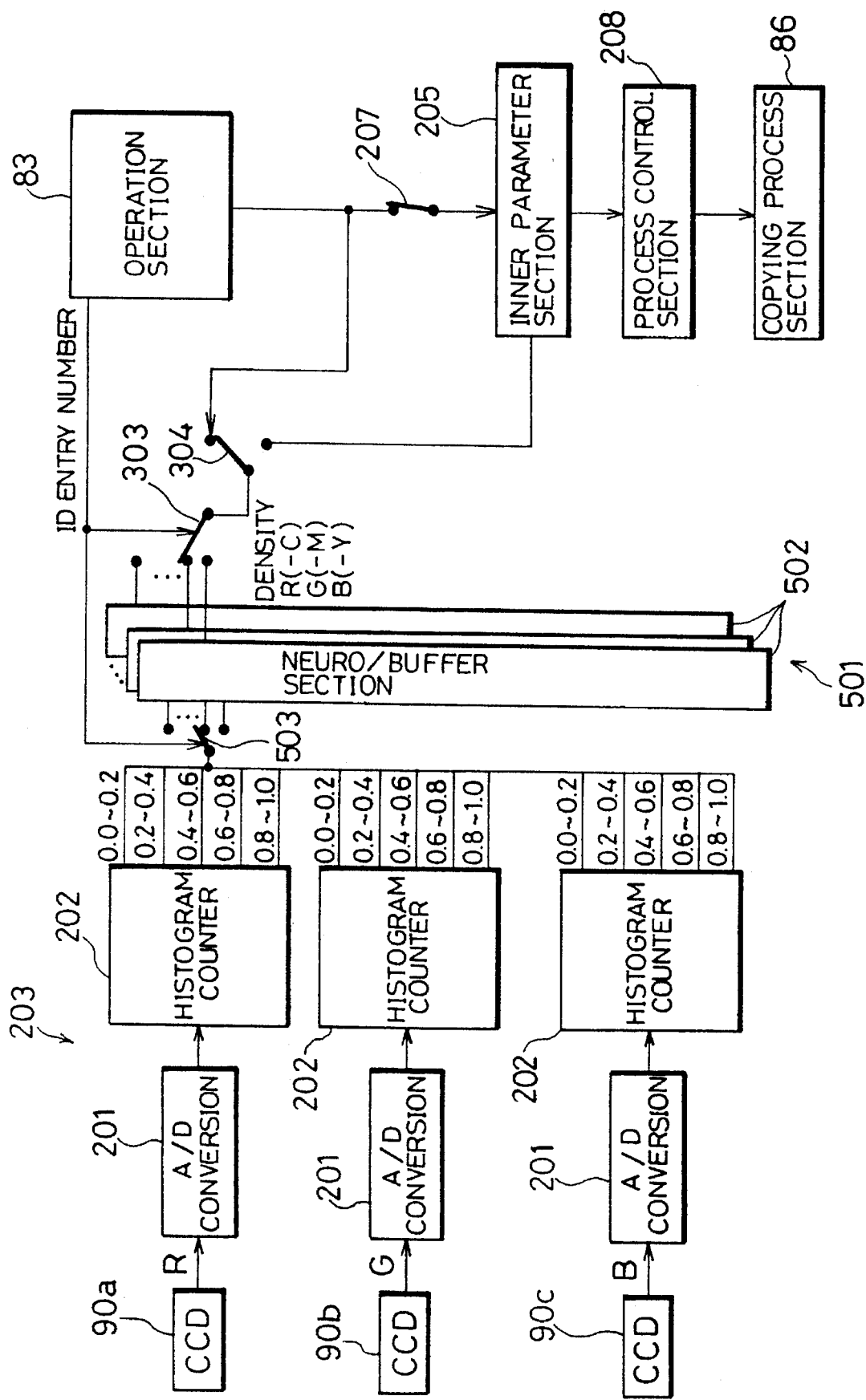
FIG. 27 is a block diagram showing the fifth processing system of the copying machine in connection with the third embodiment of the present invention.

As shown in FIG. 27, the present processing system is provided with an operation processing section 601 as the image-quality condition setting means. The operation processing section 601 is constituted of a plurality of neuro/buffer sections 502. The aforementioned histogram data are supplied to the neuro/buffer sections 502 through a switch 503. As with the switch 303, the switch 503 is switched in accordance with the ID entry number that is entered through the operation section 83.

Figure 28:
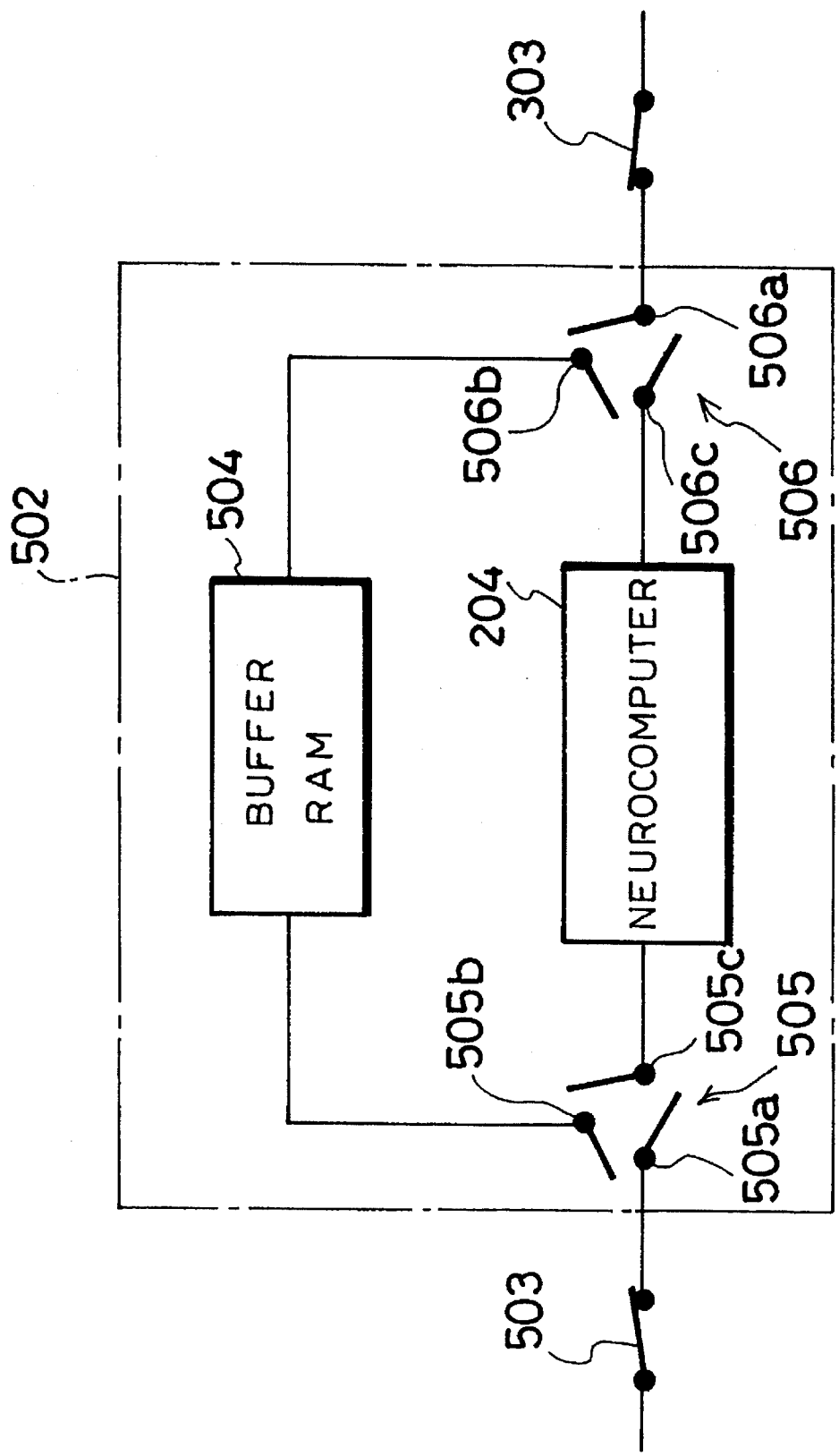
FIG. 28 is a block diagram showing a schematic configuration of a neuro/buffer section in the fifth processing system of FIG. 27.

As shown in FIG. 28, each neuro/buffer section 502 has the neurocomputer 204, a buffer RAM 504, and switches 505 and 506. The switch 505 is installed between a switch 503 and the neurocomputer 204 as well as the buffer RAM 504. The switch 506 is installed between a switch 303 and the neurocomputer 204 as well as the buffer RAM 504.

The switch 505 has three contact points 505a through 505c, and the connections among the contact points 505a through the 505c are switched depending on the following three cases.

(A-1) Preparatory stage to the learning of the neurocomputer 204:

The contact points 505a and 505b are connected. Thus, the histogram data are inputted to the RAM 504 through the switch 503.

(A-2) During the learning of the neurocomputers 204:

The contact points 505a and 505b are disconnected, and the contact points 505b and 505c are connected. Thus, the histogram data stored in the buffer RAM 504 are supplied to the neurocomputer 204.

(A-3) During copying in the automatic mode:

The contact points 505a and 505c are connected. Thus, the histogram data, which are to be inputted through the switch 503, are directly supplied to the neurocomputer 204 without passing through the buffer RAM 504.

In contrast, the switch 506 has three contact points 506a through 506c, and the connections among the contact points 506a through 506c are switched depending on the following three cases.

(B-1) Preparatory stage to the learning of the neurocomputers 204:

The contact points 506a and 506b are connected. Thus, the image-quality data are inputted to the buffer RAM 504 through the switch 303.

(B-2) During the learning of the neurocomputers 204:

The contact points 506a and 506b are disconnected, and the contact points 506b and 506c are connected. Thus, the image-quality data stored in the buffer RAM 504 are supplied to the neurocomputer 204.

(B-3) During copying in the automatic mode:

The contact points 506a and 506c are connected. Thus, the image-quality data are released from the neurocomputer 204 through the switch 303.

Figure 29:
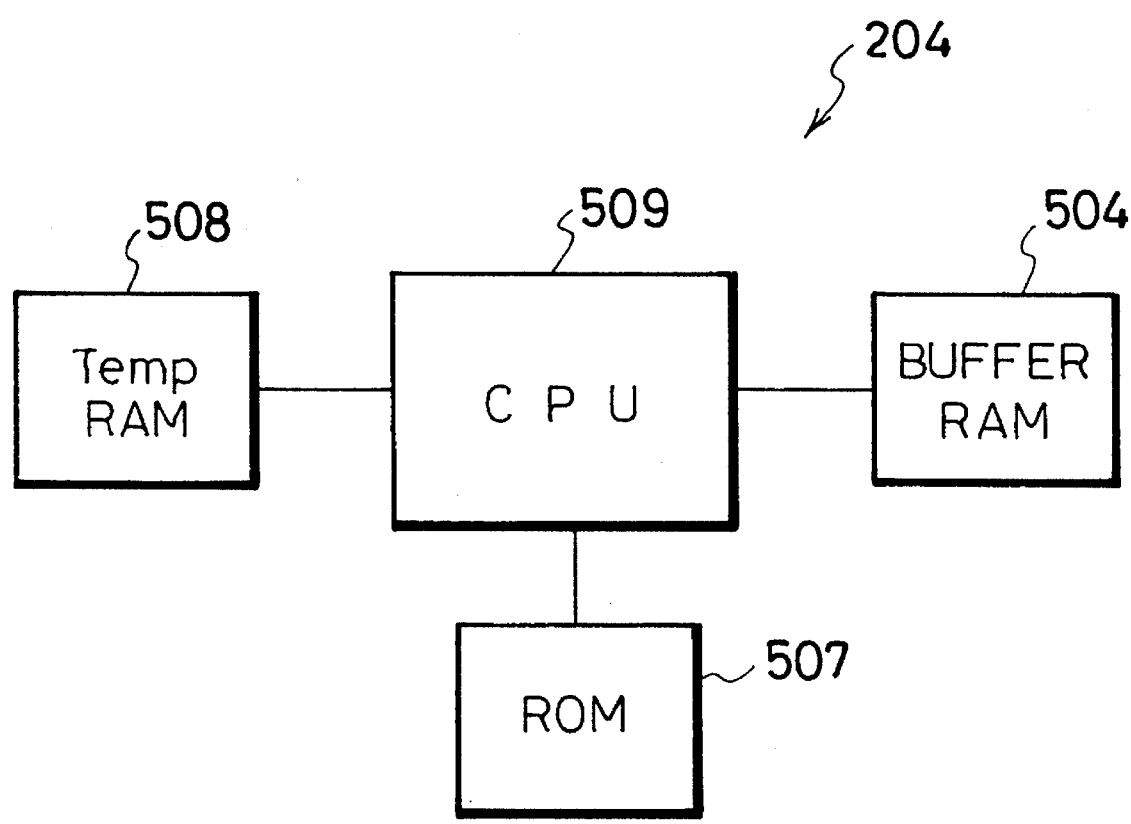
FIG. 29 is a block diagram showing a configuration of a neurocomputer in the neuro/buffer section in the fifth processing system of FIG. 27.

As shown in FIG. 29, the neurocomputer 204 is provided with a ROM 507, a TempRAM 508, and a CPU509. Here, for convenience of explanation, the switches 505 and 506, shown in FIG. 28, are omitted therefrom.

The ROM 507 is a memory for storing programs, etc. which allows the CPU 509F to execute neuro operations (which are operations executed by the use of a neural network). The Temp RAM 508 is a memory for storing data associated with the current document. In accordance with the program stored in the ROM 507, the CPU 509 executes the neuro operations based on the histogram data for the respective R, G, and B that are stored in the buffer RAM 504, as will be described later.

Further, the neurocomputer 204 is provided with a weight memory, not shown in the drawing, and weights which have been obtained through the learning are stored in the weight memory as the contents of the learning.

Figure 30:
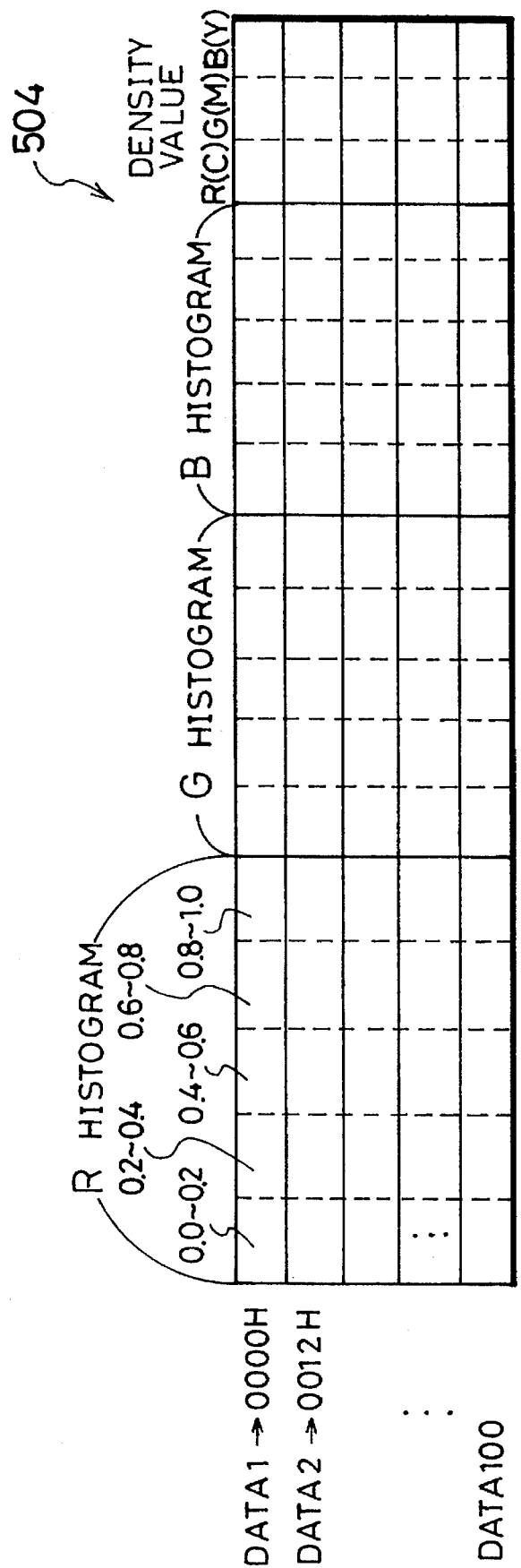
FIG. 30 is an explanatory drawing which schematically shows a storage region of a buffer RAM in the neuro/buffer section of FIG. 28.

As shown in FIG. 30, the buffer RAM 504, which functions as a data accumulating section, is arranged so that it can store, for example, 100 pairs of data. Here, one pair of data consist of histogram data containing five data for each of R, G and B as well as five data for each corresponding density value (image-quality data) of R(C), G(M) and B(Y).

An explanation will be given below on the operation of the fifth processing system having the above arrangement during the learning.

Firstly, when an ID entry number is registered through the inputting operation to the operation section 83, one neuro/buffer section 502 is allocated to the ID entry number. Then, the switch 303 is switched to the neuro/buffer section 502 in question. Further, since the switch 303 is connected to the operation section 83 through the switch 304, the selected neuro/buffer section 502 is connected to the operation section 83. Moreover, since the switch 207 is on, the operation section 83 is connected to the inner parameter section 205.

The fifteen histogram data released from the histogram counters 202 are fed to the inputs of the neuro/buffer section 502 through the switch 503. Further, the image-quality data, which are specified by the user's setting and which are released from the operation section 83, are inputted to the outputs of the neuro/buffer section 502 through the switch 303.

Then, the neuro/buffer section 502 accumulates both of the data as learning data that are written in the buffer RAM 504 through the switches 505 and 506. At this time, in the buffer RAM 504, if the number of the learning data exceeds one hundred, the excess data are erased therefrom in order of age.

Thereafter, the accumulated n-pairs of the learning data are supplied to the neurocomputer 204 through the switches 505 and 506. The neurocomputer 204 is subjected to the learning on the relationship between the histogram data and the image-quality data based on the learning data, following the sequence shown in FIGS. 4 and 5.

In this case, the image-quality data are also given to the inner parameter section 205 through the switch 207. Thus, inner parameters that are suitable for the image-quality data are released from the inner parameter section 205, and processing control values that correspond the inner parameters are calculated in the process control section 208.

Figure 31:
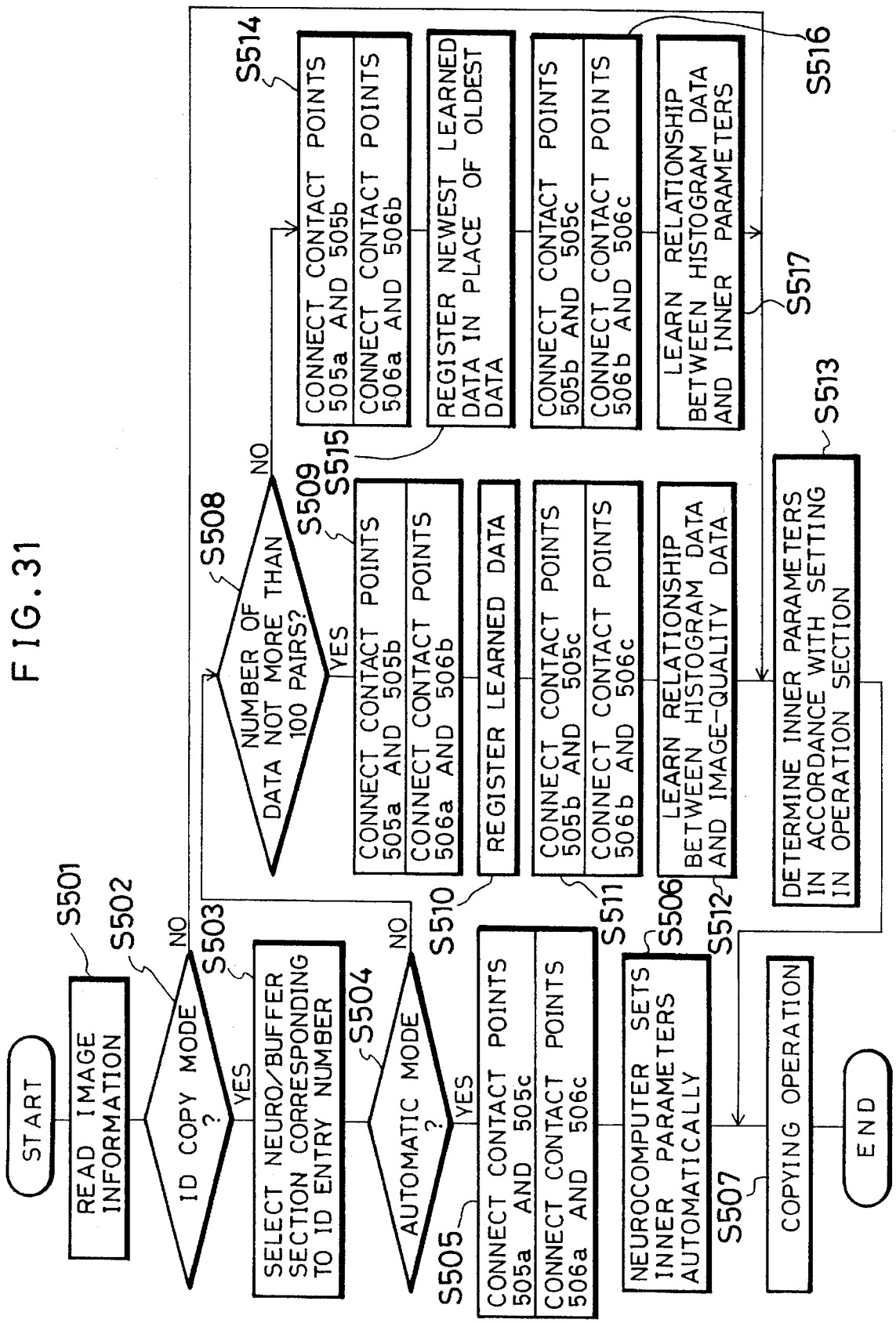
FIG. 31 is a flow chart showing a sequence of procedures that are carried out in a copying process after learning has been taken by the fifth processing system of FIG. 27.

Referring to the flow chart of FIG. 31, the following description will discuss the copying operation that is carried out by the fifth processing system after the learning.

When the copy start button 123 is turned on, the image-information reading section 203 first reads image information of a document image (S501), and a judgement is made as to whether or not the ID copy mode is on (S502). If it is the ID copy mode, the switch 303 is switched in accordance with the ID entry number, and one of the neuro/buffer sections 502 that corresponds to the ID entry number is selected through the operation processing section 501 (S503).

Next, a judgement is made as to whether or not the automatic mode is on (S504). If it is the automatic mode, the switch 505 connects the contact points 505a and 505c, and the switch 506 connects the contact points 506a and 506c (S505). Further, in the case of the automatic mode, the switch 304 connects the neuro/buffer section 502 and the inner parameter section 205, while the switch 207 remains off. Therefore, the neurocomputer 204 is connected to the histogram counters 202 and the inner parameter section 205.

Upon receipt of the histogram data from the histogram counter 202 in this state, the neurocomputer 204 calculates the image-quality data that are suitable for the histogram data according to the contents of the learning. Then, the inner parameter section 205 releases the inner parameters that are suitable for the image-quality data that have been released from the neurocomputer 204. Thus, the inner parameters are automatically set by the neurocomputer 204 (S506).

When these inner parameters are given to the process control section 208, the process control section 208 releases the process control values corresponding to the inner parameters, thereby permitting the copying processing section 86 to perform copying (S507).

If it is not the automatic mode, a judgement is made as to whether the number of data is not more than 100 pairs (S508). If the number of data is not more than 100 pairs, the switch 505 connects the contact points 505a and 505b, and the switch 506 connects the contact points 506a and 506b (S509). With this arrangement, the histogram data and the image-quality data from the operation section 83 are sent to and written in the buffer RAM 504 through the respective switches 505 and 506, thereby registering the learning data (S510).

Thereafter, the switch 505 connects the contact points 505b and 505c, and the switch 506 connects the contact points 506b and 506c (S511). Thus, the neurocomputer 204, which is supplied with the learning data registered in the buffer RAM 504, is subjected to the learning on the relationship between the histogram data and the image-quality data (S512).

After completion of the learning, the inner parameter section 205 determines the inner parameters based on the image-quality data from the operation section 83 (S513). Then, the copying process section 86 carries out a copying operation based on the inner parameters (S507).

Further, if the number of the data exceeds 100 pairs, the switch 505 connects the contact points 505a and 505b, and the switch 506 connects the contact points 506a and 506b in the same manner as S509 (S514). In this case, the oldest learning data are replaced by newly learning data in the buffer RAM 504, and the new data are thus registered therein (S515).

Next, as with S511, the switch 505 connects the contact points 505b and 505c, and the switch 506 connects the contact points 506b and 506c (S516). Then, the neurocomputer 204, which is supplied with the learning data registered in the buffer RAM 504, is subjected to the learning on the relationship between the histogram data and the image-quality data (S517).

After the neurocomputer 204 has completed the learning, the sequence proceeds to S513. Also, if it is not the ID copy mode at S502, the sequence proceeds to S513.

As described above, since the buffer RAM 504 is installed therein, the copying machine that is provided with the fifth processing system is subjected to the learning on a lot of data. With this arrangement, it is avoided to have the learning that is one-sided to specific image information; this makes it possible to set the image-quality for copying more accurately when copying is made.

In a control system which is not provided with the buffer RAM 504, when new data are inputted therein, the learning is repeated until r becomes smaller than R at step S76 in the sequence of learning shown in FIGS. 4 and 5 in order to determine the weights. In this system, although the system can obtain accurate weights for the newest data, it has the possibility to get inaccurate weights for the data that have already been stored because the learning is not repeated for those data.

Here, with the arrangement wherein the above-mentioned buffer RAM 504 is installed, the learning is repeated until r becomes smaller than R with respect to all the data in the buffer RAM 504. Therefore, it is possible to obtain accurate weights for all the data.

Additionally, the present processing system may be arranged like these: The number of copies to be made or other factors is controlled by each ID entry number; or the copying operation is not available without registering the ID entry number.

MODIFIED EXAMPLE 1 OF THE FIFTH PROCESSING SYSTEM

The first modified example of the present processing system is arranged so that the learning is not initiated until the learning data have been accumulated in the buffer RAM 504 to a predetermined degree. More specifically, if the capacity of the buffer RAM 504 is, for example, limited to 100 pairs, the neurocomputer 204 is arranged so that it is subjected to the learning after the learning data of 100 pairs have been accumulated. Further, when the learning data exceeds 100 pairs, the excess learning data are erased in order of age so that newly learning data can be registered.

Figure 32:
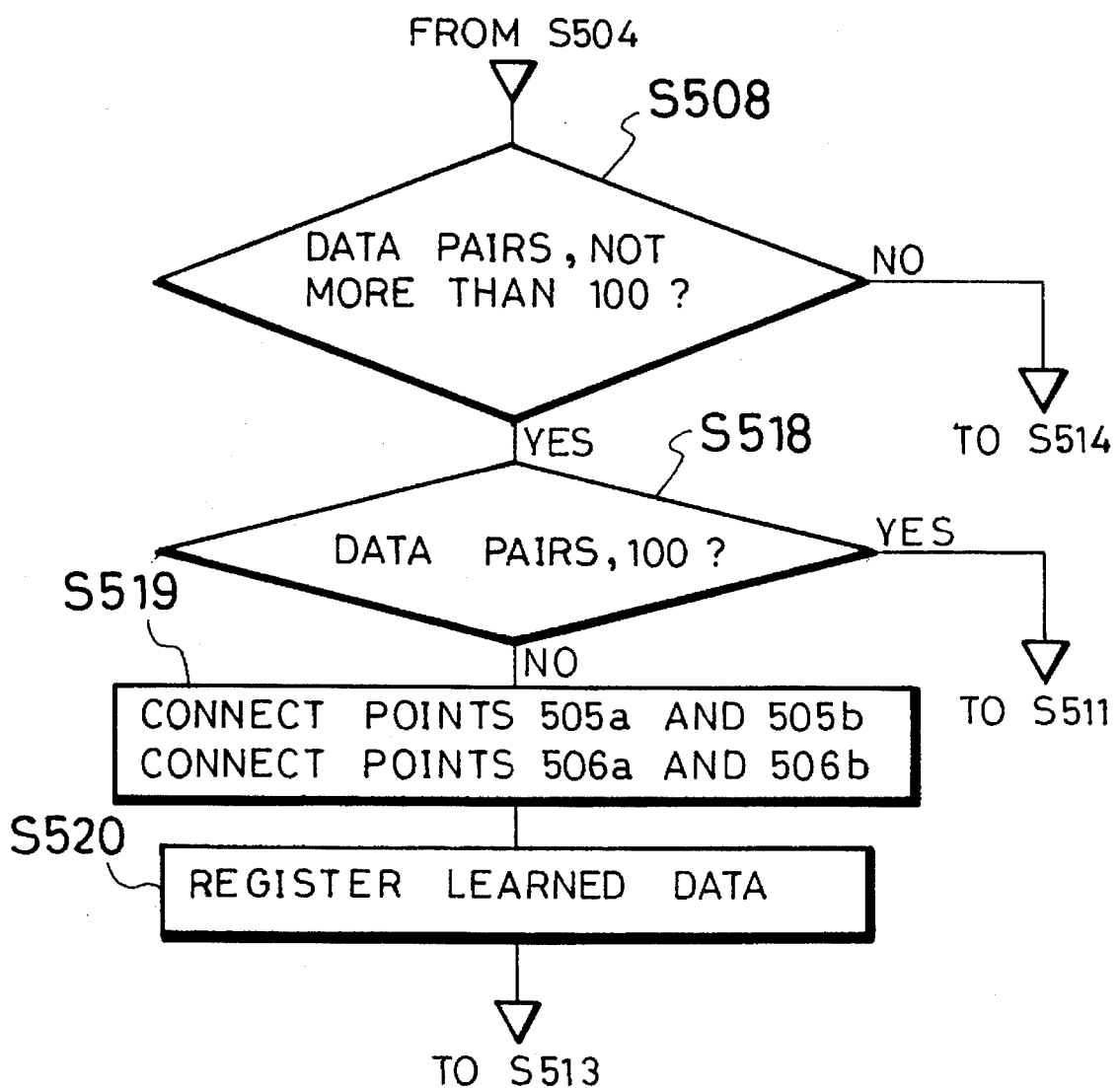
FIG. 32 is a flow chart showing a sequence of procedures that are carried out in a copying process in the first modified example of the fifth processing system of FIG. 27.
Figure 33:
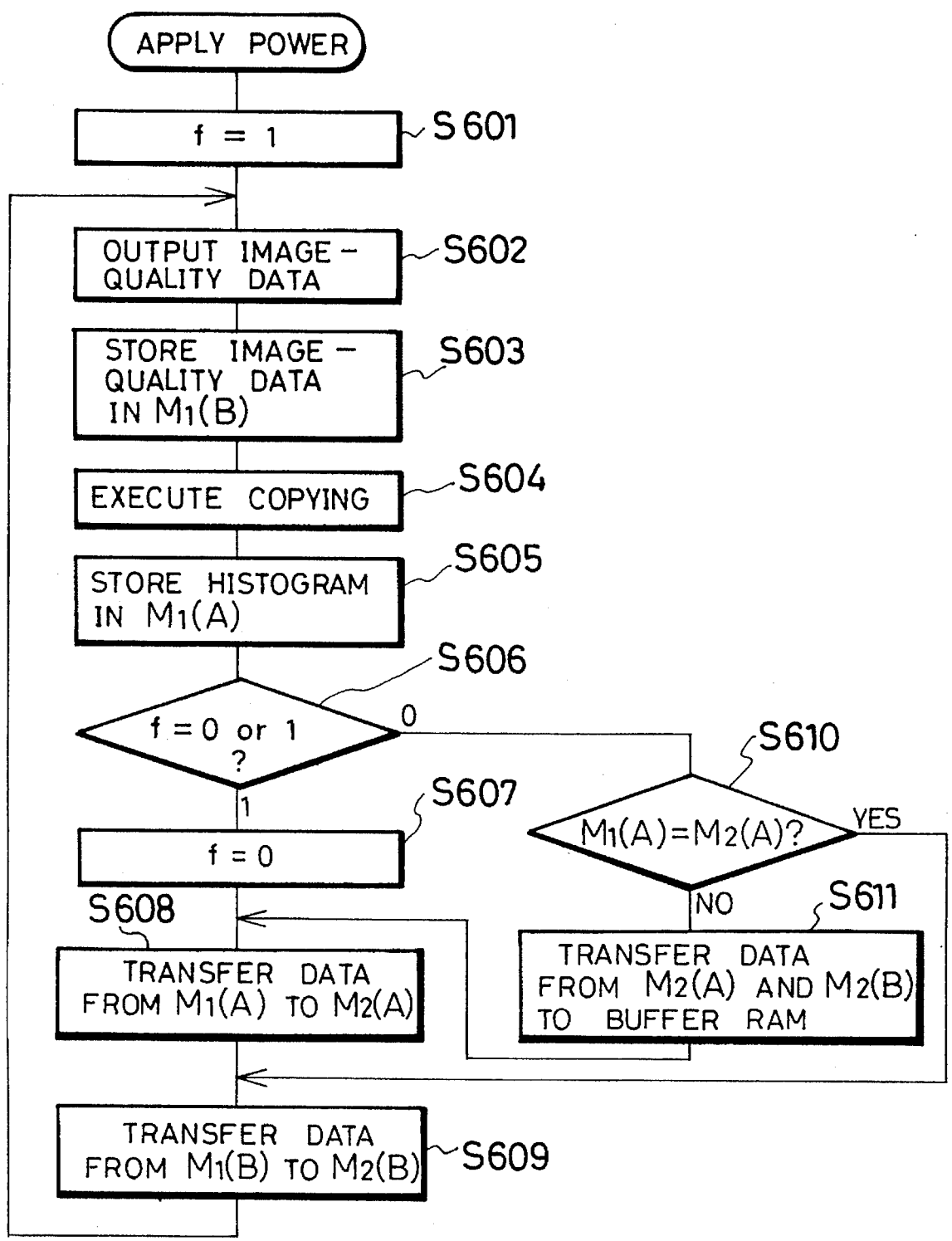
FIG. 33 is a flow chart showing a sequence of control procedures that are carried out upon writing data in the buffer RAM in the second modified example of the fifth processing system of FIG. 27.

In a copying operation after the learning carried out in this modified example, a sequence of processes shown in the flow chart of FIG. 32 is performed instead of the processes S509 through S510 shown in the flow chart of FIG. 31.

In these processes, after a judgement has been made at S508 that the number of data is not more than 100 pairs, a judgement is made as to whether or not the number of data just equals 100 pairs (S518). If the number of data equals 100 pairs, the sequence proceeds to S511. In contrast, if the number of data is less than 100 pairs, the switch 505 connects the contact points 505a and 505b, while the switch 506 connects the contact points 506a and 506b in the same manner as S509 (S519). Then, the current histogram data and the image-quality data are registered in the buffer RAM 504 as learning data (S520), and the sequence proceeds to S513.

In accordance with these processes, if the number of the learning data is less than 100 pairs, only the registration of the learning data is made, and the learning is initiated after the learning data of 100 pairs have been accumulated and sufficiently maintained. This makes it possible to prevent the learning from being initiated without having a sufficient amount of learning data.

If the learning is made by using only a few specific learning data, it is quite possible that the amount of correction on the weights becomes larger when the learning is made later by using a lot of learning data. This results in more time to be required for the learning. For example, suppose that only one of the weights makes a large minus value in the learning that is carried out by using only a few learning data. However, in the learning carried out by using a lot of data, it might be better to correct the weight in question to a plus value. In such a case, it is necessary to revise the contents of the learning by repeating a number of learnings to correct the weight from the large minus value to a plus value.

In contrast, with the processes of the present modified example, it is possible to conduct the learning intensively after a sufficient amount of learning data has been accumulated. Therefore, it is possible to prevent the learning from depending on specific learning data, thereby eliminating the possibility of prolonged learning time. Further, since the learning is made by using sufficient learning data, the setting of the image-quality is carried out more accurately.

MODIFIED EXAMPLE 2 OF THE FIFTH PROCESSING SYSTEM

The second modified example of the present processing system is arranged so that data to be obtained immediately before the document is replaced is adopted as write-in data to the buffer RAM 504. Here, an explanation will be given on the case where the user makes copies on the same document image by using several kinds of setting beforehand, and then makes a final copy after selecting the optimum setting of the image-quality for copying.

In this case, since the learning is made on a plurality of image-quality data for the image information derived from the same document, the learning tends to lack convergence. In order to solve this problem, the present modified example provides control so that, concerning pieces of image information that are successively inputted with respect to the same document, only the image-quality data that have been last inputted are learned by the neurocomputer 204. In order to achieve this arrangement, for example, the following two methods are proposed: one method for detecting the fact that the cover of the document platen 82 is opened; and the other method for detecting a change in document images. Referring to a flow chart shown in FIG. 33, the following description will discuss the latter case with respect to its control sequence of data-writing processes onto the buffer RAM 504.

In this arrangement, memories $M_1$ and $M_2$ (not shown) are allocated to the TempRAM 508. The memory $M_1$ has an image memory $M_1$ (A) for storing histogram data obtained from a document image and a setting memory $M_1$ (B) for storing image-quality data released from the operation section 83. Also, the memory $M_2$ has an image memory $M_2$ (A) for storing histogram data obtained from a document image and a setting memory $M_2$ (B) for storing image-quality data released from the operation section 83.

When power is applied to the copying machine, a flag f for indicating whether or not the copying in question is the first one is set to "1" (the first one) (S601). When the image-quality data are released from the operation section 83 through the user's instruction (S602), the setting memory $M_1$ (B) stores the image-quality data (S603). Successively, a copying Operation is carried out in accordance with the inner parameters that are determined by the image-quality data (S604). Further, the current histogram data are stored in the image memory $M_1$ (A) (S605).

Next, a judgement is made as to whether the flag f is "1" or "0" (other than the first one) (S606), and if the flag is "1", the flag f is changed to "0" (S607). Thereafter, the histogram data stored in the image memory $M_1$ (A) are shifted to the image memory $M_2$ (A) (S608). Further, the image-quality data stored in the setting memory $M_1$ (B) are shifted to the setting memory $M_2$ (B) (S609), and the sequence returns to S602.

After the processes from S602 to S603 have been again carried out, the second copying operation is performed at S604. Then, a judgement is made as to whether the flag f is "1" or "0" at S606. Here, the flag f has been set at "0" since the previous process at S607. Therefore, in this case, a comparison is made between the data stored in the image memory $M_1$ (A) and the data stored in the image memory $M_2$ (A), and a judgement is made as to whether or not both of the data coincide with each other (S610).

If both of the data do not coincide, that is, if the document in question has been replaced, both of the data stored in the image memory $M_2$ (A) and the setting memory $M_2$ (B) are shifted to the buffer RAM 504 (S611), and the sequence proceeds to S608. Further, if both of the data coincide with each other, that is, if the same document has been used, the sequence proceeds to S609.

As described above, as to pieces of image information that are successively inputted with respect to the same document, only the image-quality data that have been last inputted are registered in the buffer RAM 504. Thus, it is possible to supply the neurocomputer 204 with the exact data to be learned.

MODIFIED EXAMPLE 3 OF THE FIFTH PROCESSING SYSTEM

The third modified example of the present processing system is arranged so that in the case where data to be inputted to the buffer RAM 504 are similar to the data that have already been registered in the buffer RAM 504, the data in question are not allowed to be written in the buffer RAM 504. In other words, a judgement is made as to whether there is a similarity between the current data on a document image that is stored in the TempRAM 508, shown in FIG. 29, and the data that have been registered in the buffer RAM 504 which has a construction shown in FIG. 30.

More specifically, it is defined that respective elements of the data in the TempRAM 508 and those in the buffer RAM 504 have directional characteristics in their dimension which are individually different from one another, and that the difference between values of a corresponding pair of the elements (dimension) on both of the data represents a distance. Then, the sum (hereinafter, referred to as sum S) is found by adding squares of the distances with respect to the elements (18 elements: 15 histogram data and 3 image-quality data). If the sum S is smaller than the predetermined value, the judgement is made that both of the data are similar to each other, and if it is not the case, the judgement is made that they are not similar to each other. For example, assuming that the values of 18 elements are Xi and Yi respectively, the sum S is represented by the following equation (11). Here, i represents an address where each element is stored.

$$S = \sum_{i=0}^{17} (Xi - Yi)^2 \tag{11}$$

Figure 34:
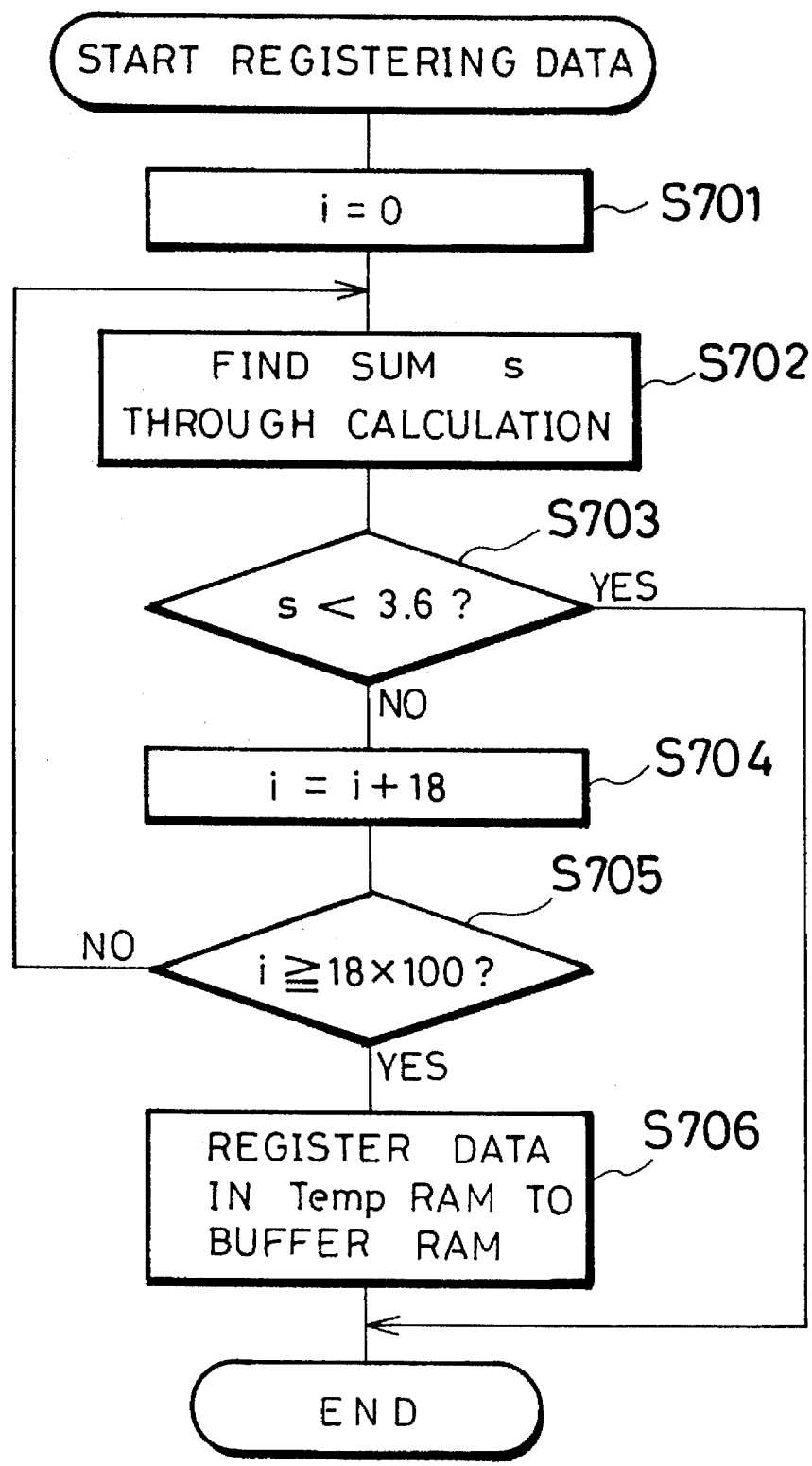
FIG. 34 is a flow chart showing a sequence of control procedures that are carried out upon writing data in the buffer RAM in the third modified example of the fifth processing system of FIG. 27.

The data are written in the buffer RAM 504 in accordance with a flow chart shown in FIG. 34.

Firstly, when the registering of the data is started in the buffer RAM 504, the address i of the buffer RAM 504 is set to "0" (S701). Data consisting of 18 elements (one pair of data) that begin with the address i in the buffer RAM 504 and one pair of the histogram data and the image-quality data stored in the TempRAM 508 are compared with each other in their respective elements. Thus, the sum S is calculated in accordance with the equation (11) based on the squares of the respective distances (S702).

Suppose that the histogram data are normally distributed so as to have values ranging from 0 to 1. Then, a judgement is made as to whether or not the sum S is smaller than a predetermined reference value for use in the judgement on the similarity, for example, 3.6 (which is 20% of the maximum value 18 of the sum S)(S703). Here, the percentage of 20 is used as one example, and the reference value may be preferably set depending on cases. If the sums is smaller than 3.6 at S703, the judgement is made that both of the data are similar to each other, and the sequence is completed without registering the inputted data in the buffer RAM 504. Further, if the sum S is not less than 3.6 at S703, the buffer RAM 504 adds 18 to i in order to calculate the square of the distance with respect to the next data in the buffer RAM 504 (S704).

Then, in the case of using, for example, 100 pairs of data that correspond to the capacity of the buffer RAM 504, i is compared with 18×100 in its size (S705). If i is smaller than 18×100, that is, if the sum S has not been found with respect to all the data in the TempRAM 508 and all the 100 pairs of data in the buffer RAM 504, the sequence returns to S702. Further, if i is not less than 18×100, the data in the TempRAM 508 are registered in the buffer RAM 504(S706), and the sequence is completed.

As described above, with the arrangement wherein similar data are not registered in the buffer RAM 504, it becomes possible to prevent it from learning the same patterns, thereby permitting it to learn more patterns of various kinds. Therefore, the image-quality for copying is determined more accurately for more kinds of document images.

SIXTH PROCESSING SYSTEM

Figure 35:
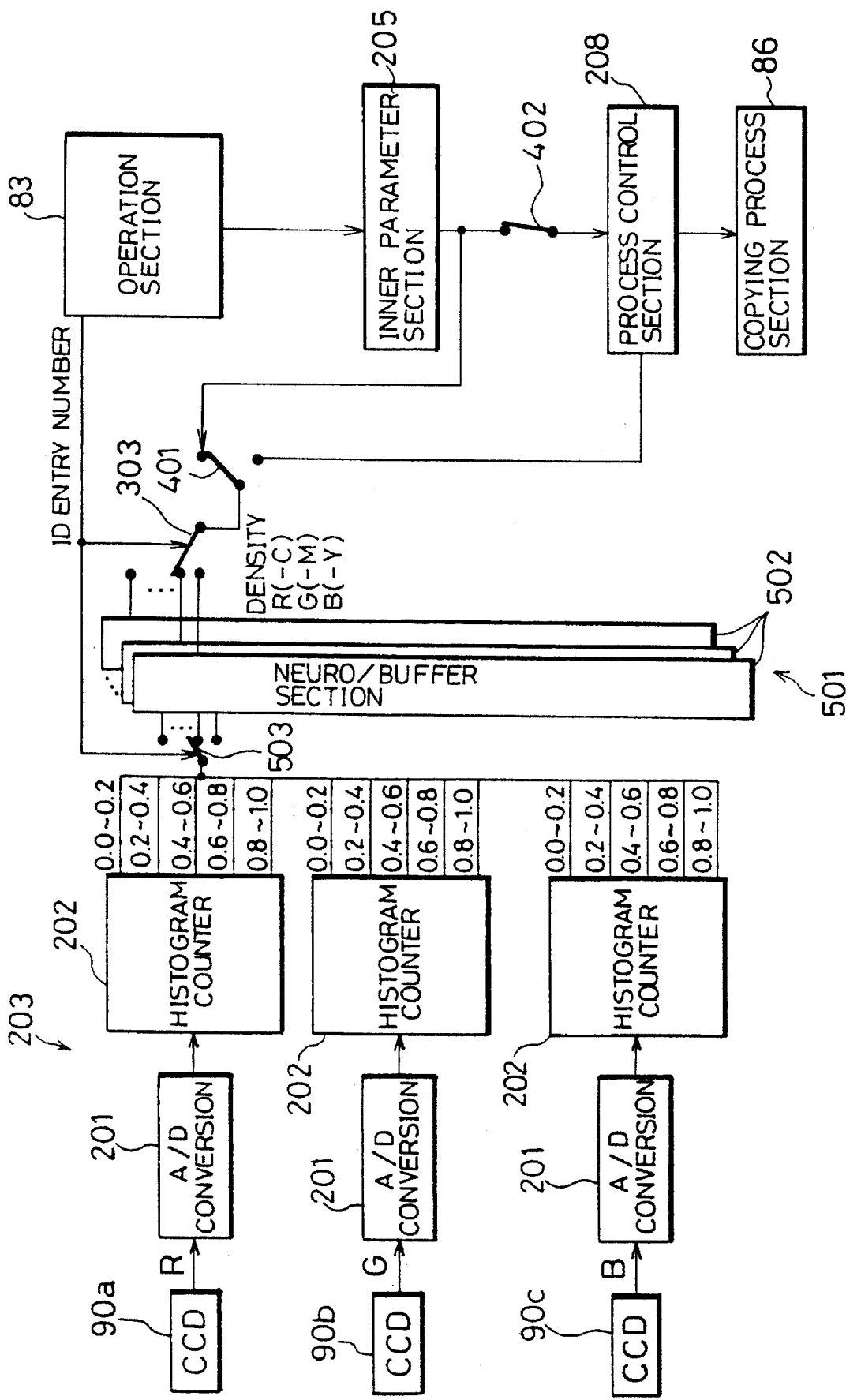
FIG. 35 is a block diagram showing the sixth processing system of the copying machine in connection with the third embodiment of the present invention.

As shown in FIG. 35, the present processing system is designed so that the neuro/buffer section 502 in the operation processing section 501 releases inner parameters, which is different from the fifth processing system. Therefore, the operation processing section 501 in the present processing system functions as the parameter setting means.

As with the aforementioned fourth processing system, in the present processing system, the operation section 83 and the inner parameter section 205 are directly connected to each other, and the neuro/buffer section 502 is connected to the inner parameter section 205 or the process control section 208 through the switches 303 and 401. Here, the inner parameter section 205 and the process control section 208 are connected and disconnected through the turning on/off of the switch 402.

In the sixth processing section which is configured as described above, the learning and copying are conducted in the same manner as those of the fifth processing system. However, in this processing system, the relationship between the histogram data and the inner parameters is learned by the neuro/buffer section 502. Further, upon copying, the inner parameters that have been calculated in the neuro/buffer section 502 are supplied to the process control section 208.

Thus, as with the copying machine equipped with the fifth processing system, the copying machine equipped with the sixth processing system allows the learning on a number of data by the use of the buffer RAM 504. This arrangement prevents the learning from being biased to only specific image information, thereby making it possible to set image-quality for copying more accurately upon copying.

Additionally, as with the fifth processing system, the present processing system has the first through third modified examples; yet, the description thereof is omitted for convenience of explanation. In the first through third modified example of the present processing system, the learning data consist of pairs of the histogram data and inner parameter.

SEVENTH PROCESSING SYSTEM

Figure 36:
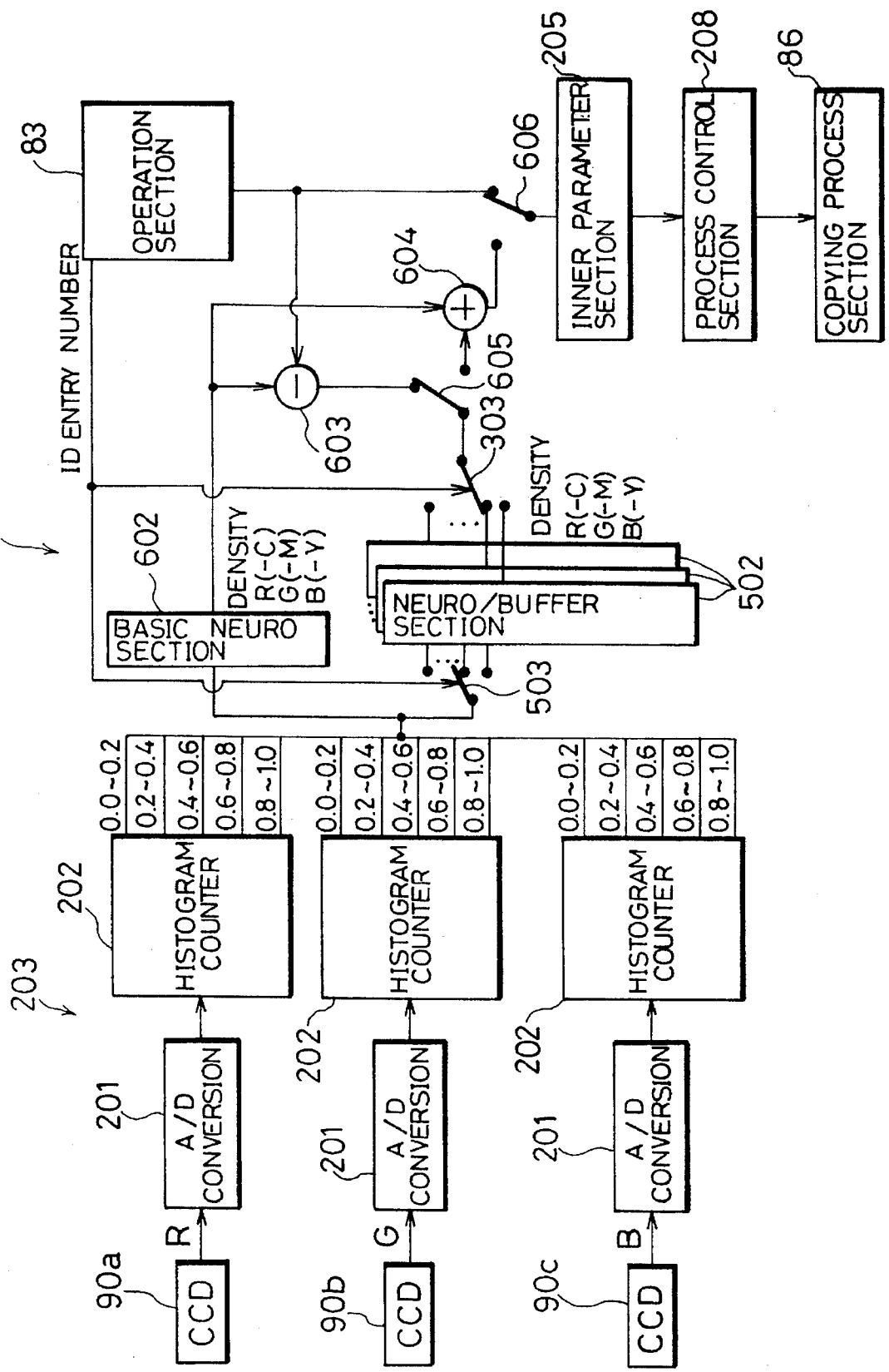
FIG. 36 is a block diagram showing the seventh processing system of the copying machine in connection with the third embodiment of the present invention.

As shown in FIG. 36, the present processing system is provided with an operation processing section 601 as the image-quality condition setting means. The operation processing section 601 is constituted of a plurality of neuro/buffer sections 502 and a basic neuro section 602. In this processing system, the histogram data released from the histogram counters 202 are inputted to one of the neuro/buffer sections 502 functioning as a difference-learning operation means, and also directly inputted to the basic neuro section 602, through the switch 503.

The basic neuro section 602, which functions as a basic-learning operation means, is a neurocomputer which has already learned the relationship between various histogram data and the optimum image-quality data for the histogram data, and is arranged so that the image-quality data that are suitable for the inputted histogram data is found through the calculations that are carried out in accordance with the contents of the learning. The basic neuro section 602 is connected to a subtracter 603 and an adder 604 at its output side.

The subtracter 603, which functions as a subtraction means, is connected to the operation section 83 and a switch 605. The switch 605 is connected to the adder 604 functioning as an addition means and the switch 303, and is designed to connect the switch 303 and the subtracter 603 during the learning of the neurocomputer 204 as well as connecting the switch 303 and the adder 604 during copying in the automatic mode.

The adder 604 is connected to the inner parameter section 205 through the switch 606. The switch 606 is also connected to the operation section 83, and is designed to connect the inner parameter section 205 and the operation section 83 during the learning of the neurocomputer 204 as well as connecting the inner parameter section 205 and the adder 604 during copying in the automatic mode.

The following description will discuss the operation of the seventh processing system during the learning which is arranged as described above.

When an ID entry number is registered through an entering operation to the operation section 83, one of the neuro/buffer sections 502 is allocated to the ID entry number. Then, the switch 303 is switched to the neuro/buffer section 502 in question. Further, the switch 303 is connected to the subtracter 603 through the switch 605, and the operation section 83 is connected to the inner parameter section 205 through the switch 606.

In this state, the basic neuro section 602 calculates image data based on the fifteen histogram data that have been inputted from the histogram counters 202. Then, the subtracter 603 calculates differences between the image-quality data released from the operation section 83 by the user's instruction and those that are released from the basic neuro section 602.

These differences are inputted to the output side of the neuro/buffer section 502 through the switch 605. Here, the histogram data have been inputted to the input side of the neuro/buffer section 502 through the switch 503. The neuro/buffer section 502 conducts the same learning as that of the aforementioned fourth processing system by using the histogram data and the difference as one pair of data.

Moreover, the inner parameters are determined in the inner parameter section 205 based on the image-quality data that have been released from the operation section 83. When the process control values are determined in the process control section 208 in accordance with the inner parameters, the process control values are supplied to the process control section 86.

Furthermore, the image-quality data are also supplied to the inner parameter section 205 through the switch 606. Therefore, the inner parameters are released from the inner parameter section 205, and the process control values are calculated in the process control section 208 based on the inner parameters.

In the case of conducting a copying operation in the automatic mode after the learning as described above, the neuro/buffer section 502 is connected to the adder 604 through the switch 605, and the adder 604 is connected to the inner parameter section 205 through the switch 606. In this state, the histogram data released from the histogram counters 202 are inputted to the basic neuro section 602 and the neuro/buffer section 502 that has been selected by the ID entry number. In this case, the contact points 505a and 505c are connected to each other in the switch 505, and the contact points 506a and 506c are connected to each other in the switch 506.

With this arrangement, in the basic neuro section 602 and the neuro/buffer section 502, the image-quality data are produced by making calculations based on the histogram data that have been respectively inputted thereto, in accordance with the contents of the learning. After having been added by the adder 604, these image-quality data are supplied to the inner parameter section 205 through the switch

606. In the inner parameter section 205, the inner parameters are determined based on the output of the adder 604. Then, a copying operation is carried out based on the inner parameters.

Additionally, in the above-mentioned learning, as to the initial values of the neuro-buffer section 502 except for the basic neuro section 602, all the weights other than the threshold value W20k shown in FIG. 2(b) are set to zero. Further, the threshold value W20k is defined as an appropriate positive value (for example, a value close to+6 in x shown in FIG. 3). If the output of the neurocomputer 204 is calculated in accordance with the equation (3) by using this value, the output becomes virtually zero. Therefore, even in a state where the learning has not been completed yet, it is possible to prevent inappropriate image data from being released.

As described above, in the seventh processing system, the neurocomputer 204 learns the difference between the image-quality data that have been predetermined in the basic neuro section 602 and those that have been determined by the user's instruction, and upon copying, the output of the basic neuro section 602 and the output of the neurocomputer 204 are added together, and the resulting value is supplied to the inner parameter section 205.

In a control system that is not arranged as described above, if the number of the learning is small because of, for example, a case where the copying machine is used immediately after its installation, it is not possible to obtain copies with good image quality due to the shortage of data. The shortage of data causes a problem wherein the learning tends to lack convergence in the cases when a plurality of image-qualities for copying are set for the same document and a number of similar data are inputted. However, in the copying machine provided with the seventh processing system, since the learning has been preliminarily provided based on the basic image-quality data and since the learning is also arranged to be repeated in accordance with the user's tastes, it is possible to make copies in accordance with the basic characteristics even if the number of the learning is small.

MODIFIED EXAMPLE OF THE SEVENTH PROCESSING SYSTEM

Figure 37:
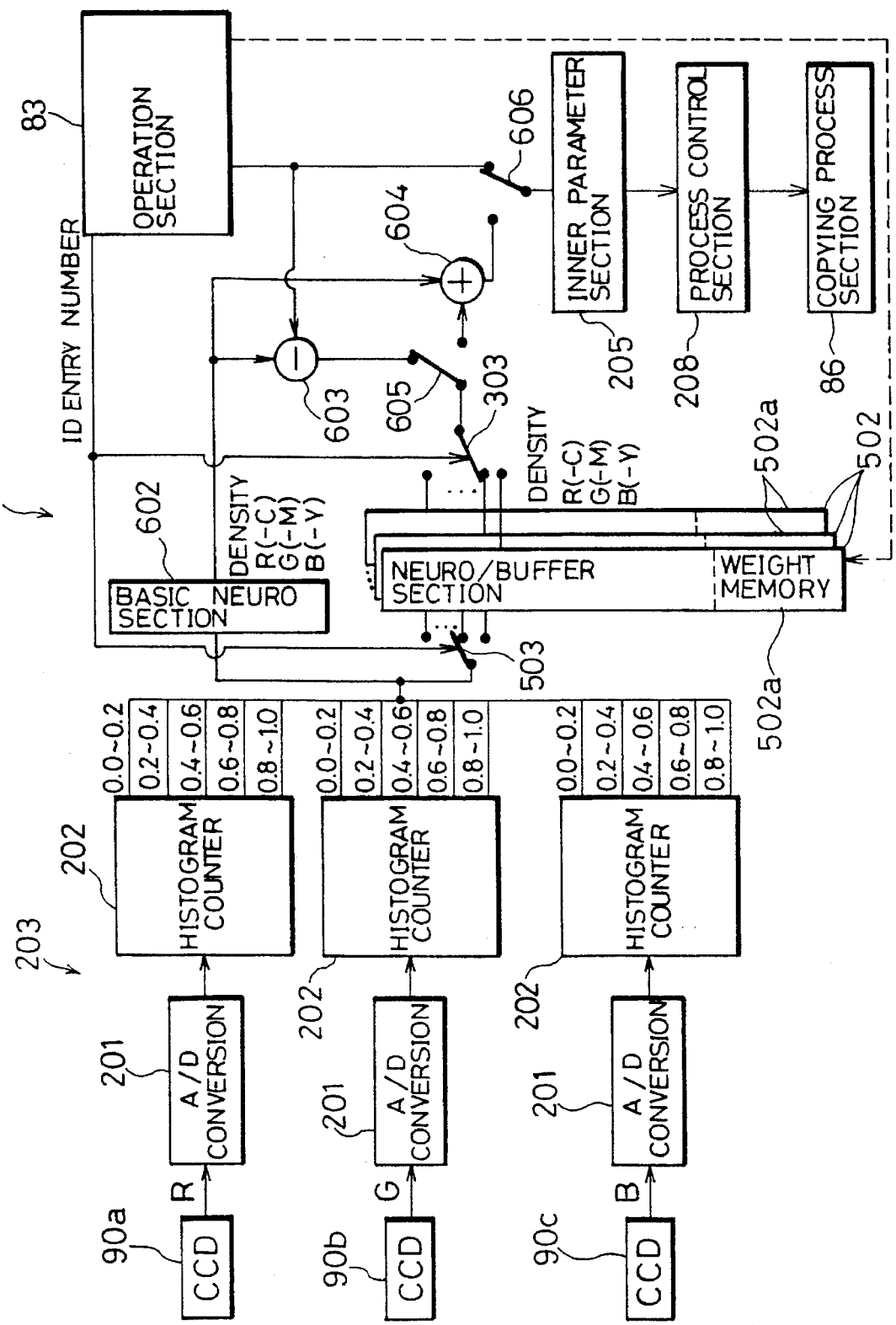
FIG. 37 is a block diagram showing a configuration of a modified example of the seventh processing system of FIG. 36.

As shown in FIG. 37, the modified example of the present processing system, which has a basic configuration as shown in FIG. 36, is arranged to erase the contents of the learning of the neurocomputer 204 on the basis of each ID entry number. The contents of the learning are stored in weight memories 502a installed in the respective neuro/buffer sections 502. In the present processing system, for example, by entering an ID entry number by the use of the ten keys 120 of the operation section 83, the weights are erased from the weight memory 502a in the neuro/buffer section 502 corresponding to the ID entry number.

More specifically, all the weights other than the threshold value W20k shown in FIG. 2(b) are cleared to zero. Further, the threshold value W20k is set to an appropriate positive value (for example, a value close to 6 in x shown in FIG. 3). Thus, upon setting the image-quality for copying, the output of the neurocomputer 204 becomes virtually zero.

In the case of changing ID entry numbers in the control system arranged as described above, the contents of the learning in the neurocomputer 204 corresponding to the ID entry number to be changed are first erased. This is carried out by the user's instruction that is given through the operation section 83.

Here, a figure for setting the erasing mode for erasing an ID entry number is preliminarily determined, and the erasing mode is on by entering the figure through the ten keys 120 on the operation section 83. Then, the ID entry number in question is entered through the ten keys 120 in the same manner in order to erase the contents of the learning in the neurocomputer 204 corresponding to the ID entry number. In this state, a new ID entry number for the neurocomputer 204 is registered by entering it to the operation section 83.

With this arrangement, it becomes possible to give relearning to the neurocomputer 204. For example, if any trouble arises in the contents of the learning, the image-quality for copying which meets the desired setting is not obtained even after repeating new learning, without erasing the contents of the learning.

Moreover, in the case where a certain user, who has used a certain neurocomputer 204, allows another user to use the neurocomputer 204, if the contents of the learning used by the former user still remain, the latter user cannot enter new learning, and cannot obtain his desired image-quality for copying. However, the present processing system, which allows the relearning readily, makes it possible to avoid the unwanted image-quality setting caused by the unnecessary contents of the learning.

EIGHTH PROCESSING SYSTEM

Figure 38:
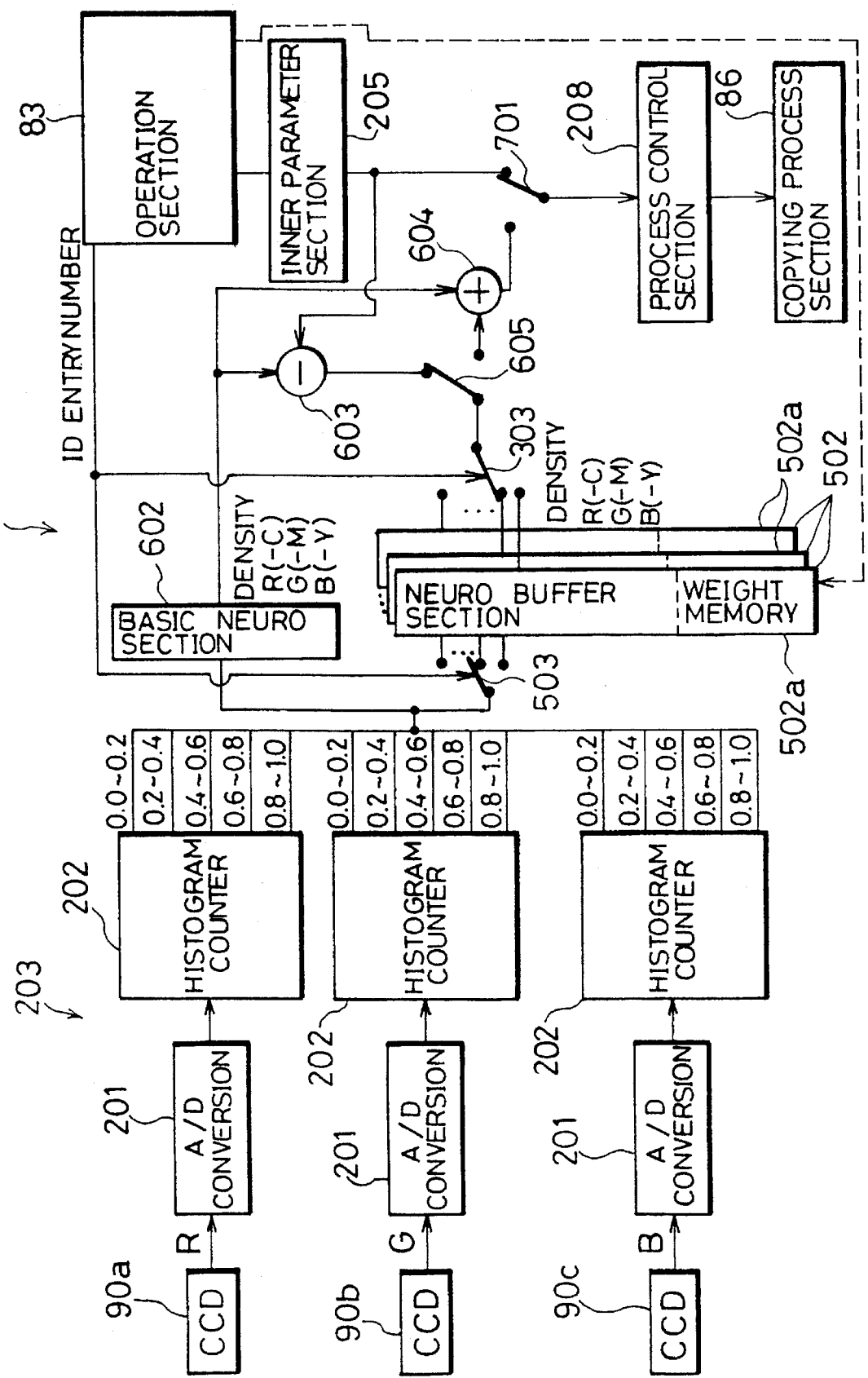
FIG. 38 is a block diagram showing a configuration of a neurocomputer in the eighth processing system in the copying machine in connection with the third embodiment of the present invention.

As shown in FIG. 38, the present processing system is different from the seventh processing system in that the basic neuro section 602 has preliminarily learned the relationship between various histogram data and the optimum inner parameters that are suitable for the histogram data, and that the inner parameters that are suitable for inputted histogram data are found through operations that are executed based on the contents of the learning. Therefore, the operation processing section 601 in the present processing system functions as the parameter setting means.

In the present processing system, the operation section 83 and the inner parameter section 205 are directly connected to each other. Further, the subtracter 603 is connected to the inner parameter section 205 and the switch 605. The adder 604 is connected to the process control section 208 through a switch 701. The switch 701, which is also connected to the inner parameter section 205, connects the process control section 208 to the inner parameter section 205 during the learning, as well as connecting the process control section 208 to the adder 604 during copying in the automatic mode.

In the eighth processing system arranged as described above, the learning and copying are carried out in the same manner as those described in the seventh processing system. However, in this processing system, the relationship between the histogram data and the inner parameters is learned by the neuro/buffer section 502 in the operation processing section 601. Further, upon copying, the inner parameters are found through calculations that are executed in the basic neuro section 602 and the neuro/buffer section 502. Then, the inner parameters are supplied to the process control section 208 through the switch 701.

As described above, in the copying machine provided with the eighth processing system, since the learning has been preliminarily provided based on the basic inner parameters and since the learning is also arranged to be repeated in accordance with the user's tastes. Therefore, as with the copying machine provided with the seventh processing system, it is possible to make copies in accordance with the basic characteristics even if the number of the learning is small.

Additionally, as with the seventh processing system, the present processing system has a modified example; yet, the description thereof is omitted for convenience of explanation. In this modified example, the contents of the learning are easily updated by erasing the weights of the weight memories 502a installed in the respective neuro/buffer sections 502.

NINTH PROCESSING SYSTEM

Figure 39:
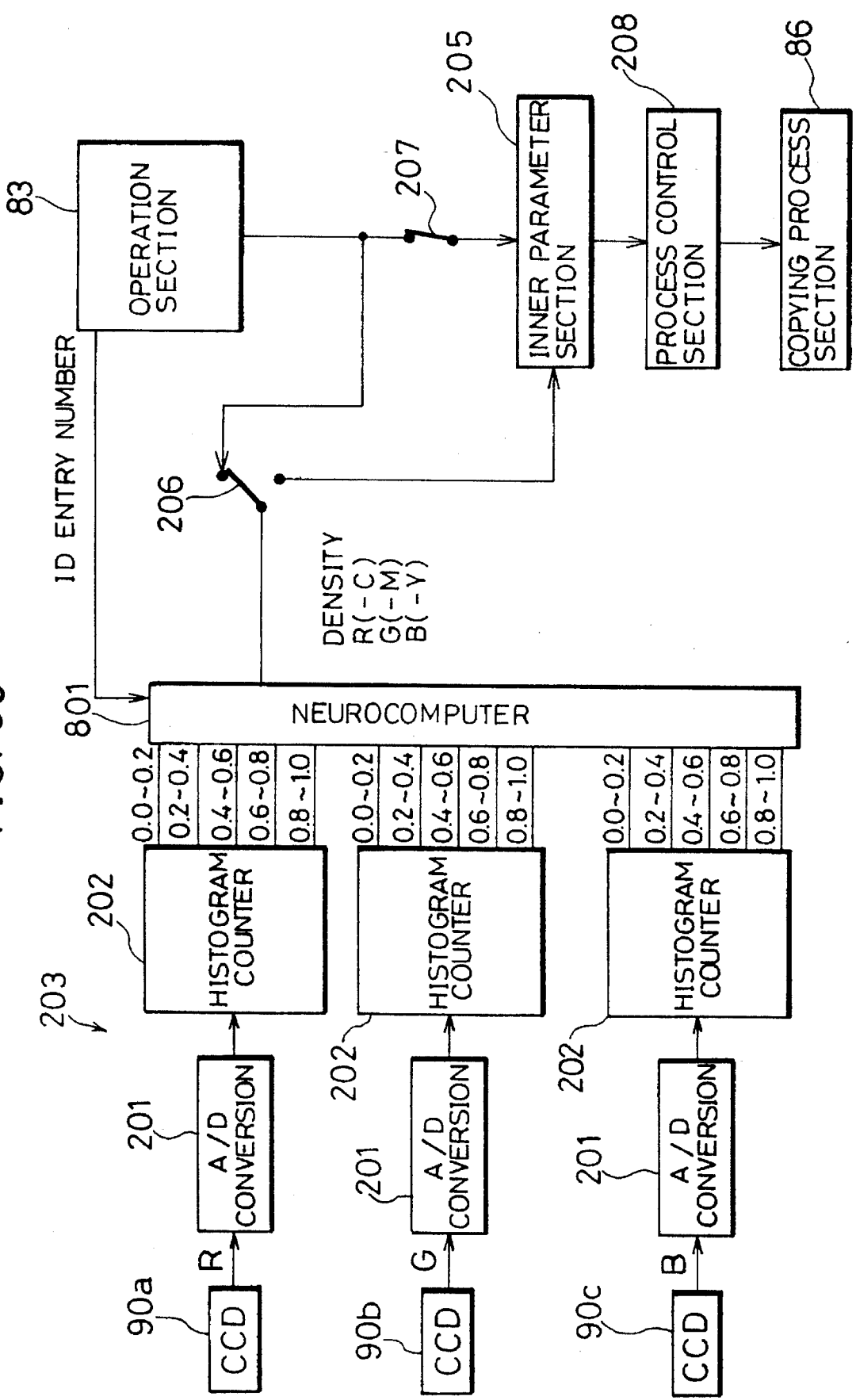
FIG. 39 is a block diagram showing a configuration of a neurocomputer in the ninth processing system in the copying machine in connection with the third embodiment of the present invention.

As shown in FIG. 39, the present processing system is provided with a neurocomputer 801. As with the neurocomputer 204 in the aforementioned first processing system, the neurocomputer 801, which functions as the image-quality setting means, is connected to the operation section 83 or the inner parameter section 205 through the switch 206. Further, the operation section 83 is connected to the inner parameter section 205 through the switch 207.

Figure 40:
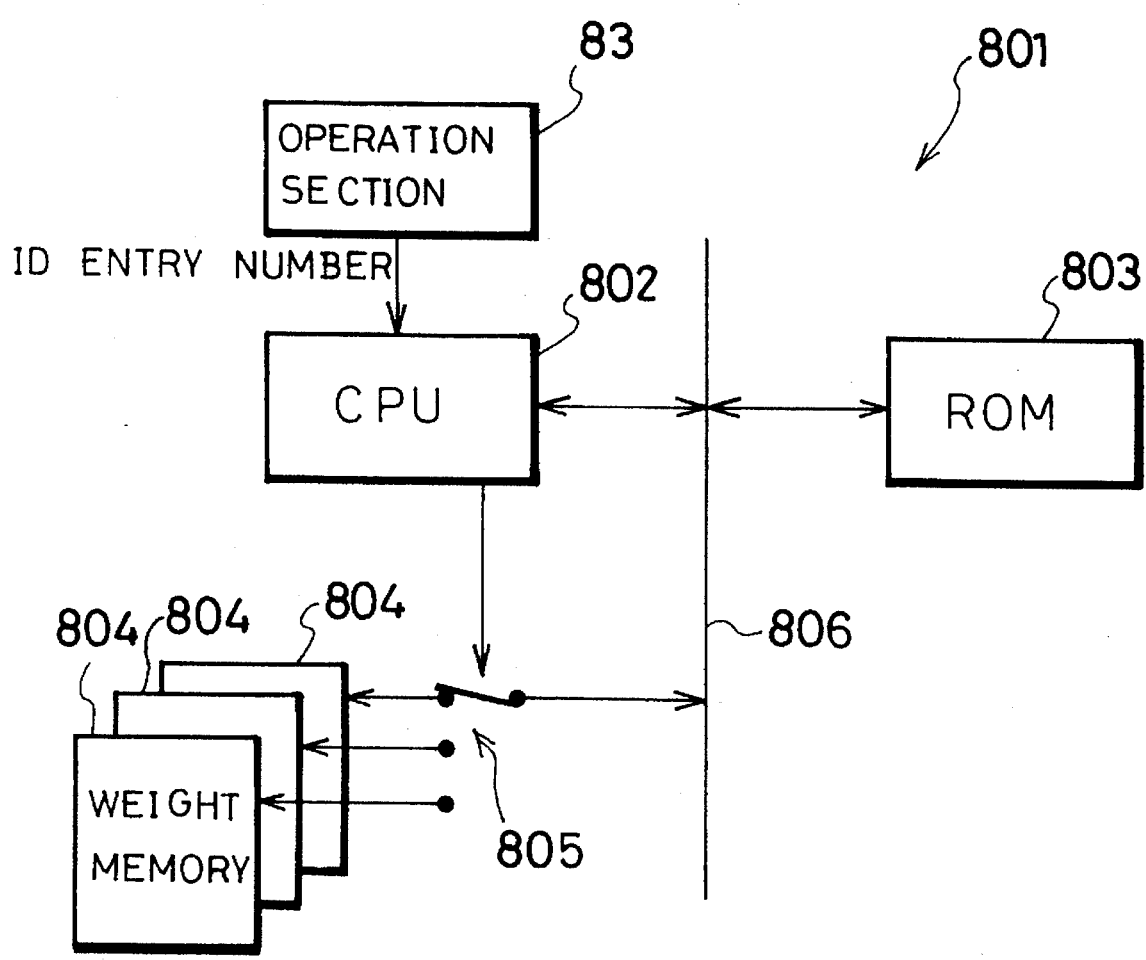
FIG. 40 is a block diagram showing a configuration of a neurocomputer in the third processing system of FIG. 39.

As shown in FIG. 40, the neurocomputer 801 is provided with a CPU 802, a ROM 803, weight memories 804, a switch 805 and a CPU bus 806.

The CPU 802, which executes neuro operations based on a program stored in the ROM 803 as described earlier, constitutes a processing section together with the ROM 803. In the present processing system, the CPU 802 is provided with a function by which the weight memory 804 corresponding to the ID entry number in question is connected to the CPU bus 806 by switching the switch 805 as a connecting section in accordance with the ID entry number released from the operation section 83.

The weight memories 804 functioning as a learned content storage means store the weights as the contents of the learning for the respective ID entry numbers. Thus, in FIGS. 4, 5, and 6, W1[i][j] is converted to W1[ID][i][j] and W2[j][k] is converted to W2[ID][j][k].

As described above, in the present processing system, those weight memories 804, which are installed separately from the CPU 802, are selected by the respective ID entry numbers, and connected to the CPU 802. Therefore, the present processing system eliminates the necessity of having to install the neuro operation sections having respective CPU 802 as their essential component as many as the number of the ID entry numbers. Since only one neuro operation section is necessary, it is possible to simplify the configuration of the neurocomputer 801.

TENTH PROCESSING SYSTEM

Figure 41:
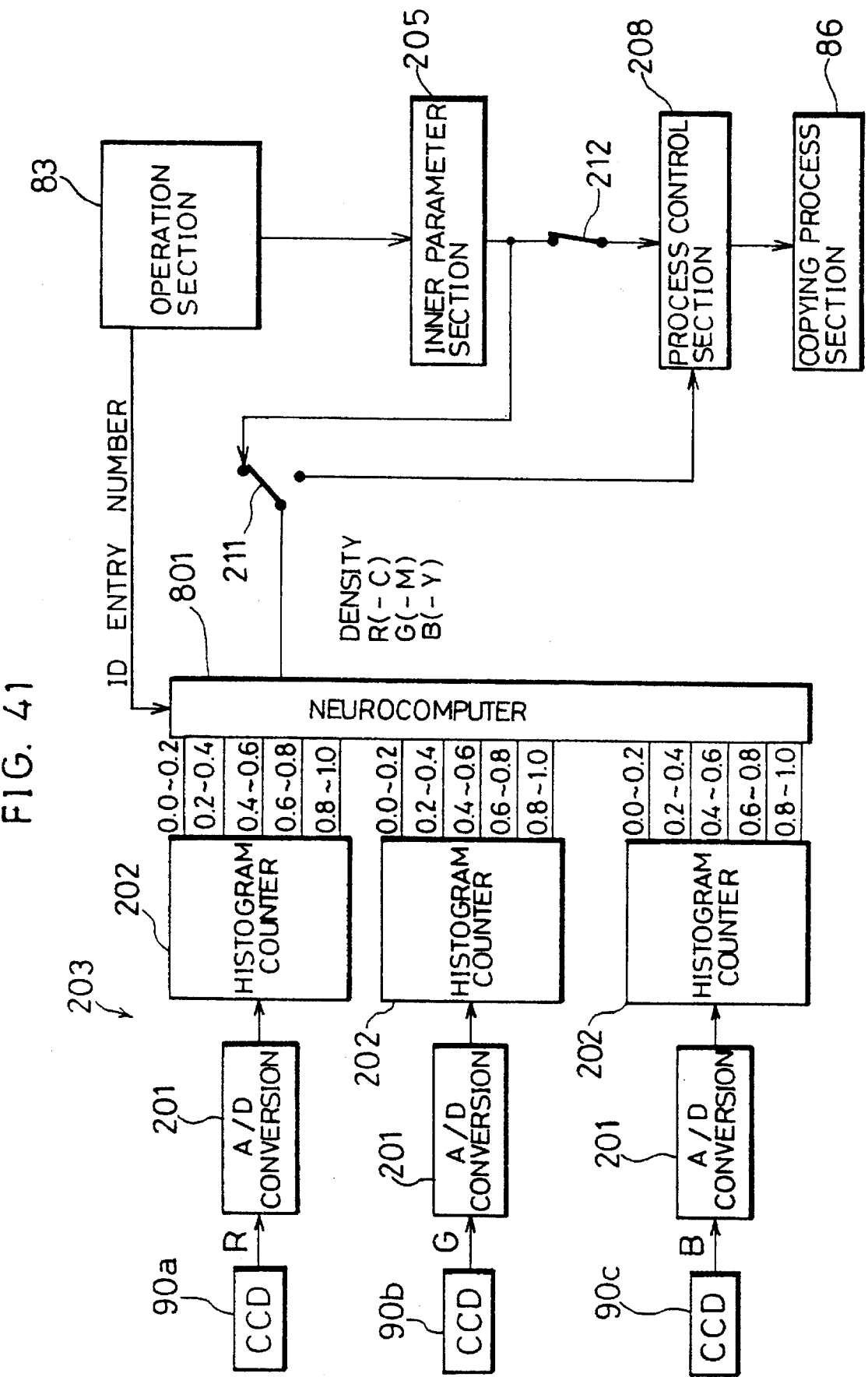
FIG. 41 is a block diagram showing a configuration of a neurocomputer in the tenth processing system in the copying machine in connection with the third embodiment of the present invention.

As shown in FIG. 41, the present processing system is different from the aforementioned ninth processing system in that the neurocomputer 801 is arranged to release the inner parameters. Therefore, the neurocomputer 801 in the present processing system functions as the parameter setting means.

More specifically, the operation section 83 and the inner parameter section 205 are directly connected to each other, and the neurocomputer 801 is connected to the inner parameter section 205 or the process control section 208 through the switch 211. Further, the inner parameter section 205 and the process control section 208 are connected and disconnected through the turning on/off of the switch 212.

In the present processing system, it is possible to eliminate the necessity of having to install the neuro operation sections having respective CPU 802 as their essential component as many as the number of the ID entry numbers, thereby simplifying the configuration of the neurocomputer 801.

EMBODIMENT 4

Figure 42:
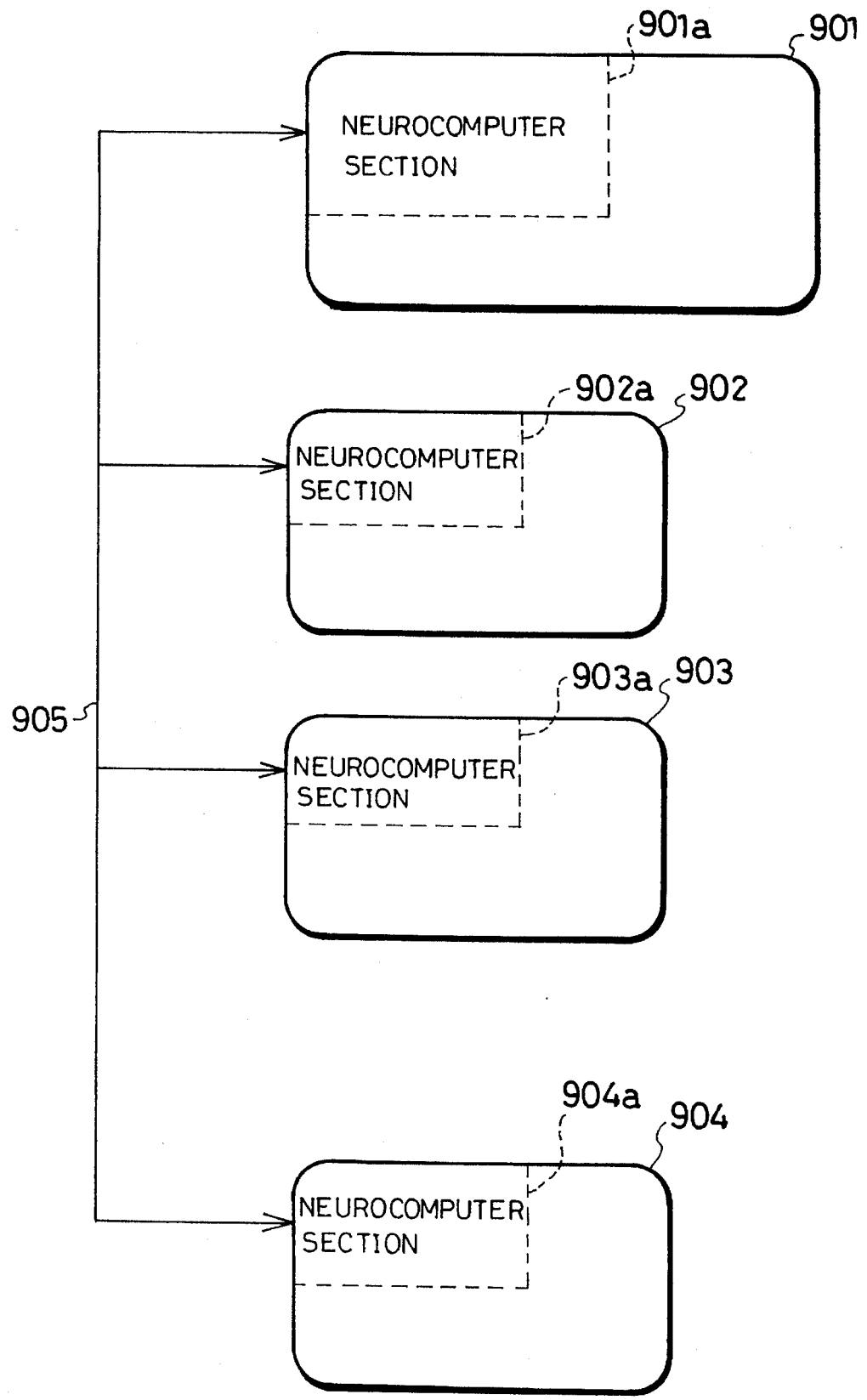
FIG. 42, which shows the fourth embodiment of the present invention, is an explanatory drawing showing a construction wherein a plurality of copying machines are connected to one another through a network.

Referring to FIG. 42, the following description will discuss the fourth embodiment of the present invention.

In the present embodiment, an explanation will be given on an arrangement wherein a plurality of copying machines 901 through 904 are installed, and connected to one another through a network 905 or other means so to form one system as shown in FIG. 42.

The copying machines 901 through 904 are respectively provided with neurocomputer sections 901a through 904a. As with the neurocomputer 204 and the operation processing sections 301, 501 and 601 in the aforementioned third embodiment, each of neurocomputer sections 901a through 904a is designed to learn the relationship between the image information and the image-quality for copying (image-quality data or inner parameters) and execute necessary operations based on the contents of the learning so as to obtain appropriate image-quality for copying. The copying machine 901, which functions as a parent machine, stores the contents of the learning. The copying machines 902 through 904, which function as child machines, is arranged to store the contents of the learning temporarily.

The copying machine 901 carries out a copying operation in the same manner as the copying machine of the aforementioned embodiment 3. Further, the copying machines 902 through 904, installed as external apparatuses, send respective ID entry numbers to the copying machine 901, receive the contents of the learning corresponding to the ID entry numbers from the copying machine 901, and carry out copying operations respectively by setting the image quality in accordance with the contents of the learning. Moreover, the copying machines 902 through 904 are subjected to the learning based on newly inputted data, if necessary, as well as setting the image quality. The contents of the learning that are revised through the learning in question are sent back to the copying machine 901.

With this arrangement, there is no need for employing the memory cards 302 and 305 that have been described in the third embodiment. Further, upon making copies, any copying machine 901 through 904 can use the same contents of the learning. As a result, without the necessity of paying attention to which copying machine, 901 through 904, contains the necessary contents of the learning, the user can operate any of the copying machines 901 through 904 in the same manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus comprising:

a photoreceptor;

image forming means which includes the photoreceptor, and which carries out an operation for forming an image;

density detection means for detecting a density of a toner image that is formed on the photoreceptor;

initial density storage means for storing a density of the toner image in an initial state, the stored density having been detected by the density detection means;

density-change detection means for detecting a change in density between the density stored in the initial density storage means and the density of a toner image that is detected by the density detection means after a plurality of image forming operations have been carried out by the image forming means;

density-change storage means for storing the change in density that has been detected by the density-change detection means; and image-quality compensating means for learning a relationship between input data and teaching data, the input data being derived from the change in density stored in the density-change storage means, the teaching data being derived from a compensating amount that matches the change in density for a control value to be given to the image forming means, and for calculating a compensating amount for a control value that is suitable for the change in density stored in the density-change storage means, in accordance with the contents of the learning, upon executing an image forming operation;

wherein the image-quality compensating means includes a neurocomputer of perceptron type that is constituted of an input layer, a hidden layer and an output layer.

2. An image forming apparatus as defined in claim 1, wherein:

the image forming means includes an exposure lamp for exposing the photoreceptor and a charger for charging the photoreceptor so as to form a latent image on the photoreceptor through an exposure of the exposure lamp;

the image-quality compensating means calculates amounts of compensation for control voltages to be applied to the exposure lamp and the charger;

the initial-density storage means includes first and second initial-density storage sections for individually storing the densities of toner images of two kinds having different densities;

the density-change storage means includes first and second density-change storage sections for individually storing changes in the densities of toner images of two kinds that have been detected by the density-charge detection means in comparison with the densities that have been individually stored in the first and second initial-density storage sections; and wherein the neurocomputer contains two units in the input layer for receiving as input data the changes in densities that have been stored in the first and second density-change storage sections as well as containing two units in the output layer for releasing the amounts of compensation that are to be given to the charger and the exposure lamp.

3. An image forming apparatus comprising:

a photoreceptor;

image forming means which includes the photoreceptor; and which carries out an operation for forming an image;

density detection means for detecting a density of a toner image that is formed on the photoreceptor;

initial-density storage means for storing a density of the toner image in an initial state, the stored density having been detected by the density detection means;

density-change detection means for detecting a change in density between the density stored in the initial density storage means and the density of a toner image that is detected by the density detection means after a plurality of image forming operations have been carried out by the image forming means;

density-change storage means for storing the change in density that has been detected by the density-change detection means;

operation-number counting means for counting the number of accumulated operations as to the image forming means since the initial state of the density of the toner image; and picture-quality compensating means for learning a relationship between input data and teaching data, the input data being derived from the change in density stored in the density-change storage means and the number of accumulated operations on the image forming means that has been detected by the operation-number counting means, the teaching data being derived from a compensating amount that matches the change in density and the number of accumulated operations as to the image forming means for a control value to be given to the image forming means, and for calculating a compensating amount for a control value that is suitable for the change in density stored in the density-change storage means and the number of accumulated operations that has been calculated by the operation-number counting means, in accordance with the contents of the learning, upon executing an image forming operation;

wherein the image-quality compensating means includes a neurocomputer of perceptron type that is constituted of an input layer, a hidden layer and an output layer.

4. The image forming apparatus as defined in claim 3, wherein:

the image forming means includes a developing device for developing a latent image that has been formed on the photoreceptor; and the operation-number counting means includes a developing counter for counting the number of developing processes that are carried out in the developing device.

5. The image forming apparatus as defined in claim 4, wherein the neurocomputer contains three units in the input layer for receiving as input data the changes in densities that have been stored in the first and second density-change storage sections and a count value of the developing counter, as well as containing two units in the output layer for releasing the amounts of compensation that are to be given to the charger and the exposure lamp.

6. The image forming apparatus as defined in claim 3, wherein the operation-number counting means includes a turning-on counter for counting the number of turning-on processes of the exposure lamp.

7. The image forming apparatus as defined in claim 6, wherein the neurocomputer contains three units in the input layer for receiving as input data the changes in densities that have been stored in the first and second density-change storage sections and a count value of the turning-on counter, as well as containing two units in the output layer for releasing the amounts of compensation that are to be given to the charger and the exposure lamp.

8. The image forming apparatus as defined in claim 3, wherein:

the image forming means includes a developing device for developing a latent image that has been formed on the photoreceptor; and the operation-number counting means includes a developing counter for counting the number of developing processes that are carried out in the developing device and a turning-on counter for counting the number of turning-on processes of the exposure lamp.

9. The image forming apparatus as defined in claim 8, wherein the neurocomputer contains four units in the input layer for receiving as input data the changes in densities that have been stored in the first and second density-change storage sections, a count value of the developing counter, and a count value of the turning-on counter, as well as containing two units in the output layer for releasing the amounts of compensation that are to be given to the charger and the exposure lamp.

10. An image forming apparatus comprising:

image-information reading means for reading out image information of a document image;

image forming means for carrying out an operation for forming an image based on the image information read by the image-information reading means;

image-quality condition input means for inputting conditions on image quality for image formation;

control means for controlling the image forming means based on the set conditions on image quality; and image-quality condition setting means made up of a neurocomputer for learning a relationship between input data and teaching data, the input data being derived from the image information read by the image-information reading means, the teaching data being derived from the conditions on image quality that have been inputted through the image-quality condition input means, and for setting conditions on image quality that are suitable for the image information read by the image-information reading means by conducting operations in accordance with the contents of the learning, upon copying the image of the document.

11. An image forming apparatus comprising:

image-information reading means for reading out image information of a document image;

image forming means for conducting an operation for forming an image based on the image information read by the image-information reading means;

image-quality condition input means for inputting conditions on image quality for image formation;

converting means for converting the image-quality conditions inputted through the image-quality condition input means into parameters that are suitable for the control on the image forming means;

control means for controlling the image forming means based on the parameters that have been set; and parameter setting means made up of a neurocomputer for learning a relationship between input data and teaching data, the input data being derived from the image information read by the image-information reading means, the teaching data being derived from the parameters from the converting means, and for setting parameters that are suitable for the image information read by the image-information reading means by conducting operations in accordance with the contents of the learning, upon copying the document image.

12. An image forming apparatus comprising:

image-information reading means for reading out image information of a document image;

image forming means for conducting an operation for forming an image based on the image information read by the image-information reading means;

image-quality condition input means for inputting conditions on image quality for image formation;

control means for controlling the image forming means based on the set conditions on image quality; and image-quality condition setting means made up of a neurocomputer for learning a relationship between input data and teaching data in correlation with an identification number, the input data being derived from the image information read by the image-information reading means, the teaching data being derived from the image-quality conditions inputted thereto from the image-quality condition input means, and for setting image-quality conditions that are suitable for the image information read by the image-information reading means by conducting operations in accordance with the contents of the learning that corresponds to the specified identification number, upon copying the document image.

13. An image forming apparatus comprising:

image-information reading means for reading out image information of a document image;

image forming means for conducting an operation for forming an image based on the image information read by the image-information reading means;

image-quality condition input means for inputting conditions on image quality for image formation;

control means for controlling the image forming means based on the set conditions on image quality;

image-quality condition setting means for learning a relationship between input data and teaching data in correlation with an identification number, the input data being derived from the image information read by the image-information reading means, the teaching data being derived from the image-quality conditions inputted thereto from the image-quality condition input means, and for setting image-quality conditions that are suitable for the image-information read by the image-information reading means by conducting operations in accordance with the contents of the learning that corresponds to the specified identification number, upon copying the document image;

a processing section for executing operations in accordance with the learning and the contents of the learning;

a plurality of learned-contents storage sections, each installed for each identification number, for storing the contents of learning that has been executed by the processing section; and a connecting section for connecting the learned-contents storage section corresponding to the specified identification number to the processing section.

14. An image forming apparatus comprising:

image-information reading means for reading out image information of a document image;

image forming means for conducting an operation for forming an image based on the image information read by the image-information reading means;

image-quality condition input means for inputting conditions on image quality for image formation;

control means for controlling the image forming means based on the set conditions on image quality; and image-quality condition setting means for learning a relationship between input data and teaching data in correlation with an identification number, the input data being derived from the image information read by the image-information reading means, the teaching data being derived from the image-quality conditions inputted thereto from the image-quality condition input means, and for setting image-quality conditions that are suitable for the image-information read by the image-information reading means by conducting operations in accordance with the contents of the learning that corresponds to the specified identification number upon copying the document image;

wherein the image-quality condition setting means includes a data storage section for storing pairs of the input data and the teaching data for use in the learning as learning data;

wherein the image-quality condition setting means starts the learning after a predetermined amount of the learning data has been accumulated in the data storage section;

wherein the image-quality condition setting means starts the learning after a predetermined amount of the learning data has been accumulated in the data storage section; and wherein the data storage section stores only the learning data that was last inputted thereto with respect to the same document.

15. The image forming apparatus as defined in claim 14, wherein the image-quality condition setting means, when it determines that inputted learning data are similar to the learning data that has already stored in the data storage section, prevents the inputted learning data from being stored in the data storage section.

16. An image forming apparatus comprising:

image-information reading means for reading out image information of a document image;

image forming means for conducting an operation for forming an image based on the image information read by the image-information reading means;

image-quality condition input means for inputting conditions on image quality for image formation;

control means for controlling the image forming means based on the set conditions on image quality;

image-quality condition setting means for learning relationship between input data and teaching data in correlation with an identification number, the input data being derived from the image information read by the image-information reading means, the teaching data being derived from the image-quality conditions inputted thereto from the image-quality condition input means, and for setting image-quality conditions that are suitable for the image information read by the image-information reading means by conducting operations in accordance with the contents of the learning that corresponds to the specified identification number upon copying the document image;

wherein the image-quality condition setting means includes a plurality of neurocomputers, each installed for each identification number.

17. The image forming apparatus as defined in claim 16, further comprising:

a first switch for selecting an output of one of the neurocomputers in accordance with a specified identification number.

18. The image forming apparatus as defined in claim 17, further comprising:

an external storage medium for storing the contents of the learning that has been obtained from the learning of the neurocomputers.

19. The image forming apparatus as defined in claim 18, wherein the external storage medium stores a specific identification number and the contents of the learning made by a specific one of the neurocomputers corresponding to the identification number, and passes the identification number to the first switch so that an output of the specific neurocomputer is selected.

20. The image forming apparatus as defined in claim 19, further comprising:

a second switch for connecting the external storage medium to the corresponding specific neurocomputer by the use of the specific identification number stored in the external storage medium.

21. The image forming apparatus as defined in claim 20, wherein the external storage medium is a memory card.

22. An image forming apparatus comprising:

image-information reading means for reading out image information of a document image;

image forming means for conducting an operation for forming an image based on the image information read by the image-information reading means;

image-quality condition input means for inputting conditions on image quality for image formation;

control means for controlling the image forming means based on the set conditions on image quality;

image-quality condition setting means for learning a relationship between input data and teaching data in correlation with an identification number, the input data being derived from the image information read by the image-information reading means, the teaching data being derived from the image-quality conditions inputted thereto from the image-quality condition input means, and for setting image-quality conditions that are suitable for the image information read by the image-information reading means by conducting operations in accordance with the contents of the learning that corresponds to the specified identification number, upon copying the document image;

wherein the image-quality condition setting means is connected to an external apparatus so as to share the contents of the learning, the external apparatus being provided with the same function as the image-quality condition setting means.

23. An image forming apparatus comprising:

image-information reading means for reading out image information of a document image;

image forming means for conducting an operation for forming an image based on the image information read by the image-information reading means;

image-quality condition input means for inputting conditions on image quality for image formation;

converting means for converting the image-quality conditions inputted through the image-quality condition input means into parameters that are suitable for the control on the image forming means;

control means for controlling the image forming means based on the parameters that have been set; and parameter setting means made up of a neurocomputer for learning a relationship between input data and teaching data in correlation with an identification number, the input data being derived from the image information read by the image-information reading means, the teaching data being derived from the parameters from the converting means, and for setting parameters that are suitable for the image information read by the image-information reading means by executing operations in accordance with the contents of the learning that corresponds to the specified number, upon copying the document image.

24. An image forming apparatus comprising:

image-information reading means for reading out image information of a document image;

image forming means for conducting an operation for forming an image based on the image information read by the image-information reading means;

image-quality condition input means for inputting conditions on image quality for image formation;

converting means for converting the image-quality conditions inputted through the image-quality condition input means into parameters that are suitable for the control on the image forming means;

control means for controlling the image forming means based on the parameters that have been set;

parameter setting means for learning a relationship between input data and teaching data in correlation with an identification number the input data being derived from the image-information read by the image information reading means, the teaching data being derived from the parameters from the converting means, and for setting parameters that are suitable for the image information read by the image-information reading means by executing operations in accordance with the contents of the learning that corresponds to the specified number, upon copying the document image;

a processing section for executing operations in accordance with the learning and the contents of the learning;

a plurality of learned-contents storage sections, each installed for each identification number, for storing the contents of learning that has been performed by the processing section; and a connecting section for connecting the learned-contents storage section corresponding to the specified identification number to the processing section.

25. An image forming apparatus comprising:

image-information reading means for reading out image information of a document image;

image forming means for conducting an operation for forming an image based on the image information read by the image-information reading means;

image-quality condition input means for inputting conditions on image quality for image formation;

converting means for converting the image-quality conditions inputted through the image-quality condition input means into parameters that are suitable for the control on the image forming means;

control means for controlling the image forming means based on the parameters that have been set; and parameter setting means for learning a relationship between input data and teaching data in correlation with an identification number, the input data being derived from the image-information read by the image information reading means, the teaching data being derived from the parameters from the converting means, and for setting parameters that are suitable for the image information read by the image-information reading means by executing operations in accordance with the contents of the learning that corresponds to the specified number, upon copying the document image;

wherein the parameter setting means includes a data storage section for storing as learning data pairs of the input data and the teaching data for use in the learning; and wherein the data storage section stores only the learning data that was last inputted thereto with respect to the same document.

26. The image forming apparatus as defined in claim 25, wherein the parameter setting means, when it determines that inputted learning data are similar to the learning data that has already stored in the data storage section, prevents the inputted learning data from being stored in the data storage section.

27. An image forming apparatus comprising;

image-information reading means for reading out image information of a document image;

image forming means for conducting an operation for forming an image based on the image information read by the image-information reading mean;

image-quality condition input means for inputting conditions on image quality for image formation;

converting means for converting the image-quality conditions inputted through the image-quality condition input means into parameters that are suitable for the control on the image forming means;

control means for controlling the image forming means based on the parameters that have been set; and parameter setting means for learning a relationship between input data and teaching data in correlation with an identification number, the input data being derived from the image-information read by the image information reading means, the teaching data being derived from the parameters from the converting means, and for setting parameters that are suitable for the image information read by the image-information reading means by executing operations in accordance with the contents of the learning that corresponds to the specified number, upon copying the document image;

wherein the parameter setting means includes a plurality of neurocomputers, each installed for each identification number.

28. The image forming apparatus as defined in claim 27, further comprising:

a first switch for selecting an output of one of the neurocomputers in accordance with a specified identification number.

29. The image forming apparatus as defined in claim 28, further comprising:

an external storage medium for storing the contents of the learning that has been obtained from the learning of the neurocomputers.

30. The image forming apparatus as defined in claim 29, wherein the external storage medium stores a specific identification number and the contents of the learning made by a specific one of the neurocomputers corresponding to the identification number, and passes the identification number to the first switch so that an output of the specific neurocomputer is selected.

31. The image forming apparatus as defined in claim 30, further comprising:

a second switch for connecting the external storage medium to the corresponding specific neurocomputer by the use of the specific identification number stored in the external storage medium.

32. The image forming apparatus as defined in claim 31, wherein the external storage medium is a memory card.

33. An image forming apparatus comprising:

image-information reading means for reading out image information of a document image;

image forming means for conducting an operation for forming an image based on the image information read by the image-information reading means;

image-quality condition input means for in putting conditions on image quality for image formation;

converting means for converting the image-quality conditions inputted through the image-quality condition input means into parameters that are suitable for the control on the image forming means;

control means for controlling the image forming means based on the parameters that have been set; and parameter setting means for learning a relationship between input data and teaching data in correlation with an identification number, the input data being derived from the image-information read by the image information reading means, the teaching data being derived from the parameters from the converting means, and for setting parameters that are suitable for the image information read by the image-information reading means by executing operations in accordance with the contents of the learning that corresponds to the specified number, upon copying the document image;

wherein the parameter setting means is connected to an external apparatus so as to share the contents of the learning, the external apparatus being provided with the same function as the parameter setting means.

34. An image forming apparatus comprising:

image-information reading means for reading out image information of a document image;

image forming means for conducting an operation for forming an image based on the image information read by the image-information reading means;

image-quality condition input means for inputting conditions on image quality for image formation;

control means for controlling the image forming means based on the set conditions on image quality; and basic-learning operation means for learning a reference relationship between image information and image-quality conditions beforehand, and for calculating image-quality conditions in accordance with the contents of the learning;

subtraction means for calculating a difference between an output of the basic-learning operation means and the image-quality conditions forming teaching data that are inputted thereto from the image-quality condition input means;

difference-learning operation means for learning a relationship between input: data and difference-teaching data in correlation with an identification number, the input data being derived from the image information read by the image-information reading means, the difference-teaching data being obtained from an output of the subtraction means, and for calculating a difference between the image-quality conditions and an output of the basic-learning operation means in accordance with the contents of the learning that corresponds to the specified number, upon copying the document image; and addition means for adding an output of the difference-learning operation means and an output value of the basics-learning operation means.

35. The image forming apparatus as defined in claim 34, wherein upon receiving a specified identification number, the difference-learning operation means erases the corresponding contents of the learning for each specified identification number.

36. An image forming apparatus comprising:

image-information reading means for reading out image information of a document image;

image forming means for conducting an operation for forming an image based on the image information read by the image-information reading means;

image-quality condition input means for inputting conditions on image quality for image formation;

converting means for converting the image-quality conditions inputted through the image-quality condition input means into parameters that are suitable for the control on the image forming means;

control means for controlling the image forming means based on the parameters that have been set;

basic-learning operation means for learning a reference relationship between image information and parameters beforehand, and for calculating parameters in accordance with the contents of the learning;

subtraction means for calculating a difference between an output of the basic-learning operation means and the parameters forming teaching data that are inputted thereto from the converting means;

difference-learning operation means for learning a relationship between input data and difference-teaching data in correlation with an identification number, the input data being derived from the image information read by the image-information reading means, the difference-teaching data being obtained from an output of the subtraction means, and for calculating a difference between the parameters and an output of the basic-learning operation means in accordance with the contents of the learning that corresponds to the,specified number, upon copying the document image; and addition means for adding an output of the difference-learning operation means and an output value of the basic-learning operation means.

37. The image forming apparatus as defined in claim 36, wherein upon receiving a specified identification number, the difference-learning operation means erases the corresponding contents of the learning for each specified identification number.

* * * * *